US012715543B2

(12) United States Patent
Tachibana

(10) Patent No.: US 12,715,543 B2
(45) Date of Patent: Aug. 25, 2026

(54) COMPONENT FOR HUMAN-POWERED VEHICLE AND CONTROL SYSTEM FOR HUMAN-POWERED VEHICLE

(71) Applicant: Shimano Inc., Osaka (JP)

(72) Inventor: Katsuhiro Tachibana, Osaka (JP)

(73) Assignee: Shimano Inc., Osaka (JP)

( * ) Notice: Subject to any disclaimer, the term of this patent is extended or adjusted under 35 U.S.C. 154(b) by 142 days.

(21) Appl. No.: 18/409,354

(22) Filed: Jan. 10, 2024

(65) Prior Publication Data

US 2024/0262460 A1 Aug. 8, 2024

(30) Foreign Application Priority Data

Feb. 7, 2023 (JP) ................................ 2023-017082

(51) Int. Cl.
*B62M 25/08* (2006.01)

(52) U.S. Cl.
CPC .................................. *B62M 25/08* (2013.01)

(58) Field of Classification Search
CPC ........... B62M 25/08; B62J 45/00; B62J 50/00
USPC ........................................................ 307/9.1
See application file for complete search history.

(56) References Cited

U.S. PATENT DOCUMENTS 8,229,370 B2 * 7/2012 Wu ...................... H04W 52/52 455/127.1
10,308,319 B1 6/2019 Chuang et al.
10,392,078 B2 8/2019 Jordan et al.
10,940,909 B2 3/2021 Masuda et al.
2010/0203846 A1 8/2010 Gorbachov
2018/0226932 A1 * 8/2018 Beaudin ............ H04W 52/0261
2019/0031283 A1 1/2019 Suzuki et al.
2019/0097671 A1 * 3/2019 Dimpflmaier ............. H03F 3/19
2020/0137684 A1 4/2020 Mattela et al.
2022/0266939 A1 * 8/2022 Ericksen .................. B62J 45/20
2024/0246629 A1 * 7/2024 Nozaki .................. B62J 50/225
2024/0251460 A1 * 7/2024 Nozaki ................. H04W 76/19

FOREIGN PATENT DOCUMENTS

CN 109808825 A 5/2019
JP 2003179517 * 6/2003
JP 2016-97877 A 5/2016

* cited by examiner

*Primary Examiner* — Richard Tan
(74) *Attorney, Agent, or Firm* — Spncer Fane, LLP

(57) ABSTRACT

A human-powered vehicle component includes an antenna, an amplifier, communicator and an electronic controller. The antenna performs at least one of reception of a predetermined signal from at least one communication device separate from the component and transmission of the predetermined signal to the communication device. The amplifier amplifies the predetermined signal in intensity. The communicator performs at least one of reception of the predetermined signal via the amplifier and transmission of the predetermined signal via the amplifier. The electronic controller controls the amplifier in accordance with an amplification control state that includes a first amplification control state, a second amplification control state in which the amplifier consumes more power than in the first amplification control state, and a third amplification control state in which the amplifier consumes more power than in the second amplification control state.

32 Claims, 20 Drawing Sheets

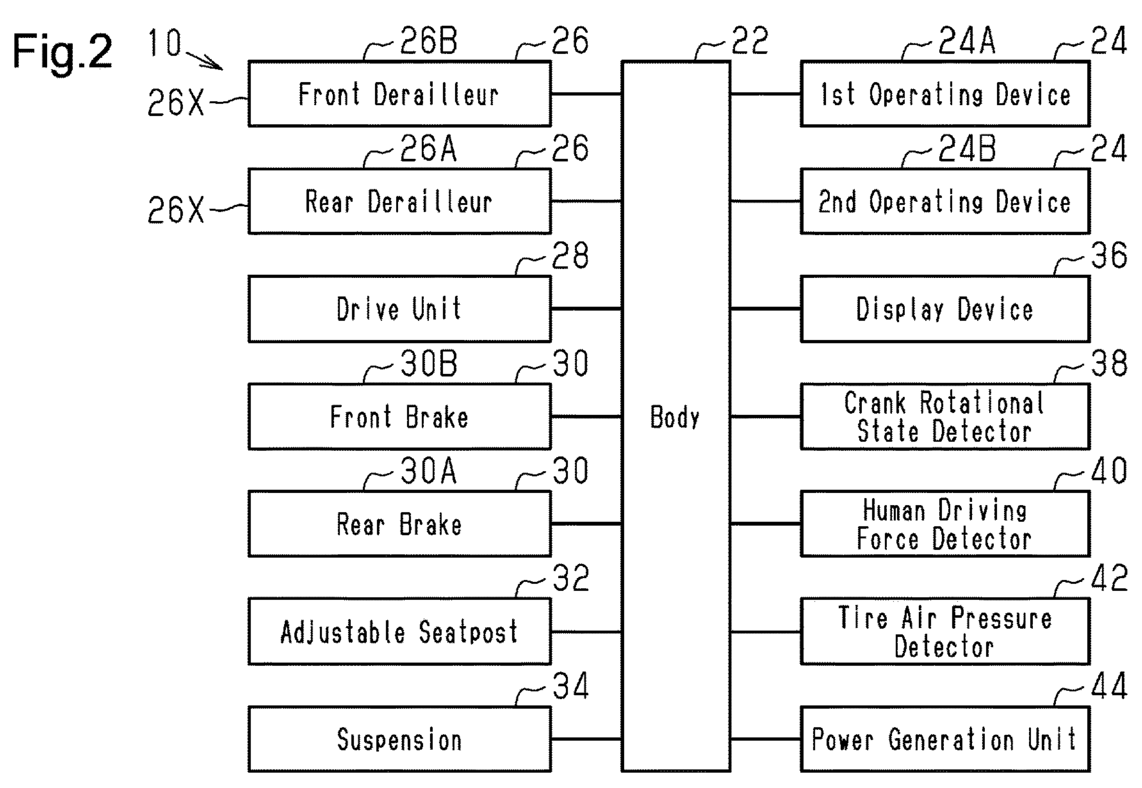
Fig.2
10
26X
Front Derailleur
26B
26
Rear Derailleur
26A
Drive Unit
28
Front Brake
30B
30
Rear Brake
30A
Adjustable Seatpost
32
Suspension
34
Body
22
1st Operating Device
24A
24
2nd Operating Device
24B
Display Device
36
Crank Rotational State Detector
38
Human Driving Force Detector
40
Tire Air Pressure Detector
42
Power Generation Unit
44

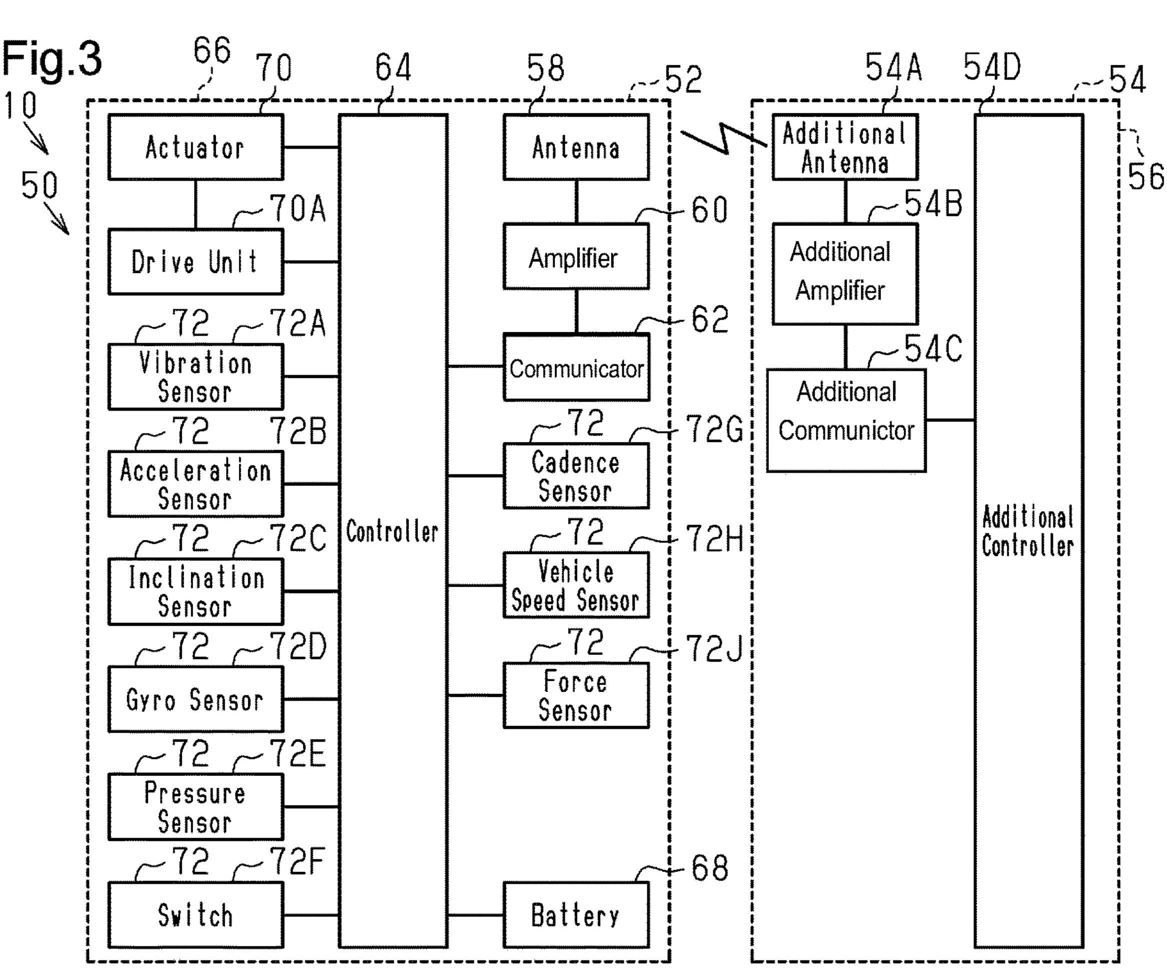
Fig.3
10
50
66
70
64
58
52
Actuator
Drive Unit
70A
Vibration Sensor
72
72A
Acceleration Sensor
72B
Inclination Sensor
72C
Gyro Sensor
72D
Pressure Sensor
72E
Switch
72F
Controller
Antenna
Amplifier
60
Communicator
62
Cadence Sensor
72G
Vehicle Speed Sensor
72H
Force Sensor
72J
Battery
68
54A
54D
54
56
Additional Antenna
Additional Amplifier
54B
Additional Communictor
54C
Additional Controller A
S21
2nd communication control state?
YES
NO
S22
1st period elapsed from final detection of action of human-powered vehicle by detector?
YES
NO
S23
Switch communication control state to 1st communication control state
S24
1st signal receivedby communicator?
YES
NO
S25
Switch communication control state to 3rd communication control state
END

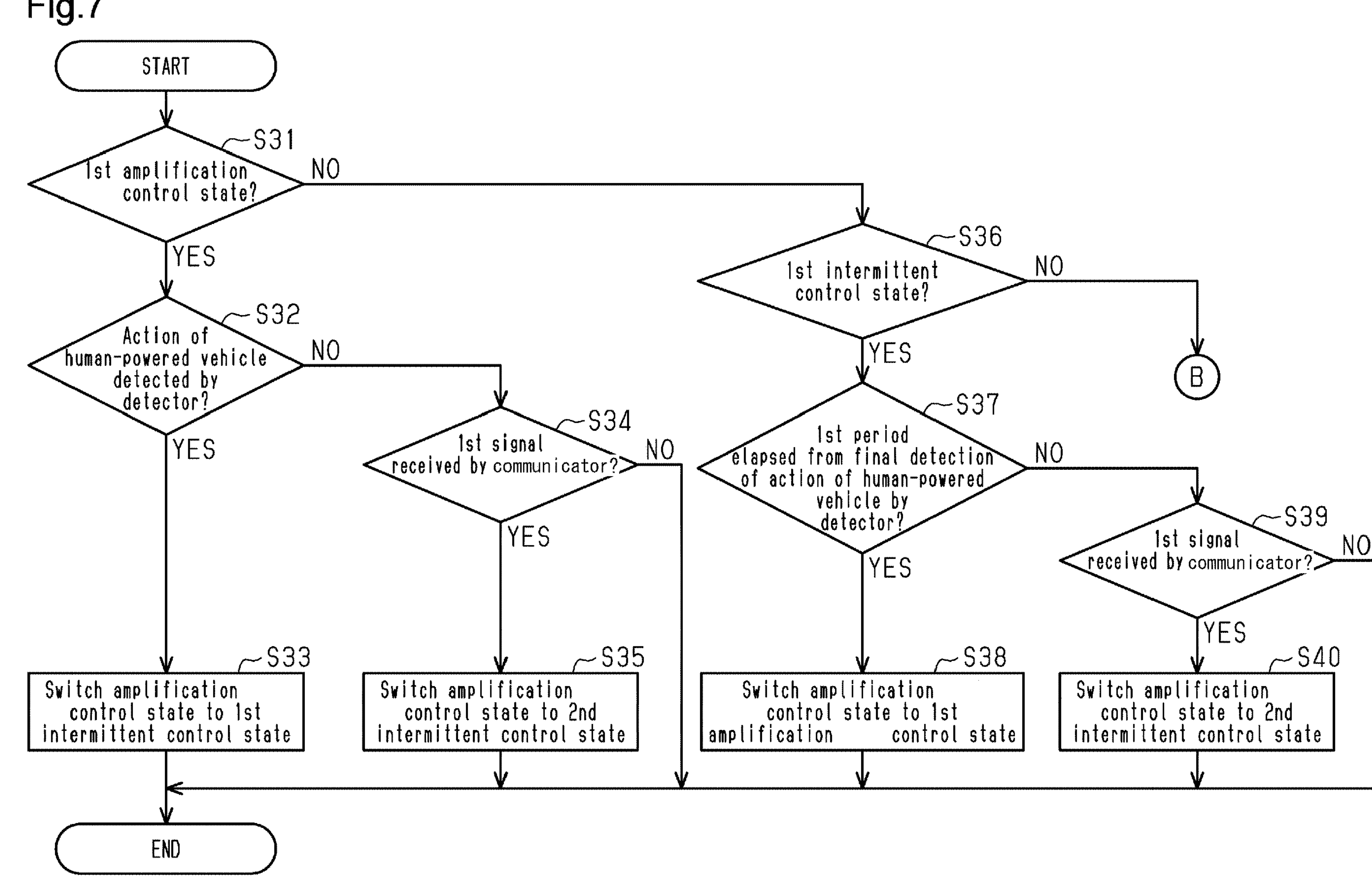
Fig.7
START
S31
1st amplification control state?
YES
NO
S32
Action of human-powered vehicle detected by detector?
YES
NO
S33
Switch amplification control state to 1st intermittent control state
S34
1st signal received by communicator?
YES
NO
S35
Switch amplification control state to 2nd intermittent control state
S36
1st intermittent control state?
YES
NO
B
S37
1st period elapsed from final detection of action of human-powered vehicle by detector?
YES
NO
S38
Switch amplification control state to 1st amplification control state
S39
1st signal received by communicator?
YES
NO
S40
Switch amplification control state to 2nd intermittent control state
END

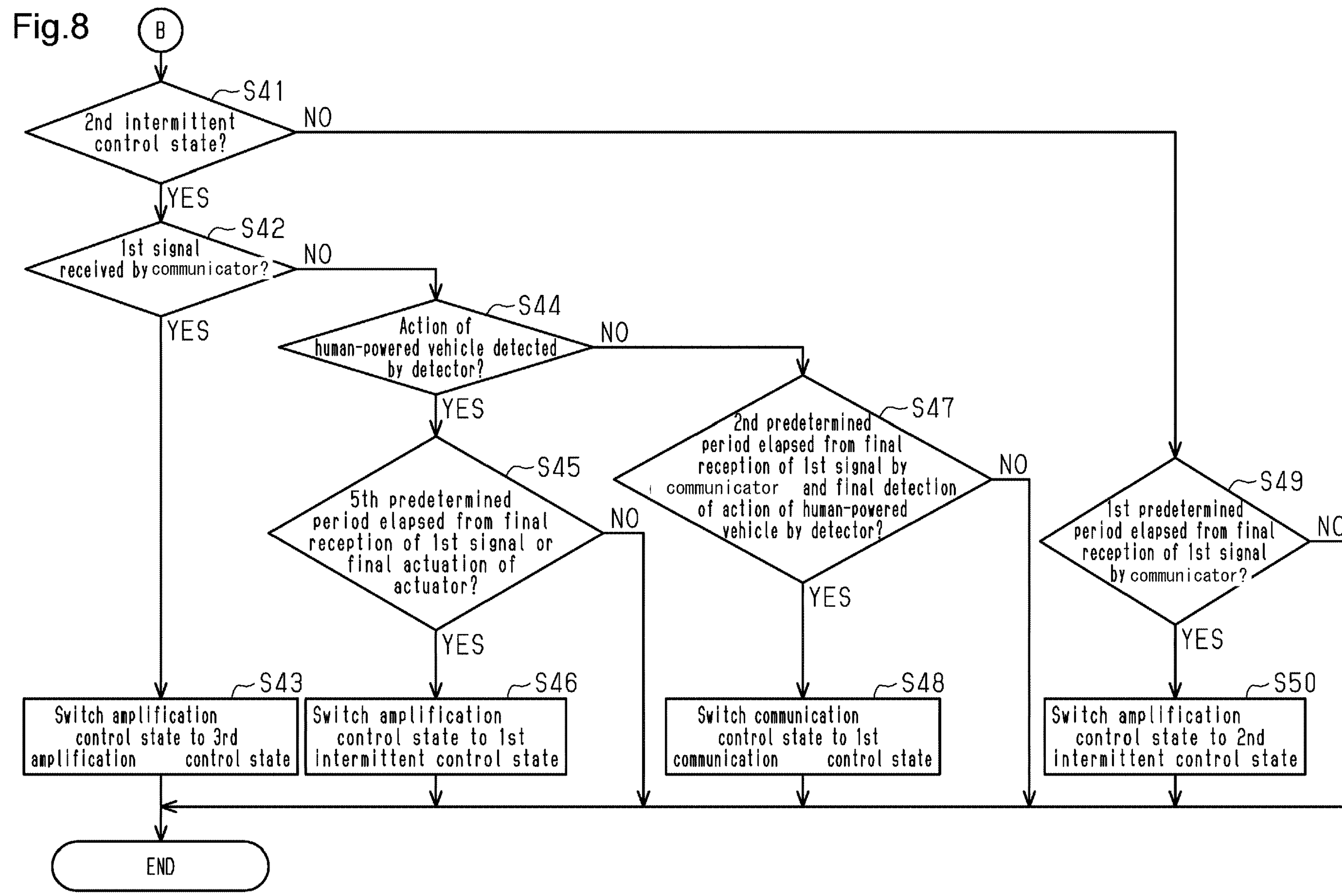
Fig.8
B
S41
2nd intermittent control state?
YES
NO
S42
1st signal received by communicator?
YES
NO
S43
Switch amplification control state to 3rd amplification control state
S44
Action of human-powered vehicle detected by detector?
YES
NO
S45
5th predetermined period elapsed from final reception of 1st signal or final actuation of actuator?
YES
NO
S46
Switch amplification control state to 1st intermittent control state
S47
2nd predetermined period elapsed from final reception of 1st signal by communicator and final detection of action of human-powered vehicle by detector?
YES
NO
S48
Switch communication control state to 1st communication control state
S49
1st predetermined period elapsed from final reception of 1st signal by communicator?
YES
NO
S50
Switch amplification control state to 2nd intermittent control state
END

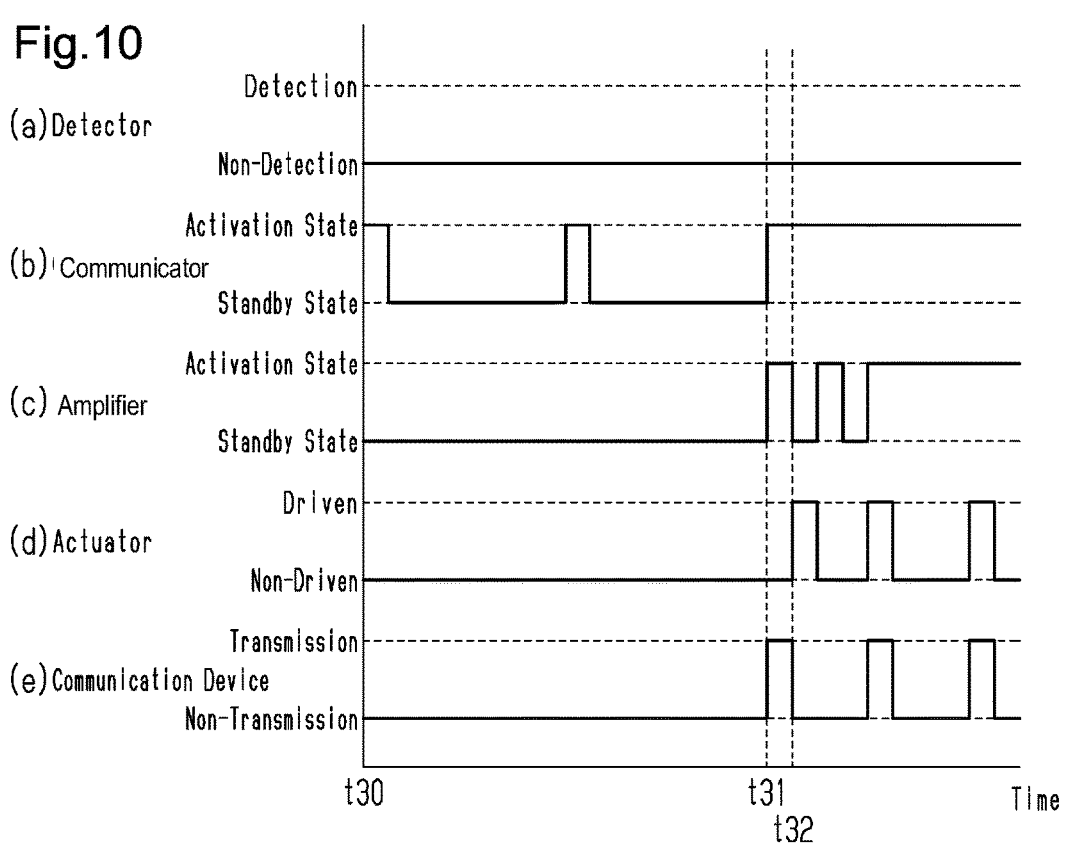
Fig.10
(a) Detector
Detection
Non-Detection
(b) Communicator
Activation State
Standby State
(c) Amplifier
Activation State
Standby State
(d) Actuator
Driven
Non-Driven
(e) Communication Device
Transmission
Non-Transmission
t30
t31
t32
Time

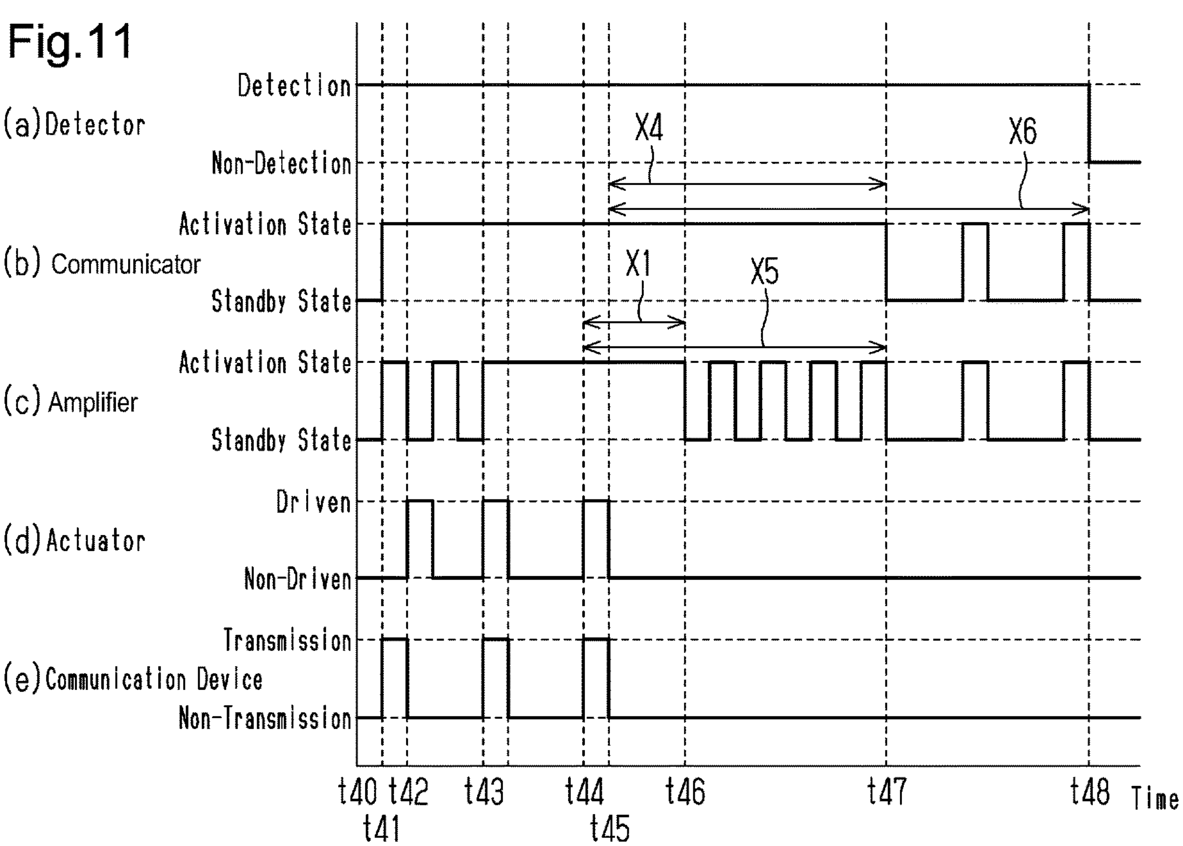
Fig.11
(a) Detector
Detection
Non-Detection
(b) Communicator
Activation State
Standby State
(c) Amplifier
Activation State
Standby State
(d) Actuator
Driven
Non-Driven
(e) Communication Device
Transmission
Non-Transmission
X4
X6
X1
X5
t40
t41
t42
t43
t44
t45
t46
t47
t48
Time (a) Detector
Detection
Non-Detection
(b) Communicator
Activation State
Standby State
(c) Amplifier
Activation State
Standby State
(d) Actuator
Driven
Non-Driven
(e) Communication Device
Transmission
Non-Transmission
Y1
t50
t51
t52
t53
Time

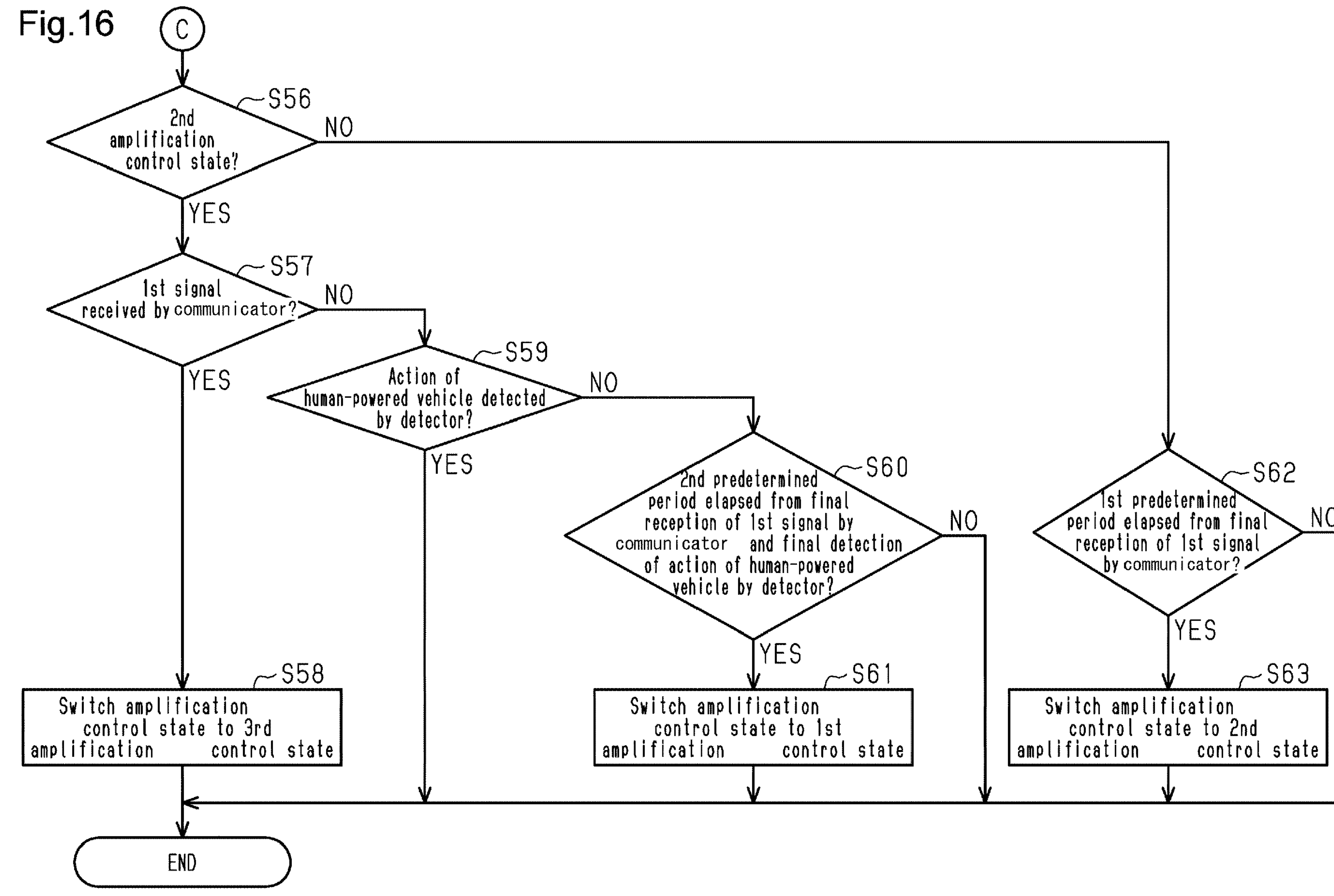
Fig.16
C
S56
2nd amplification control state?
YES
NO
S57
1st signal received by communicator?
YES
NO
S58
Switch amplification control state to 3rd amplification control state
S59
Action of human-powered vehicle detected by detector?
YES
NO
S60
2nd predetermined period elapsed from final reception of 1st signal by communicator and final detection of action of human-powered vehicle by detector?
YES
NO
S61
Switch amplification control state to 1st amplification control state
S62
1st predetermined period elapsed from final reception of 1st signal by communicator?
YES
NO
S63
Switch amplification control state to 2nd amplification control state
END

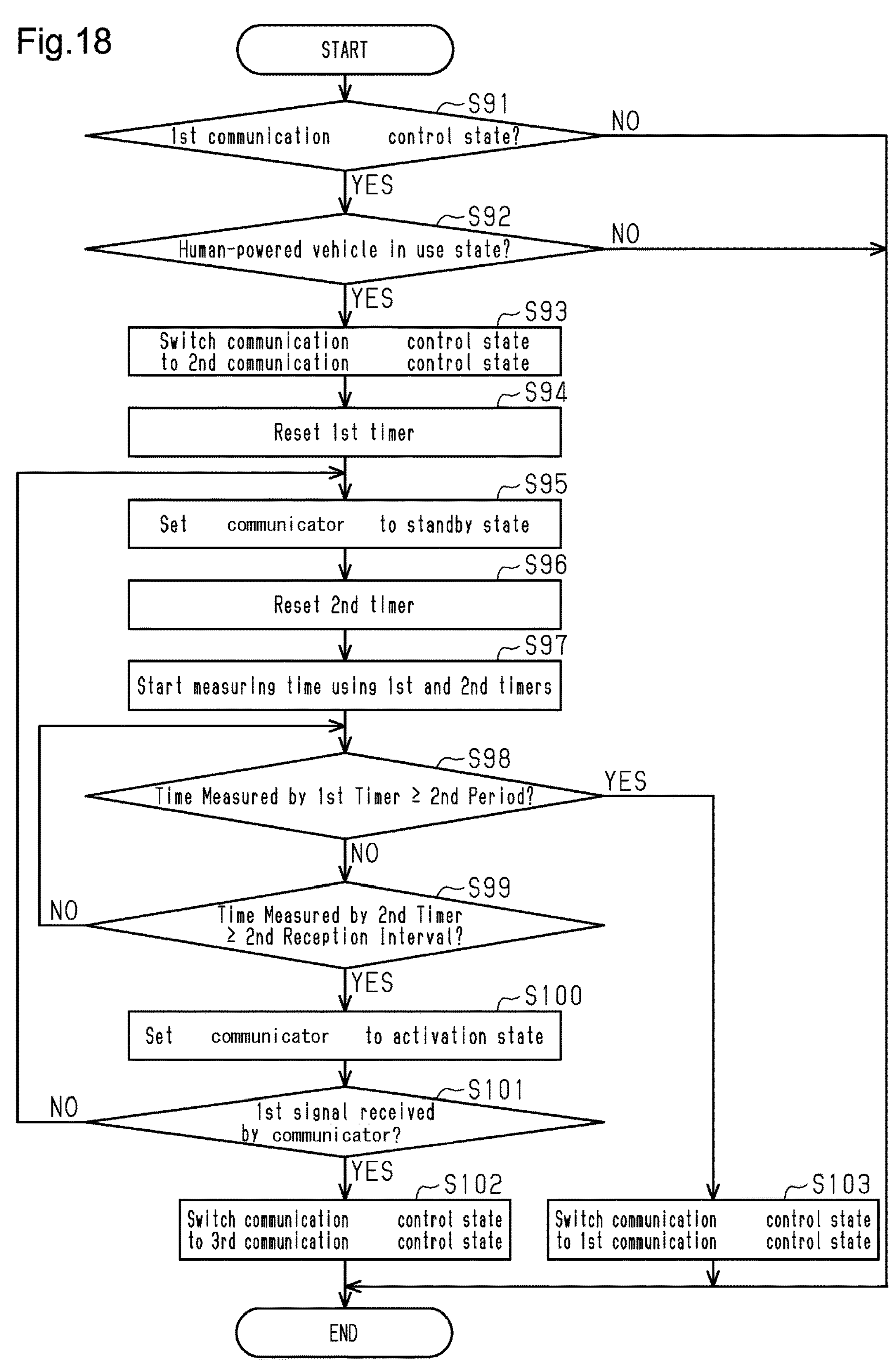
Fig.18
START
S91
1st communication control state?
NO
YES
S92
Human-powered vehicle in use state?
NO
YES
S93
Switch communication control state to 2nd communication control state
S94
Reset 1st timer
S95
Set communicator to standby state
S96
Reset 2nd timer
S97
Start measuring time using 1st and 2nd timers
S98
Time Measured by 1st Timer ≥ 2nd Period?
YES
NO
S99
Time Measured by 2nd Timer ≥ 2nd Reception Interval?
NO
YES
S100
Set communicator to activation state
S101
1st signal received by communicator?
NO
YES
S102
Switch communication control state to 3rd communication control state
S103
Switch communication control state to 1st communication control state
END

COMPONENT FOR HUMAN-POWERED VEHICLE AND CONTROL SYSTEM FOR HUMAN-POWERED VEHICLE

CROSS-REFERENCE TO RELATED APPLICATIONS

This application claims priority to Japanese Patent Application No. 2023-017082, filed on Feb. 7, 2023. The entire disclosure of Japanese Patent Application No. 2023-017082 is hereby incorporated herein by reference.

BACKGROUND

Technical Field

The present disclosure generally relates to a component for a human-powered vehicle and a control system for a human-powered vehicle.

Background Information

Japanese Laid-Open Patent Publication No. 2016-097877 (Patent Document 1) discloses an example of a component for a human-powered vehicle that includes an amplifier.

SUMMARY

One object of the present disclosure is to provide a component for a human-powered vehicle and a control system for a human-powered vehicle that control an amplifier in a preferred manner.

A component in accordance with a first aspect of the present disclosure is for a human-powered vehicle. The component comprises an antenna, an amplifier, communicator and an electronic controller. The antenna is configured to perform at least one of reception of a predetermined signal from at least one communication device that is separate from the component and transmission of the predetermined signal to the at least one communication device. The amplifier is electrically connected to the antenna and is configured to amplify the predetermined signal in intensity. The communicator performs at least one of reception of the predetermined signal via the amplifier and transmission of the predetermined signal via the amplifier. The electronic controller is configured to control the amplifier in accordance with an amplification control state. The amplification control state includes a first amplification control state, a second amplification control state in which power consumption of the amplifier is greater than power consumption of the amplifier in the first amplification control state, and a third amplification control state in which power consumption of the amplifier is greater than the power consumption of the amplifier in the second amplification control state.

With the component according to the first aspect, the amplifier is controlled in the three amplification control states differing in power consumption of the amplifier. Since the amplification control state is switched in accordance with the predetermined signal, the component limits increases in the power consumption of the amplifier in accordance with the predetermined signal. Thus, the component controls the amplifier in a preferred manner.

In accordance with a second aspect of the present disclosure, in the component according to the first aspect, the electronic controller is configured to control the amplifier in the third amplification control state so that the amplifier operates intermittently or operates continuously.

With the component according to the second aspect, in a case where the amplification control state is in the third amplification control state, the predetermined signal is amplified in intensity by the amplifier.

In accordance with a third aspect of the present disclosure, the component according to the first or second aspect is configured so that the at least one communication device includes at least one transmitter that transmits the predetermined signal. The antenna receives the predetermined signal from the at least one transmitter.

With the component according to the third aspect, the predetermined signal is received by the antenna.

In accordance with a fourth aspect of the present disclosure, the component according to the third aspect is configured so that the electronic controller is configured to switch the amplification control state to the third amplification control state in accordance with at least one of the predetermined signal, a state of the human-powered vehicle, and a state of the communicator in a case where the amplification control state is the second amplification control state.

With the component according to the fourth aspect, the amplification control state is switched from the second amplification control state to the third amplification control state in accordance with at least one of the predetermined signal, the state of the human-powered vehicle, and the state of the communicator. This limits increases in power consumption of the amplifier.

In accordance with a fifth aspect of the present disclosure, in the component according to the third aspect, the electronic controller is configured to control the communicator in accordance with a communication control state. The communication control state includes a first communication control state and a second communication control state in which power consumption of the communicator in the second communication control state is greater than power consumption of the communicator in the first communication control state. The electronic controller is configured to switch the amplification control state from the second amplification control state to the third amplification control state in accordance with at least one of the predetermined signal and a state of the human-powered vehicle in a case where the communication control state is the second communication control state.

With the component according to the fifth aspect, the amplification control state is switched from the second amplification control state to the third amplification control state in accordance with the communication control state. Thus, the amplification control state is changed in accordance with the communication control state.

In accordance with a sixth aspect of the present disclosure, the component according to any one of the third to fifth aspects is configured so that the electronic controller is configured to switch the amplification control state to the second amplification control state in a case where the amplification control state is the third amplification control state, and where a period from when the predetermined signal is finally received becomes a first predetermined period or longer.

With the component according to the sixth aspect, in a case where the amplification control state is the third amplification control state and the predetermined signal is not received by the communicator for the predetermined period or longer, the amplification control state is switched to the second communication control state. This limits increases in power consumption of the amplifier.

A component in accordance with a seventh aspect of the present disclosure is for a human-powered vehicle. The component comprises an antenna, an amplifier, a communicator and an electronic controller. The antenna is configured to receive a predetermined signal from at least one transmitter that is separate from the component. The amplifier is electrically connected to the antenna and is configured to amplify the predetermined signal, received from the antenna, in intensity. The communicator configured to receive the predetermined signal via the amplifier. The electronic controller is configured to control the communicator in accordance with a communication control state and control the amplifier in accordance with an amplification control state. The communication control state includes a first communication control state and a second communication control state in which power consumption of the communicator is greater than power consumption of the communicator in the first communication control state. The amplification control state includes a first amplification control state and a second amplification control state in which power consumption of the amplifier in the second communication control state is greater than power consumption of the amplifier in the first amplification control state. The electronic controller is configured to switch the amplification control state from the first amplification control state to the second amplification control state in accordance with at least one of the predetermined signal and a state of the human-powered vehicle in a case where the communication control state is the second communication control state.

With the component according to the seventh aspect, the amplifier is controlled in the two amplification control states differing in power consumption of the amplifier. Since the amplification control state is switched in accordance with at least one of the predetermined signal and the state of the human-powered vehicle, the component limits increases in power consumption of the amplifier in accordance with at least one of the predetermined signal and the state of the human-powered vehicle. Thus, the component controls the amplifier in a preferred manner.

In accordance with an eighth aspect of the present disclosure, in the component according to any one of the first to seventh aspects, the electronic controller is configured to control the amplifier in the first amplification control state so that the amplifier enters a sleep mode or operates intermittently.

With the component according to the eighth aspect, in the first amplification control state, the amplifier enters the sleep mode or operates intermittently. This reduces power consumption of the amplifier.

In accordance with a ninth aspect of the present disclosure, the component according to the eighth aspect is configured so that the electronic controller is configured to control the amplifier in the first amplification control state so that the amplifier stops amplifying the predetermined signal in intensity.

With the component according to the ninth aspect, in a case where the amplification control state is the first amplification control state, the predetermined signal is not amplified in intensity. This reduces power consumption of the amplifier.

A component in accordance with a tenth aspect of the present disclosure is for a human-powered vehicle. The component comprises an antenna, an amplifier, a communicator and an electronic controller. The antenna is configured to receive a predetermined signal from at least one transmitter that is separate from the component. The amplifier is electrically connected to the antenna and is configured to amplify the predetermined signal, received from the antenna, in intensity. The communicator is configured to receive the predetermined signal via the amplifier. The electronic controller is configured to control the amplifier in accordance with an amplification control state. The amplification control state includes a first amplification control state and a second amplification control state in which power consumption of the amplifier in the second amplification control state is greater than power consumption of the amplifier in the first amplification control state. The controller is configured to control the amplifier in the first amplification control state so that the amplifier stops amplifying the predetermined signal in intensity.

With the component according to the tenth aspect, the amplifier is controlled in the two amplification control states differing in power consumption of the amplifier. This limits increases in power consumption of the amplifier. Thus, the component controls the amplifier in a preferred manner.

In accordance with an eleventh aspect of the present disclosure, the component according to any one of the third to tenth aspects is configured so that the electronic controller is configured to switch the amplification control state to the second amplification control state in accordance with at least one of the predetermined signal, a state of the human-powered vehicle, and a state of the communicator in a case where the amplification control state is the first amplification control state.

With the component according to the eleventh aspect, the amplification control state is switched from the first amplification control state to the second amplification control state in accordance with at least one of the predetermined signal, the state of the human-powered vehicle, and the state of the communicator. This limits increases in power consumption of the amplifier.

In accordance with a twelfth aspect of the present disclosure, the component according to any one of the third to eleventh aspects is configured so that the electronic controller is configured to switch the amplification control state to the first amplification control state in a case where the amplification control state is the second amplification control state, and where the predetermined signal is not received and the human-powered vehicle is continuously maintained in a predetermined state over a second predetermined period or longer.

With the component according to the twelfth aspect, in a case where the predetermined signal is not received and the human-powered vehicle is continuously maintained in the predetermined state over the second predetermined period or longer, the amplification control state is switched from the second communication control state to the first communication control state. This limits increases in power consumption of the amplifier.

In accordance with a thirteenth aspect of the present disclosure, the component according to any one of the third to twelfth aspects is configured so that the electronic controller is configured to control the communicator in the second amplification control state so that the amplifier operates continuously or operates intermittently.

With the component according to the thirteenth aspect, in a case where the amplification control state is in the second amplification control state, the predetermined signal is amplified in intensity by the amplifier.

In accordance with a fourteenth aspect of the present disclosure, in the component according to the thirteenth aspect, wherein the electronic controller is configured to control the amplifier in the second amplifier control state so that the amplifier operates intermittently.

With the component according to the fourteenth aspect, in a case where the amplification control state is the second amplification control state, power consumption is reduced.

In accordance with a fifteenth aspect of the present disclosure, the component according to the fourteenth aspect is configured so that the second amplification control state includes a first intermittent control state and a second intermittent control state in which power consumption of the amplifier the second intermittent control state is greater than power consumption of the amplifier in the first intermittent control state. The electronic controller is configured to control the amplifier in the first intermittent control state so that an amplification cycle of the amplifier is a first amplification cycle. The electronic controller is configured to control the amplifier in the second intermittent control state so that the amplification cycle is a second amplification cycle that is shorter than the first amplification cycle.

With the component according to the fifteenth aspect, the first intermittent control state and the second intermittent control state are switched. Thus, in the second control state, power consumption of the amplifier is finely controlled.

In accordance with a sixteenth aspect of the present disclosure, the component according to the fifteenth aspect is configured so that the first amplification cycle includes a first amplification period. The second amplification cycle includes a second amplification period. The electronic controller is configured to control the amplifier in the first intermittent control state so that the amplifier amplifies the predetermined signal in intensity during the first amplification period. The electronic controller is configured to control the amplifier in the second intermittent control state so that the amplifier amplifies the predetermined signal in intensity during the second amplification period.

The component according to the sixteenth aspect controls the amplifier so that the amplifier intermittently amplifies the predetermined signal in intensity in accordance with the first amplification period and the second amplification period.

In accordance with a seventeenth aspect of the present disclosure, the component according to the sixteenth aspect is configured so that the first amplification cycle further includes a first amplification interval from the first amplification period to a following first amplification period. The second amplification cycle further includes a second amplification interval from the second amplification period to a following second amplification period.

The component according to the seventeenth aspect controls the amplifier so that the amplifier intermittently amplifies the predetermined signal in intensity in accordance with the first amplification interval and the second amplification interval.

In accordance with an eighteenth aspect of the present disclosure, the component according to the seventeenth aspect is configured so that the first amplification interval is longer than the second amplification interval.

With the component according to the eighteenth aspect, the amplification interval in a case where the amplification control state is the first intermittent control state is longer than the amplification interval in a case where the amplification control state is the second intermittent control state.

In accordance with a nineteenth aspect of the present disclosure, the component according to the seventeenth or eighteenth aspect is configured so that the first amplification interval includes a first low amplification period. The electronic controller is configured to control the amplifier in the first low amplification period so that the amplifier amplifies the predetermined signal in intensity at a degree lower than an amplification degree of the predetermined signal in the first amplification period.

With the component according to the nineteenth aspect, the amplifier amplifies the predetermined signal in intensity at a lower degree. Thus, in the first amplification interval, the amplifier consumes less power than in the first amplification period.

In accordance with a twentieth aspect of the present disclosure, the component according to the nineteenth aspect is configured so that the first low amplification period includes a first non-amplification period. The electronic controller is configured to control the amplifier in the first non-amplification period so that the amplifier does not amplify the predetermined signal in intensity.

With the component according to the twentieth aspect, in the first non-amplification period, the amplifier does not consume power for amplifying the predetermined signal in intensity. Thus, power consumption of the amplifier is decreased in the first amplification interval.

In accordance with a twenty-first aspect of the present disclosure, the component according to any one of the seventeenth to twentieth aspects is configured so that the second amplification interval includes a second low amplification period. The electronic controller is configured to control the amplifier in the second low amplification period so that the amplifier amplifies the predetermined signal in intensity at a degree lower than an amplification degree of the predetermined signal in the second amplification period.

With the component according to the twenty-first aspect, the amplifier amplifies the predetermined signal in intensity at a lower degree. Thus, in the second amplification interval, the amplifier consumes less power than in the second amplification period.

In accordance with a twenty-second aspect of the present disclosure, the component according to the twenty-first aspect is configured so that the second low amplification period includes a second non-amplification period. The electronic controller is configured to control the amplifier in the second non-amplification period so that the amplifier does not amplify the predetermined signal in intensity.

With the component according to the twenty-second aspect, in the second non-amplification period, the amplifier does not consume power for amplifying the predetermined signal in intensity. Thus, power consumption of the amplifier is decreased in the second amplification interval.

In accordance with a twenty-third aspect of the present disclosure, the component according to any one of the fifteenth to twenty-second aspects is configured so that the electronic controller is configured to switch the amplification control state to the first intermittent control state in accordance with at least one of the predetermined signal, a state of the human-powered vehicle, and a state of the communicator in a case where the amplification control state is the first amplification control state.

With the component according to the twenty-third aspect, the amplification control state is switched from the first amplification control state to the first intermittent control state in accordance with at least one of the predetermined signal, the state of the human-powered vehicle, and the state of the communicator. This limits increases in power consumption of the amplifier.

In accordance with a twenty-fourth aspect of the present disclosure, the component according to any one of the fifteenth to twenty-third aspects is configured so that the electronic controller is configured to switch the amplification control state to the second intermittent control state in accordance with the predetermined signal in a case where the amplification control state is the first intermittent control state.

With the component according to the twenty-fourth aspect, the amplification control state is switched from the first intermittent control state to the second intermittent control state in accordance with the predetermined signal. This limits increases in power consumption of the amplifier.

In accordance with a twenty-fifth aspect of the present disclosure, the component according to any one of the fifteenth to twenty-fourth aspects is configured so that the electronic controller is configured to switch the amplification control state to the first intermittent control state in accordance with the predetermined signal in a case where the amplification control state is the second intermittent control state.

With the component according to the twenty-fifth aspect, the amplification control state is switched from the second intermittent control state to the first intermittent control state in accordance with the predetermined signal. This limits increases in power consumption of the amplifier.

In accordance with a twenty-sixth aspect of the present disclosure, the component according to any one of the fourth, fifth, seventh, eleventh, twelfth, and twenty-third aspects is configured so that the state of the human-powered vehicle includes at least one of vehicle body state of the human-powered vehicle, traveling state of the human-powered vehicle, and state of a rider of the human-powered vehicle.

With the component according to the twenty-sixth aspect, the amplification control state is switched in accordance with at least one of the vehicle body state of the human-powered vehicle, the traveling state of the human-powered vehicle, and the state of the rider of the human-powered vehicle.

In accordance with a twenty-seventh aspect of the present disclosure, the component according to the twenty-sixth aspect further comprises a detector that detects the state of the human-powered vehicle. The detector includes at least one of a vibration sensor, an acceleration sensor, an inclination sensor, a gyro sensor, a pressure sensor, a switch, a cadence sensor, a vehicle speed sensor, and a force sensor.

With the component according to the twenty-seventh aspect, the state of the human-powered vehicle is detected by at least one of the vibration sensor, the acceleration sensor, the inclination sensor, the gyro sensor, the pressure sensor, the switch, the cadence sensor, the vehicle speed sensor, and the force sensor.

In accordance with a twenty-eighth aspect of the present disclosure, the component according to any one of the first to twenty-seventh aspects is configured so that the component includes at least one of an operating device, a transmission device, a drive unit that applies a propulsion force to the human-powered vehicle, a brake, an adjustable seatpost, a suspension, a display device, a crank rotational state detector, a human driving force detector, and a tire pressure detector.

With the component according to the twenty-eighth aspect, power consumption of at least one of the operating device, the transmission device, the drive unit that applies propulsion force to the human-powered vehicle, the brake, the adjustable seatpost, the suspension, the display device, the crank rotational state detector, the human driving force detector, and the tire pressure detector is changed.

In accordance with a twenty-ninth aspect of the present disclosure, the component according to the twenty-eighth aspect is configured so that the component includes the transmission device. The transmission device includes a derailleur.

The component according to the twenty-ninth aspect changes power consumption of the derailleur.

A control system in accordance with a thirtieth aspect of the present disclosure is for a human-powered vehicle. The control system comprises the component according to any one of the third to thirtieth aspects and the at least one transmitter.

The control system according to the thirtieth aspect controls the amplifier in a preferred manner.

A component in accordance with a thirty-first aspect of the present disclosure is for a human-powered vehicle. The component comprises an antenna, an amplifier, a communicator and an electronic controller. The antenna is configured to perform at least one of reception of a predetermined signal from at least one communication device that is separate from the component and transmission of the predetermined signal to the at least one communication device, an amplifier electrically connected to the antenna, and a communicator configured to transfer the predetermined signal via the antenna and the amplifier. The amplifier includes an amplification circuit configured to amplify the predetermined signal in intensity, transfer paths, and a switching unit configured to select one of the transfer paths. The transfer paths include a first transfer path that transfers the predetermined signal between the antenna and the communicator via the amplification circuit, and a second transfer path that transfers the predetermined signal between the antenna and the communicator without using the amplification circuit.

With the component according to the thirty-first aspect, in a case where the second transfer path, which transfers the predetermined signal without using the amplification circuit, is selected, power consumption of the amplifier is limited. Thus, the component controls the amplifier in a preferred manner.

In accordance with a thirty-second aspect of the present disclosure, the component according to the thirty-first aspect is configured so that the at least one communicator includes at least one transmitter that transmits the predetermined signal. The antenna receives the predetermined signal from the at least one transmitter. The first transfer path includes a first reception transfer path that transfers the predetermined signal received by the antenna to the communicator via the amplification circuit. The second transfer path includes a second reception transfer path that transfers the predetermined signal received by the antenna to the communicator without using the amplification circuit.

With the component according to the thirty-second aspect, in a case where the second reception transfer path, which transfers the predetermined signal without using the amplification circuit, is selected, power consumption of the amplifier is limited. Thus, the component controls the amplifier in a preferred manner.

The human-powered vehicle component and the human-powered vehicle control system according to the present disclosure control the amplifier in a preferred manner.

BRIEF DESCRIPTION OF THE DRAWINGS

Referring now to the attached drawings which form a part of this original disclosure.

FIG. 2 is a block diagram showing the structure of the human-powered vehicle shown in FIG. 1.

FIG. 3 is a block diagram showing the structure of the human-powered vehicle control system and the human-powered vehicle component of the first embodiment.

FIG. 7 is a first part of a flowchart of a process for switching an amplification control state executed by the electronic controller shown in FIG. 3.

FIG. 8 is a second part of the flowchart of the process for switching the amplification control state executed by the electronic controller shown in FIG. 3.

FIG. 10 is a timing chart showing a second example of changes in the states of the communicator, the amplifier, and the actuator shown in FIG. 3.

FIG. 11 is a timing chart showing a third example of changes in the states of the communicator, the amplifier, and the actuator shown in FIG. 3.

FIG. 13 is a part of a flowchart of a process for switching the amplification control state executed by an electronic controller in accordance with a second embodiment of.

FIG. 16 is a second part of the flowchart of the process for switching the amplification control state executed by the electronic controller of the third embodiment.

FIG. 18 is a flowchart of a process for switching a communication control state executed by an electronic controller in accordance with a fifth embodiment.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
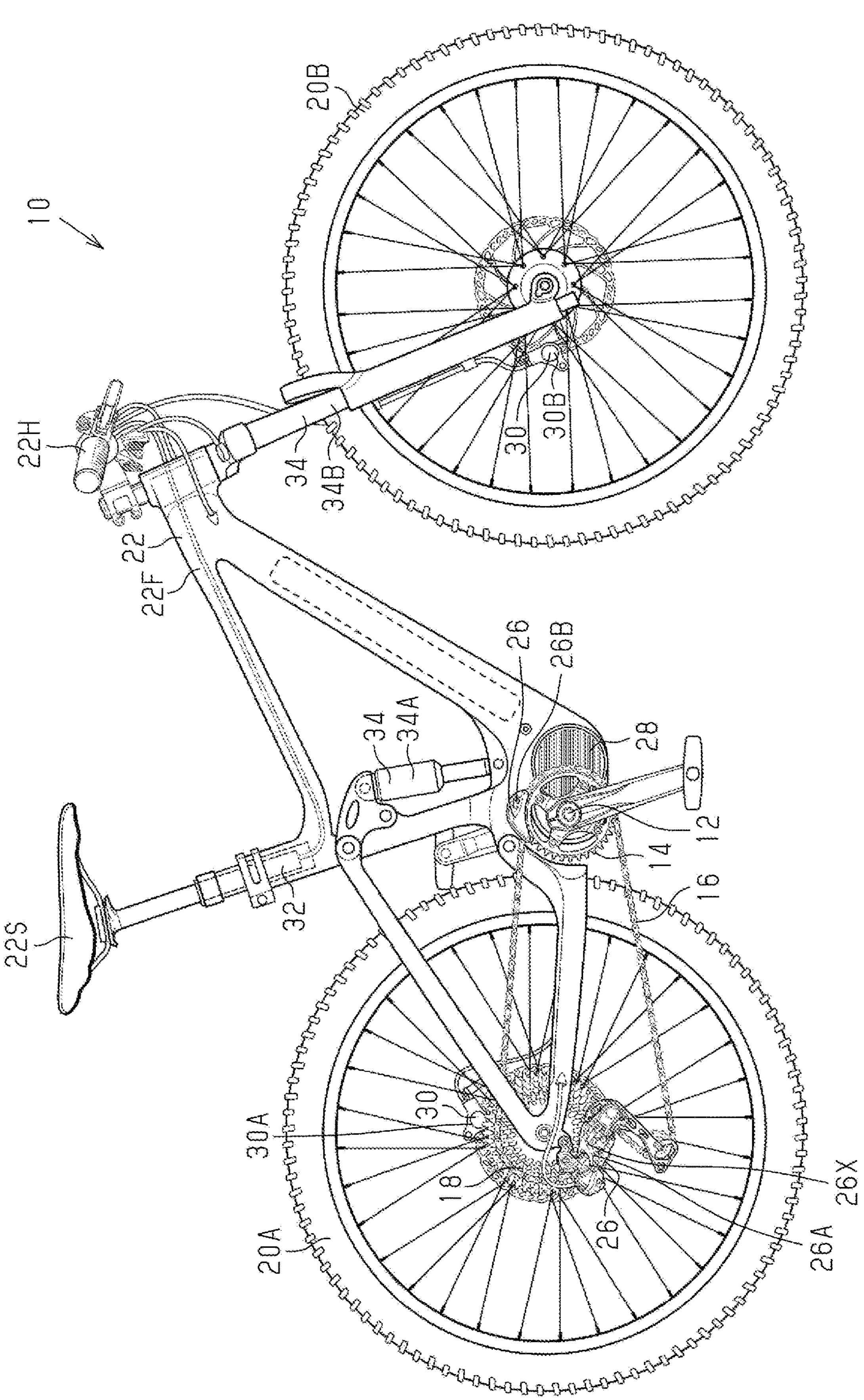
FIG. 1 is a side elevational view of a human-powered vehicle including a first embodiment of a control system for a human-powered vehicle and a component for a human-powered vehicle.

As shown in FIG. 1, a human-powered vehicle 10 is illustrated that is equipped with a human-powered vehicle control system 50 for a human-powered vehicle and a human-powered vehicle component 52 for a human-powered vehicle. A first embodiment of the human-powered vehicle control system 50 and the human-powered vehicle component 52 will now be described with reference to FIGS. 1 to 12.

The human-powered vehicle 10 is a vehicle including at least one wheel and driven by at least a human driving force. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a unicycle and a vehicle including two or more wheels. The human-powered vehicle 10 is not limited to a vehicle configured to be driven only by a human driving force. The human-powered vehicle 10 includes an E-bike that uses a driving force of an electric motor in addition to the human driving force for propulsion. The E-bike includes an electric assist bicycle that assists in propulsion using an electric motor. In the embodiments described below, the human-powered vehicle 10 refers to a bicycle.

As shown in FIGS. 1 and 2, the human-powered vehicle 10 includes a crank 12, a front sprocket 14, a chain 16, a rear sprocket 18, a rear wheel 20A, and a front wheel 20B. The human driving force is input to the crank 12. The front sprocket 14 receives the human driving force from the crank 12. The chain 16 transmits the human driving force from the front sprocket 14 to the rear sprocket 18. The rear sprocket 18 is configured to output the human driving force to the rear wheel 20A.

The human-powered vehicle 10 includes, for example, a body 22, an operating device 24, a transmission device 26, a drive unit 28, a brake 30, an adjustable seatpost 32, a suspension 34, a display device 36, a crank rotational state detector 38, a human driving force detector 40, and a tire pressure detector 42. The body 22 includes, for example, the crank 12, the front sprocket 14, the chain 16, the rear sprocket 18, the rear wheel 20A, and the front wheel 20B. The body 22 includes, for example, a frame 22F of the human-powered vehicle 10, a handlebar 22H, and a saddle 22S. The human-powered vehicle component is, for example, provided on the body 22. The human-powered vehicle component includes, for example, at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42. The term "detector" as used herein refers to a hardware device or instrument designed to detect the presence or absence of a particular event, object, substance, or a change in its environment, and to emit a signal in response. The term "detector" as used herein do not include a human being.

In an example, the operating device 24 is configured to be operable by the rider. In an example, the operating device 24 is provided on the handlebar 22H. The operating device 24 is configured to operate at least one of the transmission device 26, the drive unit 28, the brake 30, the adjustable seatpost 32, the suspension 34, the display device 36, the crank rotational state detector 38, the human driving force detector 40, and the tire pressure detector 42. In an example, the operating device 24 operates a human-powered vehicle component differing from the operating device 24 by transmitting a predetermined signal related to an operation of the human-powered vehicle component to the human-powered vehicle component. In an example, the operating device 24 includes at least one of a button, a dial, and a lever. The operating device 24 includes a first operating device 24A and a second operating device 24B. Each of the first operating device 24A and the second operating device 24B is configured to operate a different human-powered vehicle component. The operating device 24 can be provided on a location other than the handlebar 22H.

The transmission device 26 is configured to shift the transmission ratio of the human-powered vehicle 10 in accordance with the shift stage. In an example, the transmission device 26 is provided on the frame 22F. In an example, the transmission ratio of the human-powered vehicle 10 is a ratio of a rotational speed of the rear wheel 20A to a rotational speed of the crank 12. In an example, the transmission device 26 includes an external transmission device. In an example, the transmission device 26 includes at least one of a rear derailleur 26A and a front derailleur 26B. In the present embodiment, the transmission device 26 includes the rear derailleur 26A and the front derailleur 26B. The transmission device 26 can include an internal transmission device. In an example, the internal transmission device is provided on a hub of the rear wheel 20A. In an example, the transmission device 26 includes an electric transmission device. In an example, the transmission device 26 includes an actuator actuated by electric power. In an example, the actuator of the transmission device 26 is configured to shift the transmission ratio of the human-powered vehicle 10 in accordance with a predetermined signal.

In an example, the drive unit 28 applies a propulsion force to the human-powered vehicle 10. In an example, the drive unit 28 is provided on the frame 22F. In an example, the drive unit 28 operates in accordance with the human driving force input to the crank 12. In an example, the drive unit 28 includes an actuator actuated by electric power. In an example, the actuator of the drive unit 28 includes a motor. In an example, the actuator of the drive unit 28 is configured to change the ratio of a motor driving force to a human driving force in accordance with a predetermined signal.

The brake 30 is configured to break the human-powered vehicle 10. In an example, the brake 30 is provided on the frame 22F. In an example, the brake 30 includes a rear brake 30A and a front brake 30B. In an example, the brake 30 includes an electric brake. In an example, the brake 30 includes an actuator actuated by electric power. In an example, the actuator of the brake 30 is configured to change braking force applied to the human-powered vehicle 10 in accordance with a predetermined signal.

The adjustable seatpost 32 is configured to change the height of the saddle 22S relative to the frame 22F. In an example, the adjustable seatpost 32 is provided on the frame 22F. In an example, the adjustable seatpost 32 includes an electric adjustable seatpost. In an example, the adjustable seatpost 32 includes an actuator actuated by electric power. In an example, the actuator of the adjustable seatpost 32 is configured to change the height of the saddle 22S relative to the frame 22F in accordance with a predetermined signal.

The suspension 34 is configured to absorb impacts on the rear wheel 20A and the front wheel 20B. In an example, the suspension 34 is provided on the frame 22F. In an example, the suspension 34 includes an electric suspension. The suspension 34 can be a coil suspension, a hydraulic suspension, or an air suspension. In an example, the suspension 34 includes a rear suspension 34A and a front suspension 34B. The suspension 34 includes a first part and a second part that is fitted into the first part and movable relative to the first part. In an example, the first part of the suspension 34 is connected to the axle of the rear wheel 20A or the front wheel 20B. In an example, the second part of the suspension 34 is connected to the frame 22F. The suspension 34 absorbs impacts on the rear wheel 20A and the front wheel 20B by movement of the second part of the suspension 34 relative to the first part of the suspension 34. In an example, the suspension 34 includes an actuator. In an example, the actuator of the suspension 34 is configured to change an allowed amount of relative movement of the first part and the second part.

In an example, the display device 36 is configured to notify a rider of a state related to the human-powered vehicle 10. In an example, the display device 36 is provided on the handlebar 22H. In an example, the display device 36 is configured to receive the state related to the human-powered vehicle 10 from a human-powered vehicle component. The display device 36 can be detachably provided on the frame 22F of the human-powered vehicle 10. In an example, the display device 36 includes at least one of a smartphone and a cycle computer.

The crank rotational state detector 38 is configured to detect a rotational state of the crank 12. In an example, the crank rotational state detector 38 includes a magnet provided on the crank 12 and a magnetic sensor provided on the frame 22F. The magnetic sensor of the crank rotational state detector 38 is configured to detect the magnetism of the magnet of the crank rotational state detector 38 as of the crank 12 rotates. The crank rotational state detector 38 detects rotation of the magnet of the crank rotational state detector 38 to detect the rotational state of the crank 12.

The human driving force detector 40 is configured to detect a human driving force input to the human-powered vehicle 10. In an example, the human driving force detector 40 includes a strain sensor. In an example, the strain sensor of the human driving force detector 40 detects strain of the human-powered vehicle 10. In an example, the strain sensor of the human driving force detector 40 is provided on the crank 12. In an example, the strain sensor of the human driving force detector 40 is configured to detect strain of the crank 12 in a case where human driving force is input to the crank 12. The strain sensor of the human driving force detector 40 is provided on at least one of the axle of the rear wheel 20A, the axle of the front wheel 20B, the frame 22F, and the handlebar 22H.

The tire pressure detector 42 is configured to detect air pressure of at least one of the rear wheel 20A and the front wheel 20B. In an example, the tire pressure detector 42 is provided on at least one of the rear wheel 20A and the front wheel 20B.

In an example, the human-powered vehicle 10 includes a power generation unit 44. In an example, the power generation unit 44 includes a hub dynamo provided on at least one of the rear wheel 20A and the front wheel 20B. The hub dynamo generates electric power in accordance with rotation of at least one of the rear wheel 20A and the front wheel 20B. The electric power generated by the power generation unit 44 is, for example, supplied to at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42. In an example, the power generation unit 44 can charge a battery 68 or a battery differing from the battery 68.

In an example, the human-powered vehicle 10 includes the control system 50. In an example, the control system 50 includes the component 52 and at least one communication device 54. The term "communication device" as used herein refers to a hardware device or hardware devices, and does not include a human being. The control system 50 is configured to transmit a predetermined signal between the component 52 and the communication device 54 through wireless communication. In an example, the predetermined signal includes a first signal and a second signal. The first signal is transmitted from the communication device 54 to the component 52. In an example, the first signal includes information related to operation of the component 52. The second signal is transmitted from the component 52 to the communication device 54. In an example, the second signal includes information related to a state of the component 52. In an example, the component 52 and the communication device 54 are configured to perform wireless communication using a communication method including at least one of Bluetooth®, ANT+®, Wi-Fi®, and infrared communication. The component 52 and the communication device 54 can be configured to perform wireless communication using an original communication method differing from Bluetooth®, ANT+®, Wi-Fi®, and versatile infrared communication.

Figure 4:
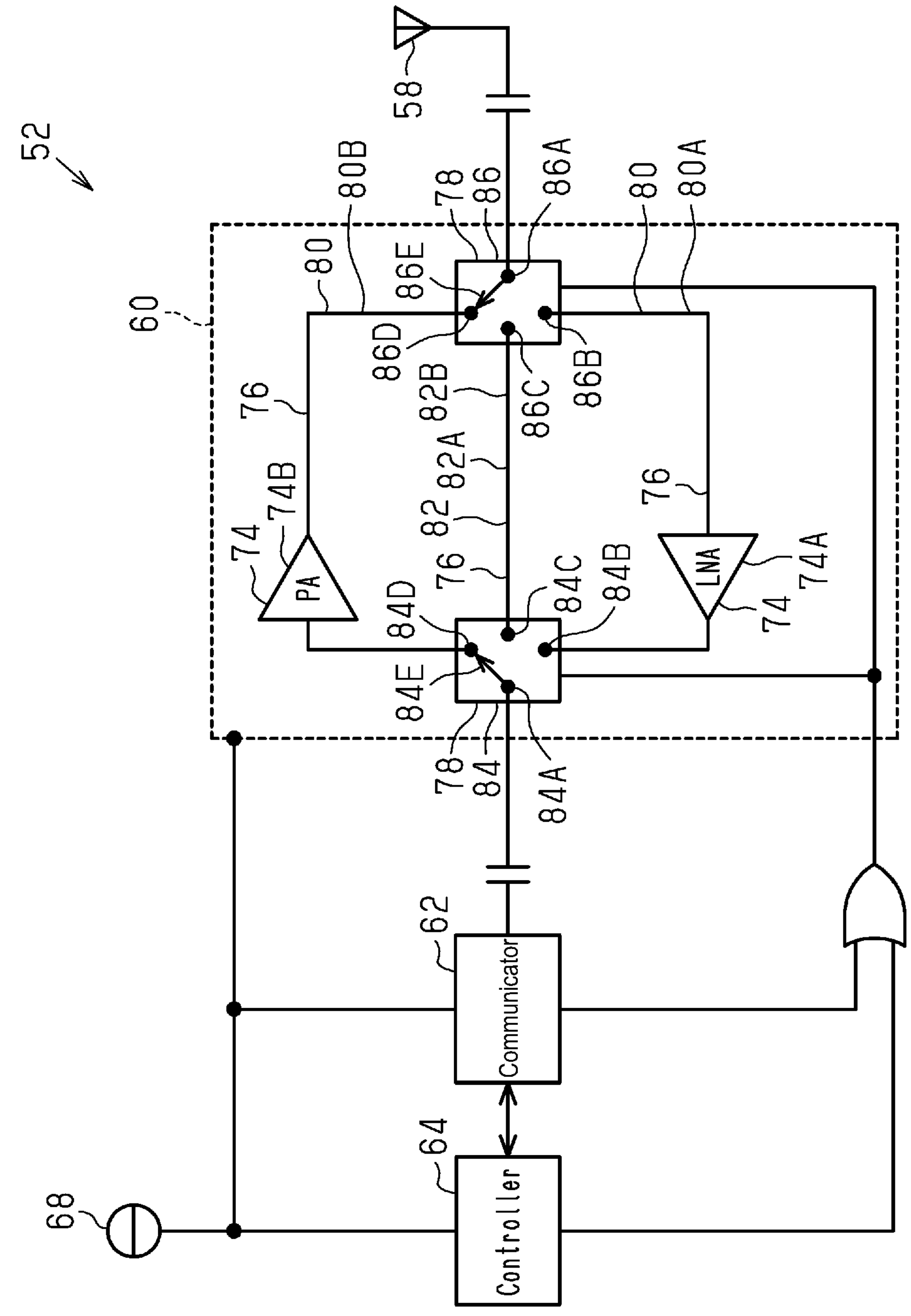
FIG. 4 is a block diagram showing the electrical configuration of the human-powered vehicle component shown in FIG. 3.

In an example, the component 52 shown in FIGS. 2 and 4 includes at least one of the operating device 24, the transmission device 26, the drive unit 28, the brake 30, the adjustable seatpost 32, the suspension 34, the display device 36, the crank rotational state detector 38, the human driving force detector 40, and the tire pressure detector 42.

The component 52 of the present embodiment includes the transmission device 26. In an example, the transmission device 26 includes a derailleur 26X. In an example, the derailleur 26X includes at least one of the rear derailleur 26A and the front derailleur 26B. In a case where the component 52 includes the derailleur 26X, the first signal includes, for example, information related to the shift stage of the derailleur 26X. In an example, the second signal includes information related to the shift stage of the derailleur 26X, information related to a shifting initiation of the derailleur 26X and a shifting completion of the derailleur 26X. In a case where the component 52 includes the derailleur 26X, the derailleur 26X is configured to change the shift stage in accordance with the first signal.

In an example, the at least one communication device 54 includes at least one of the operating device 24, the drive unit 28, the brake 30, the adjustable seatpost 32, the suspension 34, the display device 36, the crank rotational state detector 38, the human driving force detector 40, and the tire pressure detector 42. In an example, in a case where the transmission device 26 includes one of the rear derailleur 26A and the front derailleur 26B, the communication device 54 can include the other of the rear derailleur 26A and the front derailleur 26B. In an example, the communication device 54 is configured to transmit the first signal to the transmission device 26 through wireless communication.

The communication device 54 of the present embodiment includes the operating device 24. In an example, the operating device 24 of the communication device 54 includes a shifter that operates the transmission device 26.

In an example, the at least one communication device 54 includes at least one transmitter 56. The at least one transmitter 56 transmits a predetermined signal. In an example, the control system 50 includes the component 52 and the at least one transmitter 56. In an example, the at least one transmitter 56 includes at least one of the operating device 24, the drive unit 28, the brake 30, the adjustable seatpost 32, the suspension 34, the display device 36, the crank rotational state detector 38, the human driving force detector 40, and the tire pressure detector 42.

In an example, the transmitter 56 is configured to transmit the first signal to the component 52 through wireless communication. Thus, the transmitter 56 can be referred to as a wireless transmitter. In an example, in a case where the shifter is operated, the transmitter 56 of the present embodiment transmits the first signal to the transmission device 26. The transmitter 56 can be formed separately from the communication device 54.

In an example, the communication device 54 includes an additional antenna 54A, an additional amplifier 54B, an additional communicator 54C, and an additional controller 54D. The additional controller 54D can also be referred to as an additional electronic controller. The terms "controller" and "electronic controller" as used herein refer to a hardware device or hardware devices that executes a software program, and does not include a human being. The additional antenna 54A is configured to perform at least one of transmission of the first signal and reception of the second signal with the component 52. The additional amplifier 54B is electrically connected to the additional antenna 54A. The additional amplifier 54B amplifies the predetermined signal, received from the additional antenna 54A, in intensity. The additional communicator 54C performs at least one of reception of the second signal and transmission of the first signal via the additional amplifier 54B.

In an example, the additional controller 54D is configured to control the communication device 54. The additional controller 54D can include additional storage. The additional storage can be any computer storage device or any non-transitory computer-readable medium with the sole exception of a transitory, propagating signal. In an example, the additional storage stores control programs and information used for various control processes. In an example, the additional storage includes at least one of a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The component 52 includes an antenna 58, an amplifier 60, and a communicator 62, and an electronic controller 64 (hereinafter referred to as the controller 64). In an example, the component 52 is configured to receive the first signal via the antenna 58. In an example, the component 52 further includes a housing 66. In an example, the housing 66 is provided on the body 22. In an example, the communicator 62, the controller 64, and the battery 68 are provided on the housing 66. In an example, the antenna 58 is provided on the housing 66. In an example, the antenna 58, the amplifier 60, the communicator 62, and the controller 64 are provided on an electric substrate accommodated in the housing 66.

In an example, the component 52 further includes an actuator 70. In an example, the actuator 70 includes an electric motor. In an example, the actuator 70 is provided on the housing 66. In an example, the component 52 performs a predetermined action using the actuator 70. In an example, in a case where an action request is received, the component 52 drives the actuator 70 for a predetermined period. In an example, the action request is set in a case where the first signal is received. The component 52 can exclude the actuator 70. The component 52 can include an electric part that differs from the actuator 70. In an example, in a case where the component 52 includes an electric part differing from the actuator 70, the component 52 can change the state of electric power supplied to the electric part.

The actuator 70 of the present embodiment is the actuator of the transmission device 26. The actuator 70 is configured to be actuated in accordance with the first signal. The transmission device 26 performs a shifting action that shifts the transmission ratio in accordance with the first signal. In an example, the component 52 includes a drive unit 70A that controls actuation of the actuator 70. The actuator 70 is connected to the controller 64 through the drive unit 70A. The controller 64 is configured to actuate the actuator 70 in accordance with a predetermined signal. The controller 64 is configured to actuate the actuator 70 in accordance with the first signal. In an example, the drive unit 70A is configured to transmit a completion signal to the controller 64 upon completion of actuation of the actuator 70.

In an example, the component 52 further includes the battery 68. The battery 68 includes, for example, one or more battery elements. The battery element includes, for example, a rechargeable battery. The battery 68 is electrically connected to the amplifier 60, the communicator 62, and the controller 64. In an example, the battery 68 is configured to supply electric power to the communicator 62. In an example, the battery 68 is configured to supply electric power to the controller 64 and the amplifier 60. The battery 68 is configured to supply electric power to the actuator 70. The battery 68 can be accommodated in the housing 66 or can be detachably mounted on the housing 66.

In an example, the component 52 further includes a detector 72. In an example, the detector 72 is configured to detect the state of the human-powered vehicle 10. The detector 72 is connected to the controller 64 to perform wired or wireless communication with the controller 64. The detector 72 is configured to transmit information related to the human-powered vehicle 10 to the controller 64. In an example, the detector 72 is provided on the housing 66. The detector 72 can be provided separately from the component 52.

In an example, the state of the human-powered vehicle 10 includes at least one of a vehicle body state of the human-powered vehicle 10, a traveling state of the human-powered vehicle 10, and a state of a rider of the human-powered vehicle 10. In an example, the vehicle body state of the human-powered vehicle 10 includes at least one of vibration of the human-powered vehicle 10 and inclination of the human-powered vehicle 10. In an example, the traveling state of the human-powered vehicle 10 includes whether the human-powered vehicle 10 is traveling, the travel speed of the human-powered vehicle 10, and the inclination angle of the road on which the human-powered vehicle 10 is traveling. In an example, the state of the rider of the human-powered vehicle 10 includes whether the rider mounts the human-powered vehicle 10, the posture of the rider, and the amount of a human driving force of the rider.

The detector 72 detects an action of the human-powered vehicle 10 in accordance with the vehicle body state of the human-powered vehicle 10, the traveling state of the human-powered vehicle 10, and the state of the rider of the human-powered vehicle 10. In an example, in a case where the detector 72 detects an action of the human-powered vehicle 10, the detector 72 is configured to output a detection signal related to the state of the human-powered vehicle 10 to the controller 64. Alternatively, the detector 72 can be configured to output a detection signal to the display device 36.

In an example, the detector 72 is configured to detect a parameter for determining whether a rider is using the human-powered vehicle 10. In an example, the detector 72 is configured to detect a parameter that changes in a case where a rider is using the human-powered vehicle 10. In an example, the case where the rider is using the human-powered vehicle 10 includes at least a state in which the human-powered vehicle 10 is traveling. In an example, the case where the rider is using the human-powered vehicle 10 includes all of a state in which the human-powered vehicle 10 is traveling, a state in which the rider mounts the human-powered vehicle 10 that is in a stopped state, and a state in which the rider is pushing and walking the human-powered vehicle 10.

In an example, the detector includes 72 at least one of a vibration sensor 72A, an acceleration sensor 72B, an inclination sensor 72C, a gyro sensor 72D, a pressure sensor 72E, a switch 72F, a cadence sensor 72G, a vehicle speed sensor 72H, and a force sensor 72J. The term "sensor" as used herein refers to a hardware device or instrument designed to detect the presence or absence of a particular event, object, substance, or a change in its environment, and to emit a signal in response. The term "sensor" as used herein do not include a human being.

In an example, the vibration sensor 72A is configured to detect vibration of the human-powered vehicle 10. In an example, the vibration sensor 72A is provided on at least one of the housing 66 and the body 22.

In an example, the acceleration sensor 72B is configured to detect at least one of vibration of the human-powered vehicle 10 and acceleration of the human-powered vehicle 10. The acceleration sensor 72B can include the vehicle speed sensor 72H. In a case where the acceleration sensor 72B includes the vehicle speed sensor 72H, the controller 64 can differentiate the vehicle speed to obtain the acceleration. In an example, the acceleration sensor 72B is provided on at least one of the housing 66, the crank 12, and the body 22.

In an example, the inclination sensor 72C is configured to detect at least one of the inclination of the human-powered vehicle 10, whether the human-powered vehicle 10 is traveling, and the inclination angle of the road on which the human-powered vehicle 10 is traveling. In an example, the inclination sensor 72C is provided on at least one of the housing 66 and the body 22.

The gyro sensor 72D is configured to detect at least one of the inclination of the human-powered vehicle 10, whether the human-powered vehicle 10 is traveling, the travel speed of the human-powered vehicle 10, and the inclination angle of the road on which the human-powered vehicle 10 is traveling. In an example, the gyro sensor 72D is provided on at least one of the housing 66, the crank 12, and the body 22.

The pressure sensor 72E is configured to detect at least one of whether the rider mounts, the posture of the rider, and human driving force of the rider. In an example, the pressure sensor 72E is provided on at least one of the handlebar 22H, the crank 12, a pedal, and the saddle 22S. In a case where the component 52 includes at least one of the adjustable seatpost 32 and the suspension 34, the pressure sensor 72E can be provided on the housing 66.

The switch 72F is configured to detect at least one of whether the rider mounts the human-powered vehicle 10 and the posture of the rider. In an example, the switch 72F is provided on at least one of the handlebar 22H, the crank 12, the pedal, and the saddle 22S. In an example, the switch 72F can be provided on at least one of the crank 12, the pedal, and the saddle 22S. In a case where the component 52 includes at least one of the adjustable seatpost 32 and the suspension 34, the switch 72F can be provided on the housing 66.

In an example, the cadence sensor 72G is configured to detect a rotational state of the crank 12. In an example, the cadence sensor 72G detects a rotational speed of the crank 12. In an example, the cadence sensor 72G is provided on the crank 12 or the frame 22F. The cadence sensor 72G can be configured to detect human driving force. In an example, the cadence sensor 72G can include a power meter provided on the crank 12 or the pedal. In an example, the cadence sensor 72G can include a torque sensor provided on the crank 12. In a case where the cadence sensor 72G is configured to detect a human driving force, the detector 72 can be configured to detect the rotational state of the crank 12 from variation of the human driving force.

The vehicle speed sensor 72H is configured to detect at least one of whether the human-powered vehicle 10 is traveling and the travel speed of the human-powered vehicle 10. In an example, the vehicle speed sensor 72H is provided on the frame 22F and detects the magnetism of a magnet attached to at least one of the rear wheel 20A and the front wheel 20B. In an example, the vehicle speed sensor 72H detects a rotational speed of at least one of the rear wheel 20A and the front wheel 20B. The vehicle speed sensor 72H can detect the magnetism of a magnet attached to a member that integrally rotates with the rear sprocket 18.

In an example, the force sensor 72J is configured to detect human driving force. The human driving force is input by the rider from the pedal to the crank 12. In an example, the force sensor 72J includes a power meter provided on the crank 12 or the pedal. In an example, the force sensor 72J includes a torque sensor provided on the crank 12. In an example, the detector 72 is configured to detect at least one of whether the human-powered vehicle 10 is traveling and the travel speed of the human-powered vehicle 10 from the human driving force detected by the force sensor 72J.

The controller 64 determines whether the human-powered vehicle 10 is in a use state in accordance with a detection signal related to the state of the human-powered vehicle 10 output from the detector 72. In an example, a case where the human-powered vehicle 10 is in the use state includes at least one of a state in which the rider mounts the human-powered vehicle 10, a state in which the rider is pushing and walking the human-powered vehicle 10, and a state in which the rider is operating the human-powered vehicle 10. The controller 64 determines whether the human-powered vehicle 10 is in any of the use state and a predetermined state in accordance with a detection signal related to the state of the human-powered vehicle 10 output from the detector 72. In an example, the predetermined state refers to a state in which the human-powered vehicle 10 is not used by the rider. In an example, in a case where the human-powered vehicle 10 is not in the use state, the controller 64 determines that the human-powered vehicle 10 is in the predetermined state.

In an example, in a case where the detector 72 includes at least one of the vibration sensor 72A and the acceleration sensor 72B, the controller 64 determines whether the human-powered vehicle 10 is in the use state in accordance with a vibration of the human-powered vehicle 10. In an example, in a case where the amount of the vibration of the human-powered vehicle 10 is greater than or equal to a predetermined amount, the controller 64 determines the human-powered vehicle 10 is in the use state.

In an example, in a case where the detector 72 includes the acceleration sensor 72B, the controller 64 determines whether the human-powered vehicle 10 is in the use state in accordance with an acceleration of the human-powered vehicle 10. In an example, in a case where the acceleration of the human-powered vehicle 10 is greater than or equal to a predetermined acceleration, the controller 64 determines that the human-powered vehicle 10 is in the use state.

In an example, in a case where the detector 72 includes at least one of the inclination sensor 72C and the gyro sensor 72D, the controller 64 determines whether the human-powered vehicle 10 is in the use state in accordance with the inclination of the human-powered vehicle 10, whether the human-powered vehicle 10 is traveling, and the inclination angle of the road on which the human-powered vehicle 10 is traveling. In an example, in a case where a change amount of the inclination of the human-powered vehicle 10 is greater than or equal to a predetermined amount, the controller 64 determines that the human-powered vehicle 10 is in the use state. In an example, in a case where the change amount of the inclination angle of the road on which the human-powered vehicle 10 is traveling is greater than or equal to a predetermined angle, the controller 64 determines that the human-powered vehicle 10 is in the use state. In an example, in a case where the change amount of the inclination of the human-powered vehicle 10 or the change amount of the inclination angle of the road on which the human-powered vehicle 10 is traveling is greater than or equal to the predetermined angle, the controller 64 determines that the human-powered vehicle 10 is traveling. In an example, in a case where the human-powered vehicle 10 is traveling, the controller 64 determines the human-powered vehicle 10 is in the use state.

In an example, in a case where the detector 72 includes the pressure sensor 72E and the pressure is greater than or equal to a predetermined pressure and/or a state in which the pressure is greater than or equal to the predetermined pressure continues over a predetermined period or longer, the controller 64 determines the human-powered vehicle 10 is in the use state.

In an example, in a case where the detector 72 includes the switch 72F and the switch 72F outputs an activation signal, the controller 64 determines that the human-powered vehicle 10 is in the use state. In an example, in a case where a pressed state continues over the predetermined period or longer, the switch 72F outputs the activation signal. In an example, in a case where the pressed state is changed to a release state, the switch 72F can be configured to output the activation signal.

In an example, in a case where the detector 72 includes the cadence sensor 72G, the controller 64 determines whether the human-powered vehicle 10 is in the use state in accordance with the rotational state of the crank 12. In an example, in a case where the crank 12 is rotating, the controller 64 determines the human-powered vehicle 10 is in the use state. In an example, in a case where the rotational speed of the crank 12 is greater than or equal to a predetermined speed, the controller 64 can be configured to determine that the human-powered vehicle 10 is in the use state.

In an example, in a case where the detector 72 includes the vehicle speed sensor 72H, the controller 64 determines that the human-powered vehicle 10 is in the use state in accordance with the vehicle speed. In an example, in a case where the vehicle speed is greater than or equal to a predetermined vehicle speed, the controller 64 determines that the human-powered vehicle 10 is in the use state.

In an example, in a case where the detector 72 includes the force sensor 72J, the controller 64 determines whether the human-powered vehicle 10 is in the use state in accordance with a human driving force. In an example, in a case where the human driving force is greater than or equal to a predetermined human driving force, the controller 64 determines that the human-powered vehicle 10 is in the use state.

The antenna 58 is configured to perform at least one of reception of a predetermined signal and transmission of a predetermined signal with the at least one communication device 54 that differs from the component 52. In an example, the antenna 58 is configured to perform at least one of reception of the first signal and transmission of the second signal with the communication device 54. The antenna 58 receives a predetermined signal from the at least one transmitter 56 differing from the component 52. The antenna 58 receives the first signal from the at least one transmitter 56 differing from the component 52.

In an example, the controller 64 includes a predetermined control program and a processor that executes a control process. The processor includes, for example, a central processing unit (CPU) or a micro processing unit (MPU). The controller 64 can include one or more microcomputers. The controller 64 can include multiple processors arranged at separate locations. The controller 64 can include storage. The storage can be any computer storage device or any non-transitory computer-readable medium with the sole exception of a transitory, propagating signal. In an example, the storage stores control programs and information used for various control processes. In an example, the storage includes at least one of a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

In an example, the controller 64 is configured to control the actuator 70 in accordance with information related to operation of the component 52 in the first signal. In an example, the controller 64 is configured to output information related to the state of the component 52 to the communicator 62 so that the second signal is transmitted from the antenna 58.

In an example, the communicator 62 is a wireless communicator. The communicator 62 receives the first signal from the at least one transmitter 56 differing from the component 52. In an example, the communicator 62 is configured to perform wireless communication with the communication device 54 using the antenna 58. In an example, the communicator 62 is configured to perform wireless communication with the transmitter 56 using the antenna 58. In an example, the communicator 62 can be configured to perform wireless communication with multiple communication devices 54. In an example, the communicator 62 includes a radio frequency integrated circuit (RFIC). The communicator 62 can separately include a receiver that receives the first signal and a transmitter that transmits the second signal.

The communicator 62 performs at least one of reception of a predetermined signal and transmission of a predetermined signal via the amplifier 60. The predetermined signal of the present embodiment includes the first signal and the second signal. In the present embodiment, the first signal corresponds to a predetermined signal transmitted from the transmitter 56 to the component 52. In the present embodiment, the second signal corresponds to a predetermined signal transmitted from the component 52 to the communication device 54.

The communicator 62 transmits the predetermined signal via the antenna 58 and the amplifier 60. The communicator 62 transmits the second signal to the communication device 54 via the antenna 58 and the amplifier 60. The communicator 62 receives the predetermined signal via the amplifier 60. The communicator 62 receives the first signal via the amplifier 60.

The communicator 62 is electrically connected to the controller 64. In a case where the communicator 62 receives the first signal, the communicator 62 outputs information related to the first signal to the controller 64. In an example, the information related to the first signal includes information related to operation of the component 52. In a case where information related to the second signal is received from the controller 64, the communicator 62 transmits the second signal through the antenna 58. In an example, the information related to the second signal includes information related to the state of the component 52.

In an example, the amplifier 60 is an amplifier. The amplifier 60 is electrically connected to the antenna 58. An amplification circuit 74 amplifies a predetermined signal in intensity. The amplifier 60 amplifies a predetermined signal received from the antenna 58 in intensity. In an example, the amplifier 60 amplifies the voltage of a signal. In an example, the amplifier 60 amplifies the first signal, received from the antenna 58, in intensity. In an example, the amplifier 60 amplifies a predetermined signal received from the communicator 62 in intensity. In an example, the amplifier 60 amplifies the second signal, received from the communicator 62, in intensity.

The amplifier 60 includes the amplification circuit 74, transfer paths 76, and a switching unit 78. The amplification circuit 74 includes a first amplification circuit 74A and a second amplification circuit 74B. In an example, the first amplification circuit 74A includes a low noise amplifier. In an example, the second amplification circuit 74B includes a power amplifier.

The transfer paths 76 include a first transfer path 80 and a second transfer path 82. The first transfer path 80 transmits a predetermined signal between the antenna 58 and the communicator 62 via the amplification circuit 74. The second transfer path 82 transmits a predetermined signal between the antenna 58 and the communicator 62 without using the amplification circuit 74. In a case where the first transfer path 80 is selected from the transfer paths 76, the predetermined signal travels between the antenna 58 and the communicator 62 via the amplification circuit 74. In a case where the second transfer path 82 is selected from the transfer paths 76, the predetermined signal travels between the antenna 58 and the communicator 62 without traveling through the amplification circuit 74.

In an example, the first transfer path 80 includes a first reception transfer path 80A that transfers a predetermined signal, received by the antenna 58, to the communicator 62 via the amplification circuit 74. In an example, the first transfer path 80 includes a first transmission transfer path 80B that transfers a predetermined signal, output from the communicator 62, to the antenna 58 via the amplification circuit 74. In a case where the first reception transfer path 80A is selected from the first transfer path 80, the predetermined signal transfers from the antenna 58 to the communicator 62 via the first amplification circuit 74A. In a case where the first transmission transfer path 80B is selected from the first transfer path 80, the predetermined signal transfers from the communicator 62 to the antenna 58 via the second amplification circuit 74B.

In an example, the second transfer path 82 includes a second reception transfer path 82A that transfers a predetermined signal, received by the antenna 58, to the communicator 62 without using the amplification circuit 74. In a case where the second transfer path 82 is selected from the transfer paths 76, a predetermined signal travels between the communicator 62 and the antenna 58 via the second reception transfer path 82A. In an example, the second transfer path 82 includes a second transmission transfer path 82B that transfers the second signal from the communicator 62 to the antenna 58 without using the amplification circuit 74. The second transmission transfer path 82B and the second reception transfer path 82A are configured as the same line.

The switching unit 78 selects one of the transfer paths 76. In an example, the switching unit 78 includes a latching relay. The switching unit 78 can include a transistor. In an example, the switching unit 78 includes a first switching portion 84 and a second switching portion 86. The first switching portion 84 includes a first connection terminal 84A, a first terminal 84B, a second terminal 84C, a third terminal 84D, and a first arm 84E.

The first switching portion 84 is configured to electrically connect the first connection terminal 84A to any one of the first terminal 84B, the second terminal 84C, and the third terminal 84D by the first arm 84E. The first connection terminal 84A is electrically connected to the communicator 62.

The second switching portion 86 includes a second connection terminal 86A, a fourth terminal 86B, a fifth terminal 86C, a sixth terminal 86D, and a second arm 86E. The second switching portion 86 is configured to electrically connect the second connection terminal 86A to any one of the fourth terminal 86B, the fifth terminal 86C, and the sixth terminal 86D by the second arm 86E. The second connection terminal 86A is electrically connected to the antenna 58.

The first terminal 84B is electrically connected to the fourth terminal 86B by the first amplification circuit 74A. The second terminal 84C is electrically connected to the fifth terminal 86C. The third terminal 84D is electrically connected to the sixth terminal 86D by the second amplification circuit 74B.

The switching unit 78 is configured to switch the connection state of the first arm 84E and the second arm 86E to select one of the transfer paths 76. At least one of the communicator 62 and the controller 64 is electrically connected to the amplifier 60. At least one of the communicator 62 and the controller 64 is configured to switch the connection state of the first arm 84E and the second arm 86E.

In a case where the first connection terminal 84A is connected to the first terminal 84B and the second connection terminal 86A is connected to the fourth terminal 86B, the first transfer path 80 is selected from the transfer paths 76. In a case where the first connection terminal 84A is connected to the first terminal 84B and the second connection terminal 86A is connected to the fourth terminal 86B, the first reception transfer path 80A is selected from the first transfer path 80. In the present embodiment, in a case where the first reception transfer path 80A is selected, the communicator 62 is allowed to receive the first signal that is amplified by the first amplification circuit 74A and the antenna 58 is not allowed to transmit the second signal.

In a case where the first connection terminal 84A is connected to the second terminal 84C and the second connection terminal 86A is connected to the fifth terminal 86C, the second transfer path 82 is selected from the transfer paths 76. In the present embodiment, in a case where the second transfer path 82 is selected, the communicator 62 is allowed to receive the first signal that is not amplified by the first amplification circuit 74A and the antenna 58 is allowed to transmit the second signal that is not amplified by the second amplification circuit 74B.

In a case where the first connection terminal 84A is connected to the third terminal 84D and the second connection terminal 86A is connected to the sixth terminal 86D, the first transfer path 80 is selected from the transfer paths 76. In a case where the first connection terminal 84A is connected to the third terminal 84D and the second connection terminal 86A is connected to the sixth terminal 86D, the first transmission transfer path 80B is selected from the first transfer path 80. In the present embodiment, in a case where the first transmission transfer path 80B is selected, the communicator 62 is not allowed to receive the first signal and the antenna 58 is allowed to transmit the second signal that is amplified by the second amplification circuit 74B.

The controller 64 is configured to control the communicator 62. In an example, the controller 64 is configured to switch the state of the communicator 62 between an activation state and a standby state. The communicator 62 is configured to perform at least one of reception of the first signal and transmission of the second signal in the activation state and is configured not to perform any of reception of the first signal and transmission of the second signal in the standby state. In the present embodiment, the communicator 62 is configured to receive the first signal in the activation state and not to receive the first signal in the standby state. Power consumption of the controller 64 in the standby state is less than power consumption of the communicator 62 in the activation state. The controller 64 can stop the supply of electric power from the battery 68 to the communicator 62 so that the communicator 62 enters the standby state.

Figure 9:
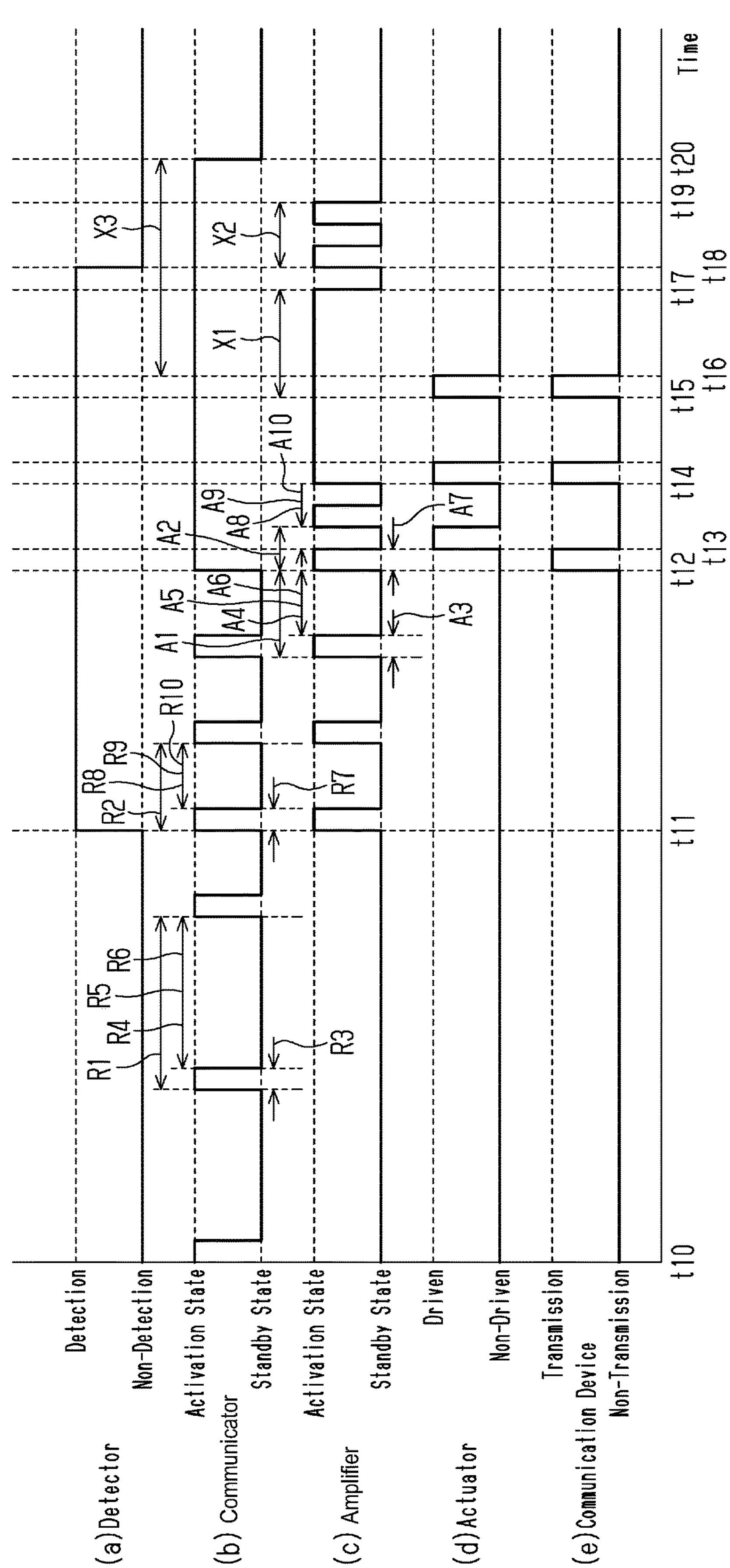
FIG. 9 is a timing chart showing a first example of changes in the states of a communicator, an amplifier, and the actuator shown in FIG. 3.

As shown in FIGS. 3 and 9, the controller 64 is configured to control the communicator 62 so that the communicator 62 continuously receives the first signal or the communicator 62 intermittently receives the first signal. In a case where the communicator 62 continuously receives, the controller 64 controls the communicator 62 so that the activation state of the communicator 62 is maintained over a predetermined period. In a case where the communicator 62 intermittently receives, the controller 64 controls the communicator 62 so that the activation state and the standby state of the communicator 62 are repeated in accordance with a reception cycle. In an example, the reception cycle includes the first reception cycle R1 and the second reception cycle R2. In an example, the second reception cycle R2 differs from the first reception cycle R1.

In an example, the first reception cycle R1 refers to a period from when the communicator 62 is changed from the standby state to the activation state until the next time the communicator 62 is changed from the standby state to the activation state. The first reception cycle R1 includes a first reception period R3. The controller 64 is configured to control the communicator 62 so that the communicator 62 receives the first signal in the first reception period R3. In the first reception period R3, the controller 64 controls the communicator 62 so that the activation state of the communicator 62 is maintained over the first reception period R3.

In an example, the first reception cycle R1 further includes a first reception interval R4 that is from the first reception period R3 to the following first reception period R3. In the first reception interval R4, the controller 64 controls the communicator 62 so that the standby state of the communicator 62 is maintained over the first reception interval R4. In an example, the first reception interval R4 includes a first low sensitivity period R5. In an example, the controller 64 is configured to control the communicator 62 so that a reception sensitivity of the communicator 62 in the first low sensitivity period R5 is lower than a reception sensitivity of the communicator 62 in the first reception period R3. In the first low sensitivity period R5, the communicator 62 is in the standby state. Thus, a reception sensitivity of the communicator 62 in the first low sensitivity period R5 is lower than a reception sensitivity of the communicator 62 in the first reception period R3.

In an example, the first low sensitivity period R5 includes a first non-reception period R6. In an example, the controller 64 is configured to control the communicator 62 so that the communicator 62 does not receive the first signal in the first non-reception period R6. In the first non-reception period R6, the communicator 62 is in the standby state. Thus, the communicator 62 does not receive the first signal in the first non-reception period R6.

The second reception cycle R2 refers to a period from when the communicator 62 is changed from the standby state to the activation state until the next time the communicator 62 is changed from the standby state to the activation state. The second reception cycle R2 includes a second reception period R7. The controller 64 is configured to control the communicator 62 so that the communicator 62 receives the first signal in the second reception period R7. In the second reception period R7, the controller 64 controls the communicator 62 so that the activation state of the communicator 62 is maintained over the second reception period R7.

In an example, the second reception cycle R2 further includes a second reception interval R8 that is from the second reception period R7 to the following second reception period R7. In the second reception interval R8, the controller 64 controls the communicator 62 so that the standby state of the communicator 62 is maintained over the second reception interval R8. In an example, the second reception interval R8 includes a second low sensitivity period R9. In an example, the controller 64 is configured to control the communicator 62 so that a reception sensitivity of the communicator 62 in the second low sensitivity period R9 is lower than a reception sensitivity of the communicator 62 in the second reception period R7. In the second low sensitivity period R9, the communicator 62 is in the standby state. Thus, the reception sensitivity of the communicator 62 in the second low sensitivity period R9 is lower than the reception sensitivity of the communicator 62 in the second reception period R7.

In an example, the second low sensitivity period R9 includes a second non-reception period R10. In an example, the controller 64 is configured to control the communicator 62 so that the communicator 62 does not receive the first signal in the second non-reception period R10. In the second non-reception period R10, the communicator 62 is in the standby state. Thus, the communicator 62 does not receive the first signal in the second non-reception period R10.

The controller 64 is configured to control the communicator 62 so that the first reception cycle R1 is longer than the second reception cycle R2. The first reception cycle R1 is, for example, 60 seconds. The second reception cycle R2 is, for example, 1.5 seconds. In an example, the controller 64 is configured to control the communicator 62 so that the first reception period R3 equals the second reception period R7. The first reception period R3 and the second reception period R7 are, for example, 15 microseconds. In an example, the first reception interval R4 is longer than the second reception interval R8. In an example, the first reception interval R4 is longer than the first reception period R3. In an example, the second reception interval R8 is longer than the second reception period R7.

The controller 64 is configured to control the amplifier 60. The state of the amplifier 60 is configured to be switched between the activation state and the standby state. The amplifier 60 is configured to amplify a predetermined signal in intensity in the activation state and is configured not to amplify a predetermined signal in the standby state. The amplifier 60 is configured to amplify the first signal in intensity in the activation state and is configured not to amplify the first signal in intensity in the standby state. The amplifier 60 is configured to amplify the second signal in intensity in the activation state and is configured not to amplify the second signal in intensity in the standby state.

In an example, the controller 64 switches the transfer paths 76 between the first transfer path 80 and the second transfer path 82 to switch the state of the amplifier 60 between the activation state and the standby state. In a case where the first transfer path 80 is selected from the transfer paths 76, the amplifier 60 is in the activation state. In a case where the second transfer path 82 is selected from the transfer paths 76, the amplifier 60 is in the standby state.

The controller 64 is configured to control the amplifier 60 so that the amplifier 60 continuously amplifies the predetermined signal, the amplifier 60 intermittently amplifies the predetermined signal, or the amplifier 60 enters sleep mode. In a case where the amplifier 60 continuously amplifies, the amplifier 60 is controlled by the controller 64 so as to be maintained in the activation state over the predetermined period. In a case where the amplifier 60 intermittently amplifies, the amplifier 60 is controlled by the controller 64 so as to repeat the activation state and the standby state in accordance with an amplification cycle. In an example, the amplification cycle includes a first amplification cycle A1 and a second amplification cycle A2. The second amplification cycle A2 differs from the first amplification cycle A1. In a case where the amplifier 60 enters sleep mode, the amplifier 60 is controlled by the controller 64 so that the standby state is maintained over the predetermined period.

The first amplification cycle A1 refers to a length of time from when the amplifier 60 is changed from the standby state to the activation state until the next time the amplifier 60 is changed from the standby state to the activation state. In an example, the first amplification cycle A1 includes a first amplification period A3. The controller 64 is configured to control the amplifier 60 so that the amplifier 60 amplifies the predetermined signal over the first amplification period A3. In the first amplification period A3, the controller 64 controls the amplifier 60 so that the activation state of the amplifier 60 is maintained over the first amplification period A3.

In an example, the first amplification cycle A1 further includes a first amplification interval A4 that is from the first amplification period A3 to the following first amplification period A3. In the first amplification interval A4, the controller 64 controls the amplifier 60 so that the standby state of the amplifier 60 is maintained over the first amplification interval A4. In an example, the first amplification interval A4 includes a first low amplification period A5. In an example, the controller 64 is configured to control the amplifier 60 in the first low amplification period A5 so that the amplifier 60 amplifies the predetermined signal at a degree lower than an amplification degree of the predetermined signal in the first amplification period A3. In the first low amplification period A5, the amplifier 60 is in the standby state. Thus, an amplification degree of the predetermined signal in the first low amplification period A5 is lower than the amplification degree of the predetermined signal in the first amplification period A3.

In an example, the first low amplification period A5 includes a first non-amplification period A6. In an example, the controller 64 is configured to control the amplifier 60 so that the amplifier 60 does not amplify the predetermined signal in intensity in the first non-amplification period A6. In the first non-amplification period A6, the amplifier 60 is in the standby state. Thus, the amplifier 60 does not amplify the predetermined signal in the first non-amplification period A6.

The second amplification cycle A2 refers to a length of time from when the amplifier 60 is changed from the standby state to the activation state until the next time the amplifier 60 is changed from the standby state to the activation state. In an example, the second amplification cycle A2 includes a second amplification period A7. The controller 64 is configured to control the amplifier 60 so that the amplifier 60 amplifies the predetermined signal over the second amplification period A7. In the second amplification period A7, the controller 64 controls the amplifier 60 so that the activation state of the amplifier 60 is maintained over the second amplification period A7.

In an example, the second amplification cycle A2 further includes a second amplification interval A8 that is from the second amplification period A7 to the following first amplification period A3. In the second amplification interval A8, the controller 64 controls the amplifier 60 so that the standby state of the amplifier 60 is maintained over the second amplification interval A8. In an example, the second amplification interval A8 includes a second low amplification period A9. In an example, the controller 64 is configured to control the amplifier 60 in the second low amplification period A9 so that the amplifier 60 amplifies the predetermined signal in intensity at a degree lower than an amplification degree of the predetermined signal in the second amplification period A7. In the second low amplification period A9, the amplifier 60 is in the standby state. Thus, an amplification degree of the predetermined signal in the second low amplification period A9 is lower than the amplification degree of the predetermined signal in the second amplification period A7.

In an example, the second low amplification period A9 includes a second non-amplification period A10. In an example, the controller 64 is configured to control the amplifier 60 so that the amplifier 60 does not amplify the predetermined signal in intensity in the second non-amplification period A10. In the second non-amplification period A10, the amplifier 60 is in the standby state. Thus, the amplifier 60 does not amplify the predetermined signal in the second non-amplification period A10.

The controller 64 is configured to control the amplifier 60 so that the first amplification cycle A1 is longer than the second amplification cycle A2. The first amplification cycle A1 is, for example, 1.5 seconds. The second amplification cycle A2 is, for example, 0.05 seconds. In an example, the controller 64 is configured to control the amplifier 60 so that the first amplification period A3 equals the second amplification period A7. In an example, the first amplification interval A4 is longer than the second amplification interval A8. In an example, the first amplification interval A4 is longer than the first amplification period A3. In an example, the second amplification interval A8 is longer than the second amplification period A7.

The controller 64 is configured to control the communicator 62 in accordance with a communication control state. The controller 64 is configured to control the amplifier 60 in accordance with an amplification control state. In an example, the controller 64 is configured to control the communicator 62 in accordance with the communication control state and control the amplifier 60 in accordance with the amplification control state.

In an example, the communication control state includes a first communication control state and a second communication control state. In an example, the communication control state includes the first communication control state, the second communication control state, and a third communication control state. Power consumption of the communicator 62 in the second communication control state is greater than power consumption of the communicator 62 in the first communication control state. Power consumption of the communicator 62 in the third communication control state is greater than the power consumption of the communicator 62 in the second communication control state.

The controller 64 is configured to control the communicator 62 in the first communication control state so that the reception cycle of the communicator 62 is the first reception cycle R1. In an example, the controller 64 is configured to control the communicator 62 in the first communication control state so that the communicator 62 intermittently receives the first signal in the first reception cycle R1. The controller 64 is configured to control the communicator 62 in the second communication control state so that the reception cycle of the communicator 62 is the second reception cycle R2. In an example, the controller 64 is configured to control the communicator 62 in the second communication control state so that the communicator 62 intermittently receives the first signal in the second reception cycle R2. In an example, the controller 64 is configured to control the communicator 62 in the third communication control state so that the communicator 62 continuously receives the first signal.

In an example, in a case where the communication control state is one of the first communication control state and the second communication control state, the controller 64 is configured to switch the communication control state to the other one of the first communication control state and the second communication control state in accordance with the state of the human-powered vehicle 10. The control executed by the controller 64 for switching the communication control state from one of the first communication control state and the second communication control state to the other one of the first communication control state and the second communication control state in accordance with the state of the human-powered vehicle 10 corresponds to, for example, a first example of control at time t11 and a fourth example of control at time t52. In an example, in a case where the human-powered vehicle 10 is operated, the controller 64 switches the communication control state from the first communication control state to the second communication control state. In an example, in a case where the human-powered vehicle 10 is continuously not operated for a first period Y1, the controller 64 switches the communication control state from the second communication control state to the first communication control state.

In an example, in a case where the communication control state is the first communication control state, the controller 64 is configured to switch the communication control state to the third communication control state in accordance with the first signal. The control executed by the controller 64 for switching the communication control state from the first communication control state to the third communication control state in accordance with the first signal corresponds to, for example, a second example of control at time t31. In an example, in a case where the first signal is input to the communicator 62, the controller 64 switches the communication control state from the first communication control state to the third communication control state.

In a case where the communication control state is the second communication control state, the controller 64 is configured to switch the communication control state to the third communication control state in accordance with the first signal. The control executed by the controller 64 for switching the communication control state from the second communication control state to the third communication control state in accordance with the first signal corresponds to, for example, the first example of control at time t12. In an example, in a case where the first signal is input to the communicator 62, the controller 64 switches the communication control state from the second communication control state to the third communication control state.

In an example, in a case where the communication control state is the second communication control state, if the communicator 62 does not receive the first signal and the human-powered vehicle 10 is continuously maintained in a predetermined state over the first period Y1 or longer, the controller 64 is configured to switch the communication control state to the first communication control state. The control executed by the controller 64 for switching the communication control state from the second communication control state to the first communication control state if the communicator 62 does not receive the first signal and the human-powered vehicle 10 is continuously maintained in the predetermined state over the first period Y1 or longer corresponds to, for example, the fourth example of control at time t52. In an example, the predetermined state refers to a state in which the human-powered vehicle 10 is not operated. In an example, in a case where the first signal is not received and the human-powered vehicle 10 is continuously not operated for the first period Y1, the controller 64 switches the communication control state from the second communication control state to the first communication control state.

In an example, in a case where the communication control state is one of the first communication control state and the second communication control state, if the communicator 62 receives the first signal, the controller 64 is configured to control the actuator 70 to perform a predetermined operation. In an example, in a case where the communication control state is the third communication control state, if the communicator 62 receives the first signal, the controller 64 is configured to control the actuator 70 in accordance with the first signal.

Figure 5:
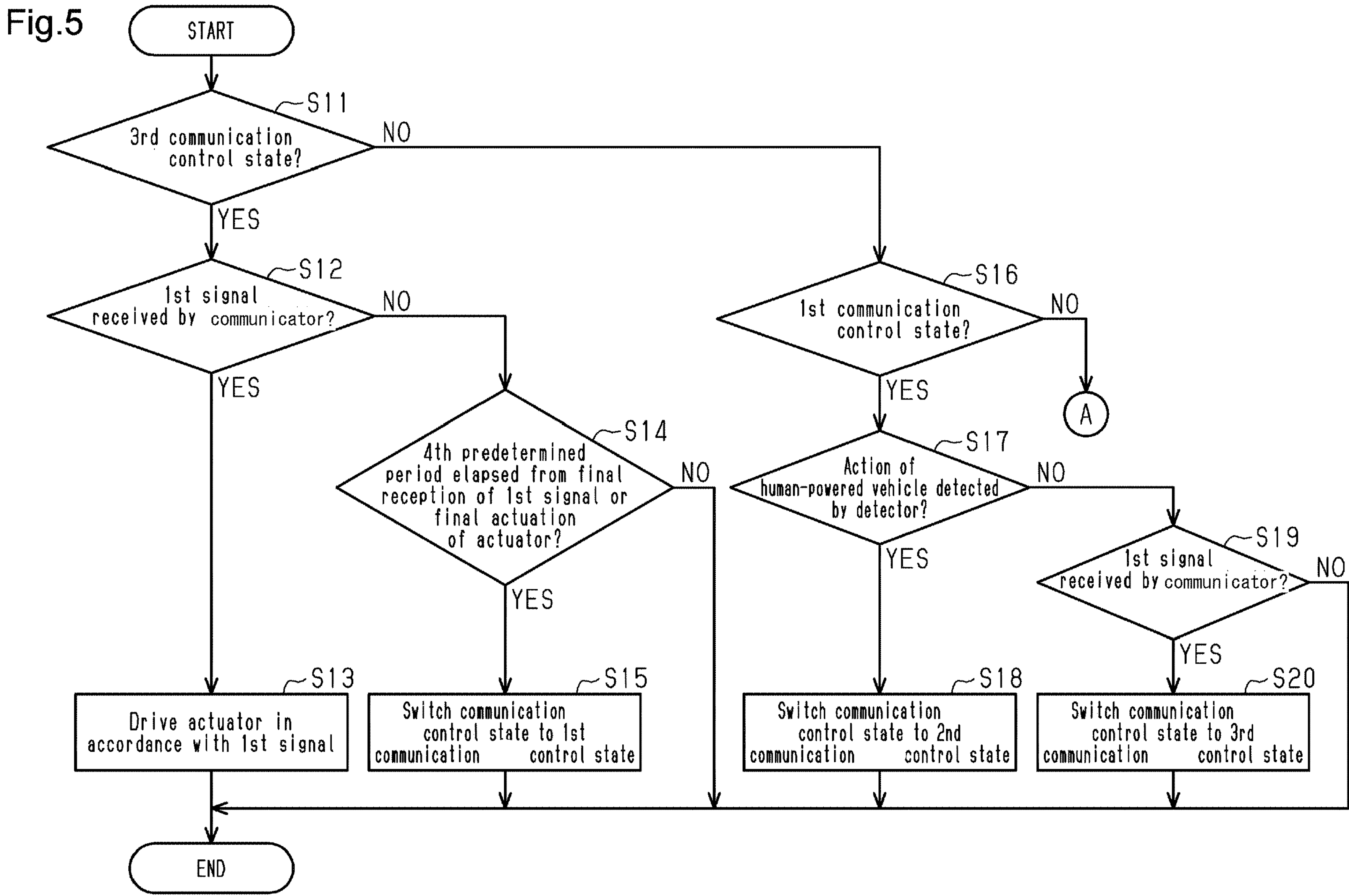
FIG. 5 is a first part of a flowchart of a process for controlling an actuator in accordance with a first signal executed by an electronic controller shown in FIG. 3.
Figure 6:
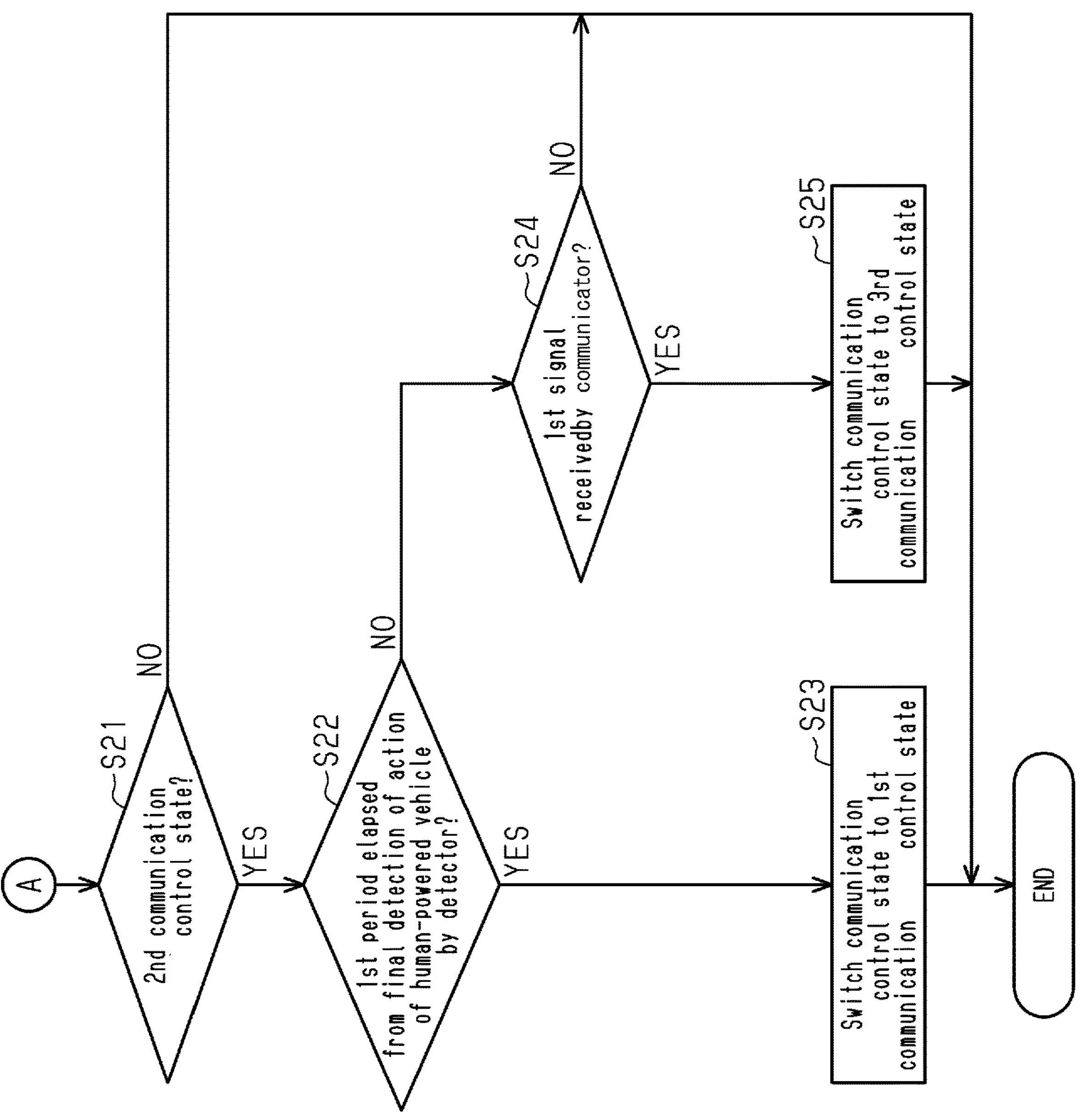
FIG. 6 is a second part of the flowchart of the process for controlling the actuator in accordance with the first signal executed by the electronic controller shown in FIG. 3.

With reference to FIGS. 5 and 6, control executed by the controller 64 on the component 52 will now be described. In an example, in a case where electric power is supplied to the controller 64, the controller 64 starts the process from step S11. In an example, in a case where the process shown in FIGS. 5 and 6 is completed, the controller 64 again starts the process from step S11 after a predetermined period. In a case where electric power is supplied, the communicator 62 can be configured to be activated in any one of the first communication control state, the second communication control state, and the third communication control state. In an example, in a case where electric power is supplied to the controller 64, the controller 64 can set the communication control state to any one of the first communication control state, the second communication control state, and the third communication control state. In an example, in a case where electric power is supplied to the controller 64, the controller 64 is configured to switch the communication control state to the third communication control state and then initially execute step S11. In an example, in a case where electric power is supplied to the controller 64, the controller 64 can be configured to switch the communication control state to the first communication control state and then initially execute step S11. In an example, in a case where electric power is supplied to the controller 64, the controller 64 can be configured to switch the communication control state to the second communication control state and then initially execute step S11.

In step S11, the controller 64 determines whether the communication control state is the third communication control state. In a case where the communication control state is the third communication control state, the controller 64 proceeds to step S12. In step S12, the controller 64 determines whether the first signal is received by the communicator 62. In an example, in a case where information related to operation of the component 52 is received from the communicator 62, the controller 64 determines that the communicator 62 has received the first signal. In a case where the first signal is received by the communicator 62, the controller 64 proceeds to step S13. In a case where the communicator 62 does not receive the first signal, the controller 64 proceeds to step S14. In step S13, after the controller 64 actuates the actuator 70 in accordance with the first signal, the controller 64 then ends the process shown in FIGS. 5 and 6.

In step S14, the controller 64 determines whether a fourth predetermined period X4 has elapsed from when the first signal is finally received or the actuator 70 is finally actuated. In an example, the controller 64 is configured to measure a time elapsed from the final reception of the first signal. In an example, the controller 64 is configured to measure the time elapsed from when a completion signal is received from the drive unit 70A. In an example, in a case where a time elapsed from when the completion signal is received from the drive unit 70A is greater than or equal to the fourth predetermined period X4, the controller 64 determines that the fourth predetermined period X4 has elapsed from the final actuation of the actuator 70. In a case where the fourth predetermined period X4 has elapsed from the final reception of the first signal or the final actuation of the actuator 70, the controller 64 proceeds to step S15. In a case where the fourth predetermined period X4 has not elapsed from the final reception of the first signal and the fourth predetermined period X4 has not elapsed from the final actuation of the actuator 70, the controller 64 ends the process shown in FIGS. 5 and 6.

In step S15, the controller 64 switches the communication control state to the first communication control state and then ends the process shown in FIGS. 5 and 6.

In step S11, in a case where the communication control state is not the third communication control state, the controller 64 proceeds to step S16. In step S16, the controller 64 determines whether the communication control state is the first communication control state. In a case where the communication control state is the first communication control state, the controller 64 proceeds to step S17. In step S17, the controller 64 determines whether an action of the human-powered vehicle 10 is detected by the detector 72. In a case where an action of the human-powered vehicle 10 is detected by the detector 72, the controller 64 proceeds to step S18. In a case where an action of the human-powered vehicle 10 is not detected by the detector 72, the controller 64 proceeds to step S19. In an example, in a case where the parameter detected by the detector 72 corresponds to a case where the human-powered vehicle 10 is being used by the rider, the controller 64 determines that the detector 72 detects an action of the human-powered vehicle 10.

In step S18, the controller 64 switches the communication control state to the second communication control state and then ends the process shown in FIGS. 5 and 6.

In step S19, the controller 64 determines whether the first signal is received by the communicator 62. In a case where the first signal is received by the communicator 62, the controller 64 proceeds to step S20. In a case where the first signal is not received by the communicator 62, the controller 64 ends the process shown in FIGS. 5 and 6.

In step S20, the controller 64 switches the communication control state to the third communication control state and then ends the process shown in FIGS. 5 and 6.

In step S16, in a case where the communication control state is not the first communication control state, the controller 64 proceeds to step S21. In step S21, the controller 64 determines whether the communication control state is the second communication control state. In a case where the communication control state is the second communication control state, the controller 64 proceeds to step S22. In a case where the communication control state is not the second communication control state, the controller 64 ends the process shown in FIGS. 5 and 6.

In step S21, the case where the communication control state is not the second communication control state is, for example, a case where the controller 64 cannot determine the present communication control state. In a case where the communication control state includes a further communication control state differing from the first communication control state, the second communication control state, and the third communication control state, the case where the communication control state is not the second communication control state in step S21 can be a case where the communication control state is the further communication control state differing from the first communication control state, the second communication control state, and the third communication control state. Step S21 can be omitted. In a case where step S21 is omitted and the negative determination is made in step S16, the controller 64 proceeds to step S22.

In step S22, the controller 64 determines whether the first period Y1 has elapsed from when an action of the human-powered vehicle 10 is finally detected by the detector 72. In an example, the controller 64 is configured to measure a time elapsed from when the detection signal is finally received from the detector 72. In an example, in a case where the time elapsed from when a detection signal is received from the detector 72 is greater than or equal to the first period Y1, the controller 64 determines that the first period Y1 has elapsed from the final detection of an action of the human-powered vehicle 10 by the detector 72. In a case where the first period Y1 has elapsed from the final detection of an action of the human-powered vehicle 10 by the detector 72, the controller 64 proceeds to step S23. In a case where the first period Y1 has not elapsed from the final detection of an action of the human-powered vehicle 10 by the detector 72, the controller 64 proceeds to step S24.

In step S23, the controller 64 switches the communication control state to the first communication control state and then ends the process shown in FIGS. 5 and 6.

In step S24, the controller 64 determines whether the first signal is received by the communicator 62. In a case where the first signal is received by the communicator 62, the controller 64 proceeds to step S25. In a case where the first signal is not received by the communicator 62, the controller 64 ends the process shown in FIGS. 5 and 6.

In step S25, the controller 64 switches the communication control state to the third communication control state and then ends the process shown in FIGS. 5 and 6.

The amplification control state includes the first amplification control state and the second amplification control state. The amplification control state includes the first amplification control state, the second amplification control state, and a third amplification control state. Power consumption of the amplifier 60 in the second amplification control state is greater than power consumption of the amplifier 60 in the first amplification control state. Power consumption of the amplifier 60 in the third amplification control state is greater than the power consumption of the amplifier 60 in the second amplification control state.

In an example, in the first amplification control state, the controller 64 is configured to control the amplifier 60 so that the amplifier 60 enters sleep mode or operates intermittently. In the first amplification control state, the controller 64 is configured to control the amplifier 60 so that the amplifier 60 stops amplifying the predetermined signal in intensity.

In an example, in the second amplification control state, the controller 64 is configured to control the amplifier 60 so that the amplifier 60 operates continuously or operates intermittently. In an example, in the second amplification control state, the controller 64 is configured to control the amplifier 60 so that the amplifier 60 operates intermittently. In an example, in the third amplification control state, the controller 64 is configured to control the amplifier 60 so that the amplifier 60 operates intermittently or operates continuously.

In an example, in a case where the power consumption of the amplifier 60 in the second amplification control state is greater than the power consumption of the amplifier 60 in the first amplification control state and the power consumption of the amplifier 60 in the third amplification control state is greater than the power consumption of the amplifier 60 in the second amplification control state, each of the first amplification control state, the second amplification control state, and the third amplification control state can correspond to one of a state in which the amplifier 60 is in sleep mode, a state in which the amplifier 60 performs intermittent amplification in the first amplification cycle A1, a state in which the amplifier 60 performs intermittent amplification in the second amplification cycle A2, and a state in which the amplifier 60 performs continuous amplification.

The controller 64 controls the amplifier 60 in accordance with one of a first amplification control example, a second amplification control example, and a third amplification control example. In the first amplification control example, the controller 64 is configured to control the amplifier 60 so that, for example, the amplifier 60 is in sleep mode in the first amplification control state, the amplifier 60 operates intermittently in the first amplification cycle A1 or the second amplification cycle A2 in the second amplification control state, and the amplifier 60 operates continuously in the third amplification control state.

In the second amplification control example, the controller 64 is configured to control the amplifier 60 so that, for example, the amplifier 60 is in sleep mode in the first amplification control state, the amplifier 60 operates intermittently in the first amplification cycle A1 in the second amplification control state, and the amplifier 60 operates intermittently in the second amplification cycle A2 in the third amplification control state.

In the third amplification control example, the controller 64 is configured to control the amplifier 60 so that, for example, the amplifier 60 operates intermittently in the first amplification cycle A1 in the first amplification control state, the amplifier 60 operates intermittently the second amplification cycle A2 in the second amplification control state, and the amplifier 60 operates continuously in the third amplification control state.

In the first amplification control example, the second amplification control state includes a state in which the amplifier 60 operates intermittently in the first amplification cycle A1 and a state in which the amplifier 60 operates intermittently in the second amplification cycle A2. The second amplification control state includes, for example, a first intermittent control state and a second intermittent control state in which power consumption of the amplifier 60 is greater than power consumption of the amplifier 60 in the first intermittent control state. In an example of the first intermittent control state, the controller 64 is configured to control the amplifier 60 so that the amplification cycle of the amplifier 60 equals the first amplification cycle A1. In an example of the second intermittent control state, the controller 64 is configured to control the amplifier 60 so that the amplification cycle equals the second amplification cycle A2, which is shorter than the first amplification cycle A1. In an example of the first intermittent control state, the controller 64 is configured to control the amplifier 60 so that the amplifier 60 amplifies the predetermined signal in intensity in the first amplification period A3. In an example of the second intermittent control state, the controller 64 is configured to control the amplifier 60 so that the amplifier 60 amplifies the predetermined signal in intensity in the second amplification period A7. The second amplification control state can be configured to include only the first intermittent control state.

In an example, in a case where the amplification control state is the first amplification control state, the controller 64 is configured to switch the amplification control state to the second amplification control state in accordance with at least one of the predetermined signal, the state of the human-powered vehicle 10, and the state of the communicator 62.

In an example, in a case where the amplification control state is the first amplification control state, the controller 64 is configured to switch the amplification control state to the first intermittent control state in accordance with at least one of the predetermined signal, the state of the human-powered vehicle 10, and the state of the communicator 62.

In an example, in a case where the amplification control state is the first intermittent control state, the controller 64 is configured to switch the amplification control state to the second intermittent control state in accordance with the predetermined signal.

In an example, in a case where the amplification control state is the second amplification control state, the controller 64 is configured to switch the amplification control state to the third amplification control state in accordance with at least one of the predetermined signal, the state of the human-powered vehicle 10, and the state of the communicator 62. In an example, in a case where the communication control state is the third communication control state, the controller 64 is configured to switch the amplification control state from the second intermittent control state to the third amplification control state in accordance with the predetermined signal.

In an example, in a case where the amplification control state is the third amplification control state, if a time elapsed from the final input of the predetermined signal becomes greater than or equal to a first predetermined period X1, the controller 64 is configured to switch the amplification control state to the second amplification control state.

In an example, in a case where the amplification control state is the second intermittent control state, the controller 64 is configured to switch the amplification control state to the first intermittent control state in accordance with the predetermined signal.

In an example, in a case where the amplification control state is the second amplification control state, if the predetermined signal is not received and the human-powered vehicle 10 is continuously maintained in a predetermined state over a second predetermined period X2 or longer, the controller 64 is configured to switch the amplification control state to the first amplification control state.

An example of control executed by the controller 64 for switching the amplification control state will now be described with reference to FIGS. 7 and 8. In an example, in a case where electric power is supplied to the controller 64, the controller 64 starts the process from step S31. In an example, in a case where the process shown in FIGS. 7 and 8 is completed, the controller 64 again starts the process from step S31 after a predetermined period. In a case where electric power is supplied, the amplifier 60 can be configured to be activated in any one of the first amplification control state, the second amplification control state, and the third amplification control state. In an example, in a case where electric power is supplied to the controller 64, the controller 64 can set the amplification control state to any one of the first amplification control state, the second amplification control state, and the third amplification control state. In an example, in a case where electric power is supplied to the controller 64, the controller 64 is configured to switch the amplification control state to the third amplification control state and then initially execute step S31. In an example, in a case where electric power is supplied to the controller 64, the controller 64 can be configured to switch the amplification control state to the first amplification control state and then initially execute step S31. In an example, in a case where electric power is supplied to the controller 64, the controller 64 can be configured to switch the amplification control state to the second amplification control state and then initially execute step S31.

In step S31, the controller 64 determines whether the amplification control state is the first amplification control state. In a case where the amplification control state is the first amplification control state, the controller 64 proceeds to step S32. In a case where the amplification control state is not the first amplification control state, the controller 64 proceeds to step S36.

In step S32, the controller 64 determines whether the detector 72 detects an action of the human-powered vehicle 10. In a case where an action of the human-powered vehicle 10 is detected by the detector 72, the controller 64 proceeds to step S33. In a case where an action of the human-powered vehicle 10 is not detected by the detector 72, the controller 64 proceeds to step S34.

In step S33, the controller 64 switches the amplification control state to the first intermittent control state and then ends the process shown in FIGS. 7 and 8.

In step S34, the controller 64 determines whether the first signal is received by the communicator 62. In a case where the first signal is received by the communicator 62, the controller 64 proceeds to step S35. In a case where the first signal is not received by the communicator 62, the controller 64 ends the process shown in FIGS. 7 and 8.

In step S35, the controller 64 switches the amplification control state to the second intermittent control state and then ends the process shown in FIGS. 7 and 8.

In step S36, the controller 64 determines whether the amplification control state is the first intermittent control state. In a case where the amplification control state is the first intermittent control state, the controller 64 proceeds to step S37. In a case where the amplification control state is not the first intermittent control state, the controller 64 proceeds to step S41.

In step S37, the controller 64 determines whether the first period Y1 has elapsed from when an action of the human-powered vehicle 10 is finally detected by the detector 72. In a case where the first period Y1 has elapsed from the final detection of an action of the human-powered vehicle 10 by the detector 72, the controller 64 proceeds to step S38. In a case where the first period Y1 has not elapsed from the final detection of an action of the human-powered vehicle 10 by the detector 72, the controller 64 proceeds to step S39.

In step S38, the controller 64 switches the amplification control state to the first amplification control state and then ends the process shown in FIGS. 7 and 8.

In step S39, the controller 64 determines whether the first signal is received by the communicator 62. In a case where the first signal is received by the communicator 62, the controller 64 proceeds to step S40. In a case where the first signal is not received by the communicator 62, the controller 64 ends the process shown in FIGS. 7 and 8.

In step S40, the controller 64 switches the amplification control state to the second intermittent control state and then ends the process shown in FIGS. 7 and 8.

In step S41, the controller 64 determines whether the amplification control state is the second intermittent control state. In a case where the amplification control state is the second intermittent control state, the controller 64 proceeds to step S42. In a case where the amplification control state is not the second intermittent control state, the controller 64 proceeds to step S49.

In step S42, the controller 64 determines whether the first signal is received by the communicator 62. In a case where the first signal is received by the communicator 62, the controller 64 proceeds to step S43. In a case where the first signal is not received by the communicator 62, the controller 64 ends the process shown in FIGS. 7 and 8.

In step S43, the controller 64 switches the amplification control state to the third amplification control state and then ends the process shown in FIGS. 7 and 8.

In step S44, the controller 64 determines whether the detector 72 detects an action of the human-powered vehicle 10. In a case where an action of the human-powered vehicle 10 is detected by the detector 72, the controller 64 proceeds to step S45. In a case where an action of the human-powered vehicle 10 is not detected by the detector 72, the controller 64 proceeds to step S47.

In step S45, the controller 64 determines whether a fifth predetermined period X5 has elapsed from when the first signal is finally received or the actuator 70 is finally actuated. In an example, in a case where a time elapsed from when the completion signal is received from the drive unit 70A is greater than or equal to the fifth predetermined period X5, the controller 64 determines that the fifth predetermined period X5 has elapsed from the final actuation of the actuator 70. In a case where the fifth predetermined period X5 has elapsed from the final reception of the first signal or the final actuation of the actuator 70, the controller 64 proceeds to step S46. In a case where the fifth predetermined period X5 has not elapsed from the final reception of the first signal and the fifth predetermined period X5 has not elapsed from the final actuation of the actuator 70, the controller 64 ends the process shown in FIGS. 7 and 8.

In step S46, the controller 64 switches the amplification control state to the first intermittent control state and then ends the process shown in FIGS. 7 and 8.

In step S47, the controller 64 determines whether the second predetermined period X2 has elapsed from when the first signal is finally received by the communicator 62 and an action of the human-powered vehicle 10 is finally detected by the detector 72. In a case where the second predetermined period X2 has elapsed from the final reception of the first signal by the communicator 62 and the final detection of an action of the human-powered vehicle 10 by the detector 72, the controller 64 proceeds to step S48. In a case where the second predetermined period X2 has not elapsed from the final reception of the first signal by the communicator 62 and the final detection of an action of the human-powered vehicle 10 by the detector 72, the controller 64 ends the process shown in FIGS. 7 and 8.

In step S48, the controller 64 switches the amplification control state to the first amplification control state and then ends the process shown in FIGS. 7 and 8.

In step S49, the controller 64 determines whether the first predetermined period X1 has elapsed from when the first signal is finally received by the communicator 62. In a case where the first predetermined period X1 has elapsed from when the final reception of the first signal by the communicator 62, the controller 64 proceeds to step S50. In a case where the first predetermined period X1 has not elapsed from when the final reception of the first signal by the communicator 62, the controller 64 ends the process shown in FIGS. 7 and 8.

In step S50, the controller 64 switches the amplification control state to the second intermittent control state and then ends the process shown in FIGS. 7 and 8.

A first example of changes in the states of the communicator 62, the amplifier 60, and the actuator 70 will now be described with reference to FIGS. 3 and 9. The controller 64 is configured to control the communicator 62, the amplifier 60, and the actuator 70 in accordance with the state of the detector 72 and the state of the communication device 54.

The controller 64 controls the communicator 62, the amplifier 60, and the actuator 70 in accordance with a state of the human-powered vehicle 10. The state of the human-powered vehicle 10 is, for example, a state in which the human-powered vehicle 10 is in the predetermined state. The state of the human-powered vehicle 10 includes, for example, the state of the detector 72. In an example, the controller 64 determines the state of the human-powered vehicle 10 based on the state of the detector 72. The controller 64 determines whether the human-powered vehicle 10 is in the predetermined state based on a detection signal of the detector 72.

The state of the detector 72 includes, for example, a detection state and non-detection state. In an example, the detection state refers to a state in which the human-powered vehicle 10 is being used by the rider. The non-detection state refers to a state in which the human-powered vehicle 10 is not used by the rider. For example, a case where the detector 72 is in the detection state corresponds to a case where the human-powered vehicle 10 is in the use state. For example, a case where the detector 72 is in the non-detection state corresponds to a case where the human-powered vehicle 10 is in the predetermined state. In a case where the detector 72 detects vibration of the human-powered vehicle 10, the detection state includes, for example, a state in which the detector 72 outputs a detection signal to the controller 64. In a case where the detector 72 detects vibration of the human-powered vehicle 10, the non-detection state includes, for example, a state in which the detector 72 does not output a detection signal to the controller 64.

In an example, in a case where the detector 72 is changed from the non-detection state to the detection state, the controller 64 determines that the human-powered vehicle 10 is operated by the rider and the human-powered vehicle 10 is changed from the predetermined state to the use state.

The state of the communication device 54 includes, for example, a transmission state and a non-transmission state. The state in which the communication device 54 is in the transmission state refers to a state in which the communicator 62 transmits the first signal to the component 52. The state in which the communication device 54 is in the non-transmission state refers to a state in which the communicator 62 does not transmit the first signal to the component 52. In the transmission state, the communication device 54 is configured to continue transmission of the first signal over a predetermined period. The communication device 54 can be configured to continue transmission of the first signal by repeating transmission of the first signal over the predetermined period.

At time t10, the detector 72 is in the non-detection state, and the communication device 54 is in the non-transmission state. At time t10, the controller 64 controls the communicator 62 so that the communicator 62 intermittently receives the first signal in the first reception cycle R1. At time t10, the controller 64 controls the amplifier 60 so that the amplifier 60 is in sleep mode.

At time t11, in a state in which the communication device 54 is in the non-transmission state, the detector 72 is changed from the non-detection state to the detection state. At time t11, an action of the human-powered vehicle 10 is detected by the detector 72. At time t11, for example, the rider mounts the human-powered vehicle 10. From time t11, the controller 64 controls the communicator 62 so that the communicator 62 intermittently receives the first signal in the second reception cycle R2. From time t11, the controller 64 controls the amplifier 60 so that the amplifier 60 intermittently amplifies the predetermined signal in the first amplification cycle A1.

At time t12, the detector 72 is in the detection state, and the communication device 54 is changed from the non-transmission state to the transmission state. At time t12, the communicator 62 receives the first signal for the first time. At time t12, for example, the communication device 54 is operated by the rider. From time t12, the controller 64 controls the communicator 62 so that the communicator 62 continuously receives the first signal. From time t12, the controller 64 controls the amplifier 60 so that the amplifier 60 intermittently amplifies the predetermined signal in the second amplification cycle A2.

At time t13, the controller 64 controls the actuator 70 using the drive unit 70A so that the actuator 70 performs a predetermined operation. The predetermined operation is, for example, an operation for notifying the rider that the first signal is received by the component 52.

At time t14, the detector 72 is in the detection state, and the communication device 54 is changed from the non-transmission state to the transmission state. At time t14, the communicator 62 receives the first signal for the second time. From time t14, the controller 64 controls the amplifier 60 so that the amplifier 60 continuously amplifies the predetermined signal. At time t14, the controller 64 controls the actuator 70 in accordance with the first signal.

At time t15, the detector 72 is in the detection state, and the communication device 54 is changed from the non-transmission state to the transmission state. At time t15, the communicator 62 receives the first signal for the third time. At time t15, the controller 64 controls the actuator 70 in accordance with the first signal.

At time t16, the operation of the actuator 70 started at time t15 is completed.

At time t17, the detector 72 is in the detection state, the communication device 54 is in the non-transmission state, and the first predetermined period X1 has elapsed from time t15. From time t17, the controller 64 controls the amplifier 60 so that the amplifier 60 intermittently amplifies the predetermined signal in the second amplification cycle A2.

At time t18, the communication device 54 is in the non-transmission state, and the detector 72 is changed from the detection state to the non-detection state. At time t18, for example, detection of an action of the human-powered vehicle 10 by the detector 72 is stopped. At time t18, for example, the rider dismounts from the human-powered vehicle 10.

At time t19, the detector 72 is in the non-detection state, the communication device 54 is in the non-transmission state, and the second predetermined period X2 has elapsed from time t18. From time t19, the controller 64 controls the amplifier 60 so that the amplifier 60 is in sleep mode.

At time t20, the detector 72 is in the non-detection state, the communication device 54 is in the non-transmission state, and a third predetermined period X3 has elapsed from time t16. At time t20, the third predetermined period X3 has elapsed from completion of the operation of the actuator 70 and the detector 72 is the non-detection state. From time t20, the controller 64 controls the communicator 62 so that the communicator 62 intermittently receives the first signal in the first reception cycle R1. From time t20, the controller 64 continues to control the communicator 62 and the amplifier 60.

A second example of control of the communicator 62, the amplifier 60, and the actuator 70 executed by the controller 64 will now be described with reference to FIGS. 3 and 10.

The control of the controller 64 at time t30 is in the same state as that of the first example at time t10.

At time t31, in a state in which the detector 72 is in the non-detection state, the communication device 54 is changed from the non-transmission state to the transmission state. From time t31, the controller 64 controls the communicator 62 so that the communicator 62 continuously receives the first signal. From time t31, the controller 64 controls the amplifier 60 so that the amplifier 60 intermittently amplifies the predetermined signal in the second amplification cycle A2.

The control of the controller 64 from time t32 is the same as the control in the first example from time t13 and will not be described in detail.

A third example of control of the communicator 62, the amplifier 60, and the actuator 70 executed by the controller 64 will now be described with reference to FIGS. 3 and 11.

The control of the controller 64 at time t40 is the same as the control in the first example at time t10. The control from time t41 to time t46 is the same as the control in the first example from time t12 to time t17. At time t44, the detector 72 is in the detection state, and the communication device 54 is changed from the non-transmission state to the transmission state. At time t44, the controller 64 controls the actuator 70 in accordance with the first signal. At time t45, the operation of the actuator 70 started at time t44 is completed.

At time t47, the detector 72 is in the detection state, the communication device 54 is in the non-transmission state, and a fourth predetermined period X4 has elapsed from time t45. At time t47, the detector 72 is in the detection state, the communication device 54 is in the non-transmission state, and the fifth predetermined period X5 has elapsed from time t44. From time t47, the controller 64 controls the communicator 62 so that the communicator 62 intermittently receives the first signal in the second reception cycle R2. From time t47, the controller 64 controls the amplifier 60 so that the amplifier 60 intermittently amplifies the predetermined signal in the first amplification cycle A1.

At time t48, the detector 72 is in the non-detection state, the communication device 54 is in the non-transmission state, and a sixth predetermined period X6 has elapsed from time t45. From time t48, the controller 64 controls the communicator 62 so that the communicator 62 intermittently receives the first signal in the first reception cycle R1. From time t48, the controller 64 controls the amplifier 60 so that the amplifier 60 is in sleep mode.

Figure 12:
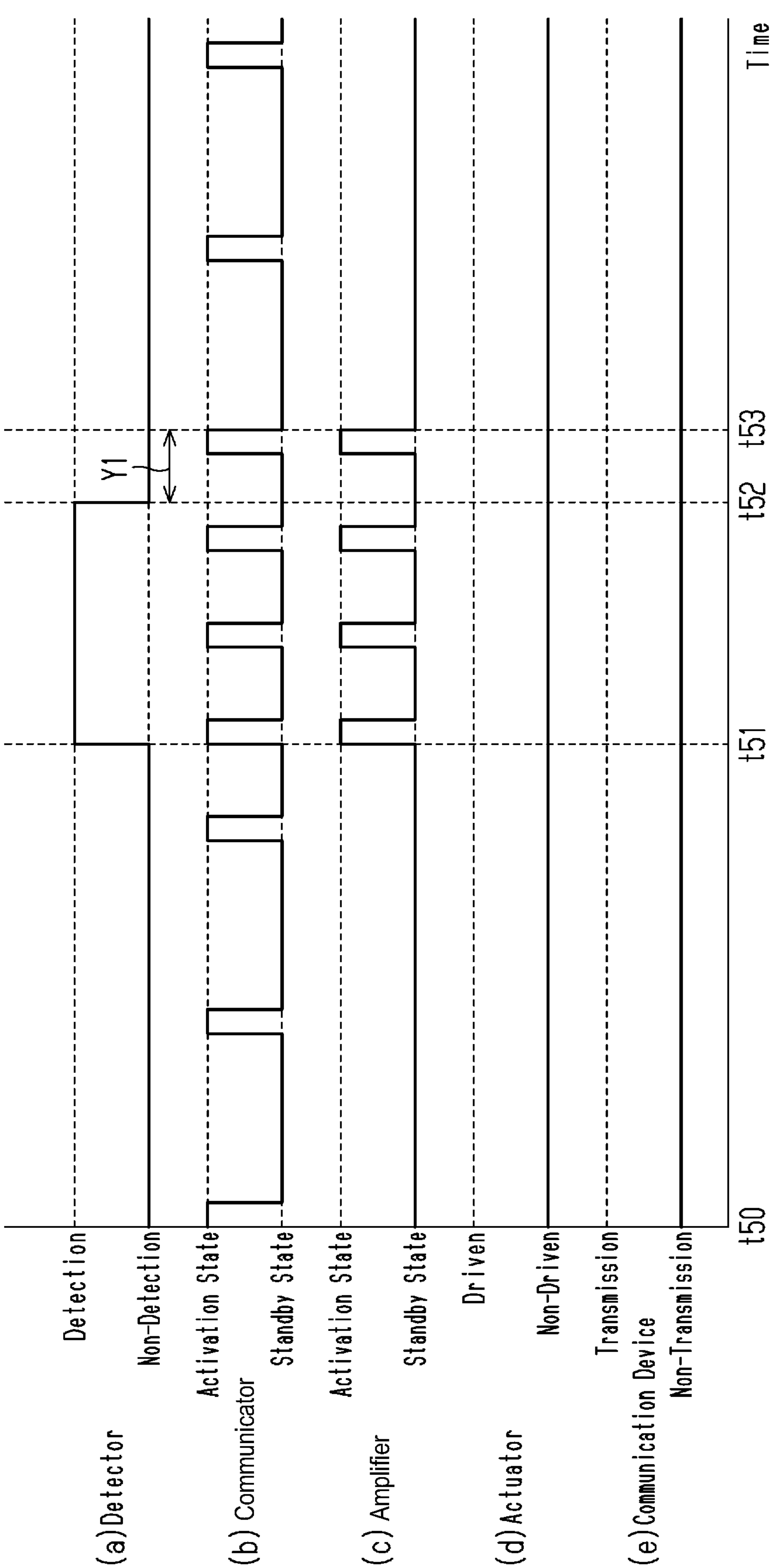
FIG. 12 is a timing chart showing a fourth example of changes in the states of the communicator, the amplifier, and the actuator shown in FIG. 3.

A fourth example of control of the communicator 62, the amplifier 60, and the actuator 70 executed by the controller 64 will now be described with reference to FIGS. 3 and 12.

The control of the controller 64 from time t50 to time t51 is the same as the control in the first example from time t10 to time t11.

At time t52, the communication device 54 is in the non-transmission state, and the detector 72 is changed from the detection state to the non-detection state. At time t52, for example, detection of an action of the human-powered vehicle 10 by the detector 72 is stopped.

At time t53, the first period Y1 has elapsed from time t52. From time t53, the controller 64 controls the communicator 62 so that the communicator 62 intermittently receives the first signal in the first reception cycle R1. From time t53, the controller 64 controls the amplifier 60 so that the amplifier 60 does not amplify the predetermined signal.

The control executed by the controller 64 for switching the amplification control state from the first amplification control state to the second amplification control state in accordance with at least one of the state of the human-powered vehicle 10 and the state of the communicator 62 corresponds to, for example, the first example of control at time t11 and the first example of control at time t12. At time t11 in the first example, for example, in a case where the human-powered vehicle 10 is operated, the controller 64 switches the amplification control state from the first amplification control state to the second amplification control state. At time t12 in the first example, for example, in a case where the predetermined signal is input, the controller 64 switches the amplification control state from the first amplification control state to the second amplification control state.

The control executed by the controller 64 for switching the amplification control state from the first amplification control state to the first intermittent control state in accordance with at least one of the state of the human-powered vehicle 10 and the state of the communicator 62 corresponds to, for example, the first example of control at time t11 and the second example of control at time t31. At time t11 in the first example, for example, in a case where the human-powered vehicle 10 is operated, the controller 64 switches the amplification control state from the first amplification control state to the first intermittent control state. At time t31 in the second example, for example, in a case where the predetermined signal is input, the controller 64 switches the amplification control state from the first amplification control state to the first intermittent control state.

The control executed by the controller 64 for switching the amplification control state from the first intermittent control state to the second intermittent control state in accordance with the predetermined signal corresponds to, for example, the first example of control at time t12. At time t12 in the first example, for example, in a case where the predetermined signal is input, the controller 64 switches the amplification control state from the first intermittent control state to the second intermittent control state.

The control executed by the controller 64 for switching the amplification control state from the second amplification control state to the third amplification control state in accordance with at least one of the predetermined signal, the state of the human-powered vehicle 10, and the state of the communicator 62 corresponds to, for example, the first example of control at time t14. At time t14 in the first example, for example, in a case where the predetermined signal is input, the controller 64 switches the amplification control state from the second amplification control state to the third amplification control state.

The control executed by the controller 64 for switching the amplification control state from the third amplification control state to the second amplification control state in a case where the period elapsed from the final input of the predetermined signal becomes greater than or equal to the first predetermined period X1 corresponds to, for example, the first example of control at time t17. At time t17 in the first example, for example, in a case where a time elapsed from time t15, at which the predetermined signal is finally received by the communicator 62, becomes greater than or equal to the first predetermined period X1, the controller 64 switches the amplification control state from the third amplification control state to the second amplification control state.

The control executed by the controller 64 for switching the amplification control state from the second intermittent control state to the first intermittent control state in accordance with the predetermined signal corresponds to, for example, the third example of control at time t47. At time t47 in the third example, for example, in a case where the fifth predetermined period X5 has elapsed from the final reception of the predetermined signal by the communicator 62, the controller 64 switches the amplification control state from the second intermittent control state to the first intermittent control state.

The control executed by the controller 64 for switching the amplification control state from the second amplification control state to the first amplification control state in a case where the predetermined signal is not input and the human-powered vehicle 10 is continuously maintained in the predetermined state over the second predetermined period X2 or longer corresponds to, for example, the first example of control at time t19. At time t19 in the first example, for example, in a case where the predetermined signal is not input from time t18, at which the human-powered vehicle 10 enters the predetermined state, and the human-powered vehicle 10 is maintained in the predetermined state over the second predetermined period X2, the controller 64 switches the amplification control state from the second amplification control state to the first amplification control state.

The component 52 switches the communication control state and the amplification control state to appropriately adjust the state that readily receives the first signal with more power consumption and the state that does not readily receive the first signal with less power consumption. This achieves efficient power consumption and allows for reduction in size of the battery 68.

The communicator 62 is configured to receive the first signal in a case where the communication control state is any one of the first communication control state, the second communication control state, and the third communication control state. This allows the component 52 to perform wireless communication with the communication device 54. In a case where the communication device 54 includes the operating device 24, the component 52 is appropriately actuated in accordance with operation of the operating device 24 performed by the rider.

In a state in which the first signal is highly likely to be input, the controller 64 controls the amplifier 60 so that the amplifier 60 continuously amplifies the first signal. This reduces the probability of a reception error of the first signal. The state in which the first signal is highly likely to be input is, for example, a state in which the communicator 62 consecutively receives the first signal two times or more. In an example, the first signal includes first signals differing in transmission period. The transmitter 56 is configured to transmit a first signal having a long transmission period in a case where the operation time of the transmitter 56 is long, and a first signal having a short transmission period in a case where the operation time of the transmitter 56 is short. The continuous amplification of the amplifier 60 avoids, for example, a situation in which the amplifier 60 enters the standby state while receiving the first signal having a long transmission period. Thus, erroneous reception of the first signal having a long transmission period as the first signal having a short transmission period occurs less frequently.

Second Embodiment

A second embodiment of the human-powered vehicle control system 50 and the human-powered vehicle component 52 will now be described with reference to FIGS. 3, 6, 13, and 14. The second embodiment of the human-powered vehicle control system 50 and the human-powered vehicle component 52 is the same as the first embodiment of the human-powered vehicle control system 50 and the human-powered vehicle component 52 except for the control of the communicator 62, the amplifier 60, and the actuator 70 executed by the controller 64. Thus, same reference characters are given to those elements that are the same as the corresponding elements of the first embodiment. Such elements will not be described in detail.

In the present embodiment, in a case where the communication control state is the second communication control state and the communicator 62 does not receive the first signal before an elapsed period from when the communication control state is switched to the second communication control state becomes a second period Y2, the controller 64 is configured to switch the communication control state to the first communication control state.

In an example, in a case where the communication control state is the second communication control state and the communicator 62 does not receive the first signal before the elapsed period from when the communication control state is switched to the second communication control state becomes the second period Y2, the controller 64 is configured to switch the communication control state to the first communication control state as the second period Y2 elapses regardless of the state of the human-powered vehicle 10. In a case where the communication control state is the second communication control state and the communicator 62 does not receive the first signal before the elapsed period from when the communication control state is switched to the second communication control state becomes the second period Y2, the controller 64 is configured to switch the communication control state to the first communication control state as the second period Y2 elapses, for example, even if the human-powered vehicle 10 is operated.

Control executed by the controller 64 for switching the communication control state in the present embodiment will now be described with reference to FIGS. 6 and 13.

Figure 13:
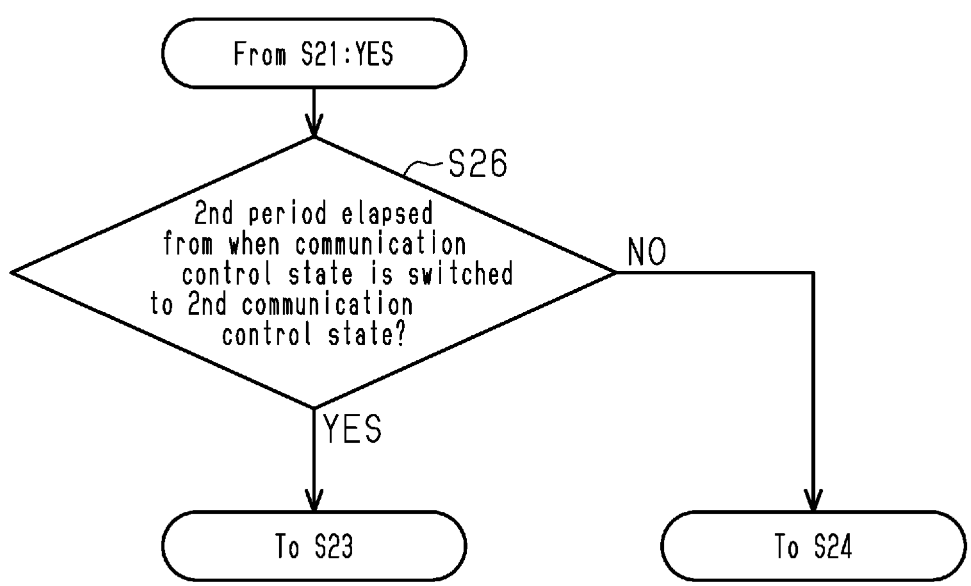

In the present embodiment, in step S21 shown in FIG. 6, in a case where the communication control state is the second communication control state, the controller 64 proceeds to step S26 shown in FIG. 13. In step S26, the controller 64 determines whether the second period Y2 has elapsed from when the communication control state is switched to the second communication control state. In a case where the second period Y2 has elapsed from when the communication control state is switched to the second communication control state, the controller 64 proceeds to step S23 shown in FIG. 6. In a case where the second period Y2 has not elapsed from when the communication control state is switched to the second communication control state, the controller 64 proceeds to step S24 shown in FIG. 6.

Figure 14:
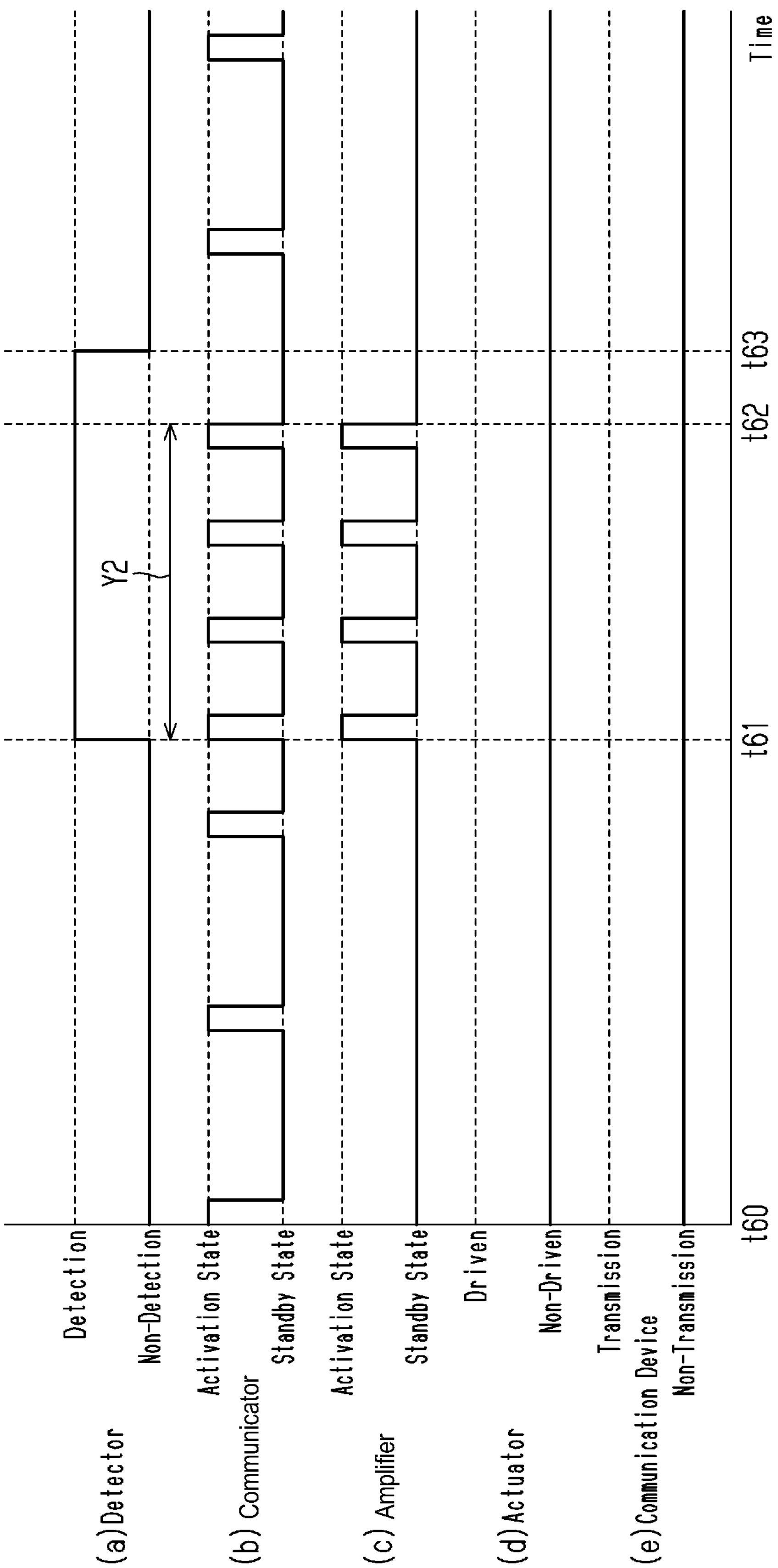
FIG. 14 is a timing chart showing the fourth example of changes in the states of the communicator, the amplifier, and the actuator in the second embodiment.

A fifth example of control of the communicator 62, the amplifier 60, and the actuator 70 executed by the controller 64 will now be described with reference to FIGS. 3 and 14. The control of the controller 64 from time t60 to time t61 is the same as the control in the first example from time t10 to time t11.

At time t62, the second period Y2 has elapsed from time t61. From time t62, the controller 64 controls the communicator 62 so that the communicator 62 intermittently receives the first signal in the first reception cycle R1. From time t62, the controller 64 controls the amplifier 60 so that the amplifier 60 does not amplify the predetermined signal.

At time t63, in a state in which the communication device 54 is in the non-transmission state, the detector 72 is changed from the detection state to the non-detection state. At time t63, for example, detection of an action of the human-powered vehicle 10 by the detector 72 is stopped.

In the present embodiment, the controller 64 switches the communication control state to the first communication control state, for example, in a case where the communicator 62 does not receive the first signal over the second period Y2 from when the communication control state is switched to the second communication control state regardless of whether the rider mounts the human-powered vehicle 10. Thus, for example, in a case where the first signal is less likely to be input, the communication control state is likely to be maintained in the first communication control state.

Third Embodiment

A third embodiment of the human-powered vehicle control system 50 and the human-powered vehicle component 52 will now be described with reference to FIGS. 3, 15, and 16. The third embodiment of the human-powered vehicle control system 50 and the human-powered vehicle component 52 is the same as the first embodiment of the human-powered vehicle control system 50 and the human-powered vehicle component 52 except for the control of the communicator 62 executed by the controller 64. Thus, same reference characters are given to those elements that are the same as the corresponding elements of the first embodiment. Such elements will not be described in detail.

In the present embodiment, for example, the second amplification control state does not include the first intermittent control state and includes only the second intermittent control state. In an example, in a case where the amplification control state is one of the first amplification control state and the second amplification control state and the communicator 62 receives the first signal for the first time, the controller 64 switches the amplification control state to the third amplification control state. In an example, in the second amplification control state, the controller 64 controls the amplifier 60 so that the amplifier 60 operates intermittently in the second amplification cycle A2. In the present embodiment, the second amplification control state does not include the second intermittent control state and includes only the first intermittent control state. In the second amplification control state, the controller 64 can be configured to control the amplifier 60 so that the amplifier 60 operates intermittently in the first amplification cycle A1.

Control executed by the controller 64 for switching the amplification control state in the present embodiment will now be described with reference to FIGS. 15 and 16. In an example, in a case where electric power is supplied to the controller 64, the controller 64 starts the process from step S51. In an example, in a case where the process shown in FIGS. 15 and 16 is completed, the controller 64 again starts the process from step S51 after a predetermined period.

In step S51, the controller 64 determines whether the amplification control state is the first amplification control state. In a case where the amplification control state is the first amplification control state, the controller 64 proceeds to step S52. In a case where the amplification control state is not the first amplification control state, the controller 64 proceeds to step S56.

In step S52, the controller 64 determines whether the detector 72 detects an action of the human-powered vehicle 10. In a case where an action of the human-powered vehicle 10 is detected by the detector 72, the controller 64 proceeds to step S53. In a case where an action of the human-powered vehicle 10 is not detected by the detector 72, the controller 64 proceeds to step S54.

Figure 15:
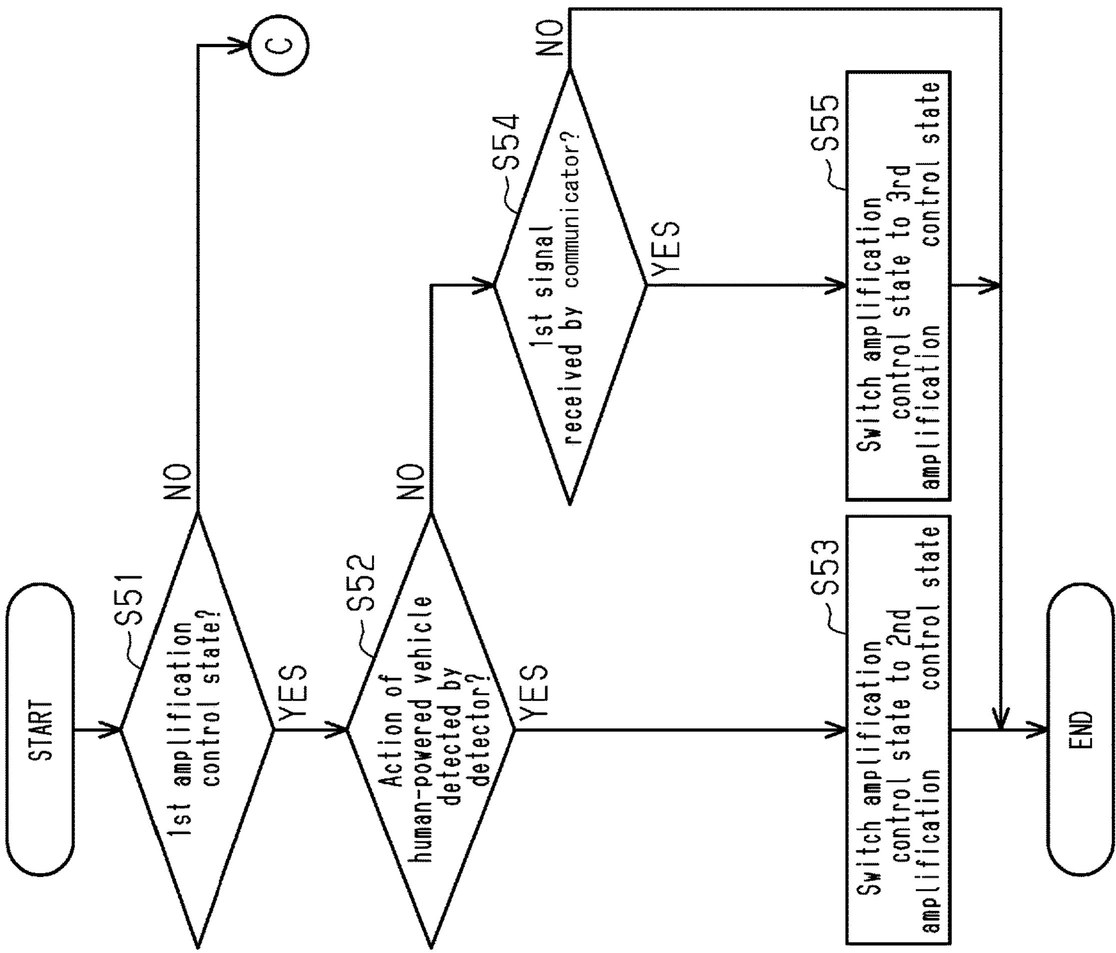
FIG. 15 is a first part of a flowchart of a process for switching the amplification control state executed by an electronic controller in accordance with a third embodiment.

In step S53, the controller 64 switches the amplification control state to the second amplification control state and then ends the process shown in FIGS. 15 and 16.

In step S54, the controller 64 determines whether the first signal is received by the communicator 62. In a case where the first signal is received by the communicator 62, the controller 64 proceeds to step S55. In a case where the first signal is not received by the communicator 62, the controller 64 ends the process shown in FIGS. 15 and 16.

In step S55, the controller 64 switches the amplification control state to the third amplification control state and then ends the process shown in FIGS. 15 and 16.

In step S56, the controller 64 determines whether the amplification control state is the second amplification control state. In a case where the amplification control state is the second amplification control state, the controller 64 proceeds to step S57. In the amplification control state is not the second amplification control state, the controller 64 proceeds to step S59.

In step S57, the controller 64 determines whether the first signal is received by the communicator 62. In a case where the first signal is received by the communicator 62, the controller 64 proceeds to step S58. In a case where the first signal is not received by the communicator 62, the controller 64 proceeds to step S59.

In step S58, the controller 64 switches the amplification control state to the third amplification control state and then ends the process shown in FIGS. 15 and 16.

In step S59, the controller 64 determines whether the detector 72 detects an action of the human-powered vehicle 10. In a case where an action of the human-powered vehicle 10 is detected by the detector 72, the controller 64 ends the process shown in FIGS. 15 and 16. In a case where an action of the human-powered vehicle 10 is not detected by the detector 72, the controller 64 proceeds to step S60.

In step S60, the controller 64 determines whether the second predetermined period X2 has elapsed from when the first signal is finally received by the communicator 62 and an action of the human-powered vehicle 10 is finally detected by the detector 72. In a case where the second predetermined period X2 has elapsed from the final reception of the first signal by the communicator 62 and the final detection of an action of the human-powered vehicle 10 by the detector 72, the controller 64 proceeds to step S61. In a case where the second predetermined period X2 has not elapsed from the final reception of the first signal by the communicator 62 and the final detection of an action of the human-powered vehicle 10 by the detector 72, the controller 64 ends the process shown in FIGS. 15 and 16. In step S60, the controller 64 can be configured to determine only whether the second predetermined period X2 has elapsed from when an action of the human-powered vehicle 10 is finally received by the detector 72 without determining whether the first signal is finally received by the communicator 62.

In step S61, the controller 64 switches the amplification control state to the first amplification control state and then ends the process shown in FIGS. 15 and 16.

In step S62, the controller 64 determines whether the first predetermined period X1 has elapsed from when the first signal is finally received by the communicator 62. In a case where the first predetermined period X1 has elapsed from the final reception of the first signal by the communicator 62, the controller 64 proceeds to step S63. In a case where the first predetermined period X1 has not elapsed from the final reception of the first signal by the communicator 62, the controller 64 ends the process shown in FIGS. 15 and 16.

In step S63, the controller 64 switches the amplification control state to the second amplification control state and then ends the process shown in FIGS. 15 and 16.

Fourth Embodiment

A fourth embodiment of the human-powered vehicle control system 50 and the human-powered vehicle component 52 will now be described with reference to FIGS. 3 and 17. The fourth embodiment of the human-powered vehicle control system 50 and the human-powered vehicle component 52 is the same as the first embodiment of the human-powered vehicle control system 50 and the human-powered vehicle component 52 except for the control of the communicator 62 executed by the controller 64. Thus, same reference characters are given to those elements that are the same as the corresponding elements of the first embodiment. Such elements will not be described in detail.

Control executed by the controller 64 for switching the communication control state in the present embodiment will now be described with reference to FIG. 17. In an example, in a case where electric power is supplied to the controller 64, the controller 64 starts the process from step S71. In an example, in a case where the process shown in FIG. 17 is completed, the controller 64 again starts the process from step S71 after a predetermined period.

In step S71, the controller 64 determines whether the communication control state is the first communication control state. In a case where the communication control state is the first communication control state, the controller 64 proceeds to step S72. In a case where the communication control state is not the first communication control state, the controller 64 ends the process shown in FIG. 17.

In step S72, the controller 64 determines whether the human-powered vehicle 10 is in the use state. In a case where the human-powered vehicle 10 is in the use state, the controller 64 proceeds to step S73. In a case where the human-powered vehicle 10 is not in the use state, the controller 64 ends the process shown in FIG. 17.

In step S73, the controller 64 switches the communication control state to the second communication control state and then proceeds to step S74. In step S74, the controller 64 resets the counter and proceeds to step S75. In step S75, the controller 64 resets a timer and proceeds to step S76. In step S76, the controller 64 starts measuring the time using the timer and proceeds to step S77.

In step S77, the controller 64 determines whether the time measured by the timer is greater than or equal to the second reception cycle R2. In a case where the time measured by the timer is greater than or equal to the second reception cycle R2, the controller 64 proceeds to step S78. In a case where the time measured by the timer is not greater than or equal to the second reception cycle R2, the controller 64 repeats the process of step S77.

In step S78, the controller 64 determines whether the human-powered vehicle 10 is continuously in the use state. In a case where the human-powered vehicle 10 is continuously in the use state, the controller 64 proceeds to step S75. In a case where the human-powered vehicle 10 is not continuously in the use state, the controller 64 proceeds to step S79. In step S79, the controller 64 increments the counter and proceeds to step S80.

In step S80, the controller 64 determines whether the counter has reached a predetermined value. The predetermined value corresponds to, for example, the first period Y1. In a case where the counter has reached the predetermined value, the controller 64 proceeds to step S81. In a case where the counter has not reached the predetermined value, the controller 64 proceeds to step S75.

Figure 17:
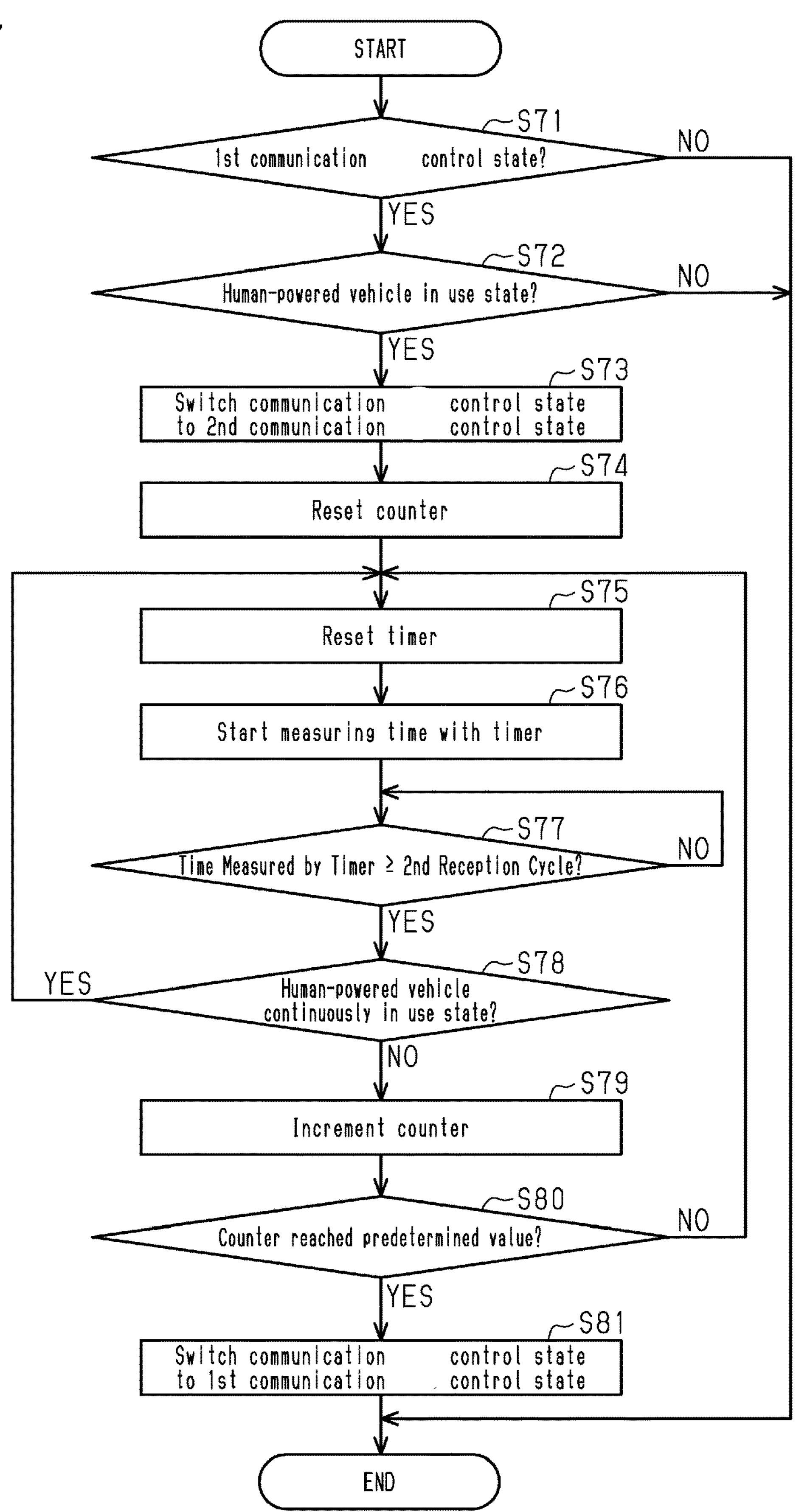
FIG. 17 is a flowchart of a process for switching a communication control state executed by an electronic controller in accordance with a fourth embodiment.

In step S81, the controller 64 switches the communication control state to the first communication control state and then ends the process shown in FIG. 17.

Fifth Embodiment

A fifth embodiment of the human-powered vehicle control system 50 and the human-powered vehicle component 52 will now be described with reference to FIGS. 3 and 18. The fifth embodiment of the human-powered vehicle control system 50 and the human-powered vehicle component 52 is the same as the first embodiment of the human-powered vehicle control system 50 and the human-powered vehicle component 52 except for the control of the communicator 62 executed by the controller 64. Thus, same reference characters are given to those elements that are the same as the corresponding elements of the first embodiment. Such elements will not be described in detail.

Control executed by the controller 64 for switching the communication control state in the fifth embodiment will now be described with reference to FIG. 18. In an example, in a case where electric power is supplied to the controller 64, the controller 64 starts the process from step S91. In an example, in a case where the process shown in FIG. 18 is completed, the controller 64 again starts the process from step S91 after a predetermined period.

In step S91, the controller 64 determines whether the communication control state is the first communication control state. In a case where the communication control state is the first communication control state, the controller 64 proceeds to step S92. In a case where the communication control state is not the first communication control state, the controller 64 ends the process shown in FIG. 18.

In step S92, the controller 64 determines whether the human-powered vehicle 10 is in the use state. In a case where the human-powered vehicle 10 is in the use state, the controller 64 proceeds to step S93. In a case where the human-powered vehicle 10 is not in the use state, the controller 64 ends the process shown in FIG. 18.

In step S93, the controller 64 switches the communication control state to the second communication control state and then proceeds to step S94. In step S94, the controller 64 resets a first timer and proceeds to step S95. In step S95, the controller 64 sets the communicator 62 to the standby state and proceeds to step S96. In step S96, the controller 64 resets a second timer and proceeds to step S97. In step S97, the controller 64 starts measuring the time using the first timer and the second timer and proceeds to step S98.

In step S98, the controller 64 determines whether the time measured by the first timer is greater than or equal to the second period Y2. In a case where the time measured by the first timer is not greater than or equal to the second period Y2, the controller 64 proceeds to step S99. In a case where the time measured by the first timer is greater than or equal to the second period Y2, the controller 64 proceeds to step S103.

In step S99, the controller 64 determines whether the time measured by the second timer is greater than or equal to the second reception interval R8. In a case where the time measured by the second timer is greater than or equal to the second reception interval R8, the controller 64 proceeds to step S100. In a case where the time measured by the second timer is not greater than or equal to the second reception interval R8, the controller 64 proceeds to step S98.

In step S100, the controller 64 sets the communicator 62 to the activation state and proceeds to step S101. In step S101, the controller 64 determines whether the first signal is received. In a case where the first signal is received, the controller 64 proceeds to step S102. In a case where the first signal is not received, the controller 64 proceeds to step S95. In step S102, the controller 64 switches the communication control state to the third communication control state and ends the process shown in FIG. 18.

In step S102, the controller 64 switches the communication control state to the first communication control state and then ends the process.

Sixth Embodiment

A sixth embodiment of the human-powered vehicle control system 50 and the human-powered vehicle component 52 will now be described with reference to FIGS. 3 and 19. The sixth embodiment of the human-powered vehicle control system 50 and the human-powered vehicle component 52 is the same as the first embodiment of the human-powered vehicle control system 50 and the human-powered vehicle component 52 except for the control of the amplifier 60 executed by the controller 64. Thus, same reference characters are given to those elements that are the same as the corresponding elements of the first embodiment. Such elements will not be described in detail.

In the present embodiment, the communication control state includes the first communication control state and the second communication control state. In the present embodiment, the communication control state can exclude the third communication control state. In the present embodiment, the power consumption of the communicator 62 in the second communication control state only needs to be greater than the power consumption of the communicator 62 in the first communication control state. The second communication control state of the present embodiment can correspond to the second communication control state or the third communication control state of the first embodiment. In an example, the second communication control state of the present embodiment corresponds to the second communication control state of the first embodiment. The first communication control state of the present embodiment corresponds to the first communication control state of the first embodiment. In an example, the second communication control state of the present embodiment corresponds to the third communication control state of the first embodiment. The first communication control state of the present embodiment corresponds to the first communication control state and the second communication control state of the first embodiment.

In the present embodiment, the amplification control state includes the first amplification control state and the second amplification control state. In the present embodiment, the amplification control state can exclude the third amplification control state. In the present embodiment, the power consumption of the amplifier 60 in the second amplification control state only needs to be greater than the power consumption of the amplifier 60 in the first amplification control state. The second amplification control state of the present embodiment corresponds to the first intermittent control state, the second intermittent control state, or the third amplification control state of the first embodiment. In an example, the second amplification control state of the present embodiment corresponds to the first intermittent control state of the first embodiment, and the first amplification control state of the present embodiment corresponds to the first amplification control state of the first embodiment. In an example, the second amplification control state of the present embodiment corresponds to the second intermittent control state of the first embodiment, and the first amplification control state of the present embodiment corresponds to the first amplification control state or the first intermittent control state of the first embodiment. In an example, the second amplification control state of the present embodiment corresponds to the third amplification control state of the first embodiment, and the first amplification control state of the present embodiment corresponds to the first amplification control state, the first intermittent control state, or the second intermittent control state of the first embodiment.

In the present embodiment, in a case where the communication control state is a predetermined control state, the controller 64 is configured to control the amplifier 60. The predetermined control state of the communication control state is, for example, the second communication control state. In an example, in a case where the communication control state is the second communication control state, the controller 64 is configured to switch the amplification control state from the first amplification control state to the second amplification control state based on at least one of the predetermined signal and the state of the human-powered vehicle 10. In the present embodiment, for example, in a case where the communication control state is the second communication control state and the first signal is received, the controller 64 is configured to switch the amplification control state from the first amplification control state to the second amplification control state.

Figure 19:
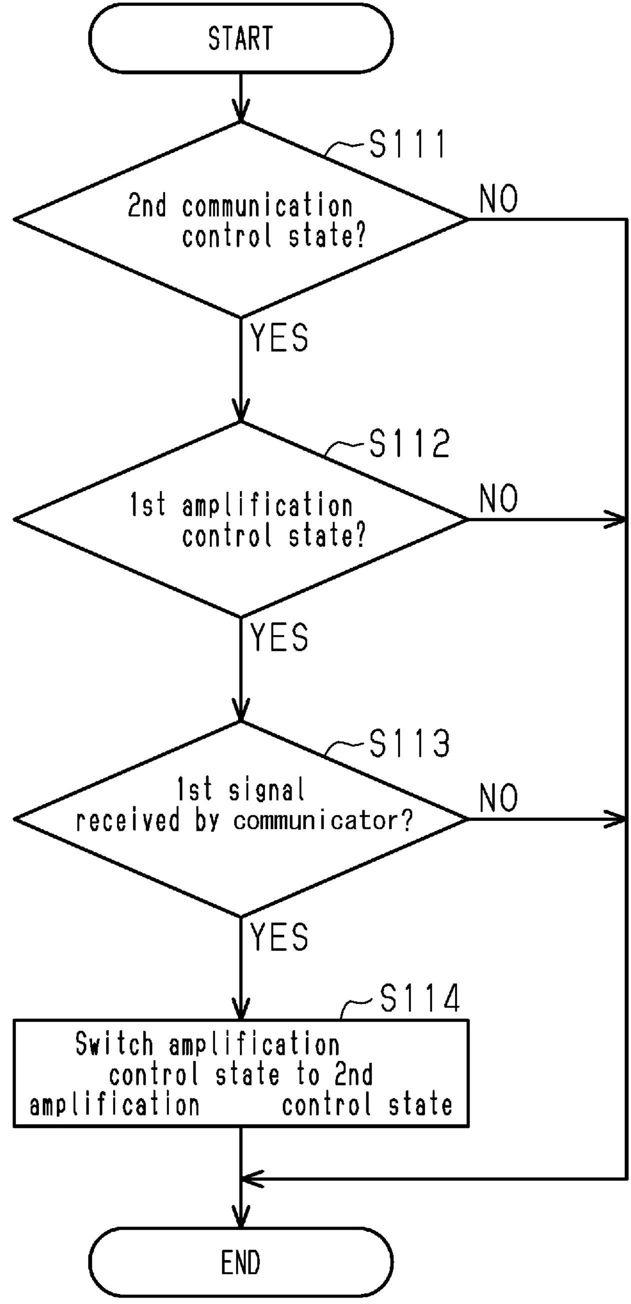
FIG. 19 is a flowchart of a process for switching the amplification control state executed by an electronic controller in accordance with a sixth embodiment.

With reference to FIG. 19, control executed by the controller 64 on the component 52 will now be described. In an example, in a case where electric power is supplied to the controller 64, the controller 64 starts the process from step S111. In an example, in a case where the process shown in FIG. 19 is completed, the controller 64 again starts the process from step S111 after a predetermined period.

In step S111, the controller 64 determines whether the communication control state is the second communication control state. In a case where the communication control state is the second communication control state, the controller 64 proceeds to step S112. In a case where the communication control state is not the second communication control state, the controller 64 ends the process shown in FIG. 19.

In step S112, the controller 64 determines whether the amplification control state is the first amplification control state. In a case where the amplification control state is the first amplification control state, the controller 64 proceeds to step S113. In a case where the amplification control state is not the first amplification control state, the controller 64 ends the process shown in FIG. 19.

In step S113, the controller 64 determines whether the first signal is received by the communicator 62. In a case where the communicator 62 receives the first signal, the controller 64 proceeds to step S114 to switch the amplification control state to the second amplification control state and then ends the process shown in FIG. 19. In a case where the first signal is not received by the communicator 62, the controller 64 ends the process shown in FIG. 19.

In an example, in a case where the communication control state is the second communication control state and an action of the human-powered vehicle 10 is detected, the controller 64 can be configured to switch the amplification control state from the first amplification control state to the second amplification control state. In step S113 shown in FIG. 19, the controller 64 can determine whether the detector 72 detects an action of the human-powered vehicle 10. In a case where an action of the human-powered vehicle 10 is detected by the detector 72, the controller 64 proceeds to step S114. In a case where an action of the human-powered vehicle 10 is not detected by the detector 72, the controller 64 ends the process shown in FIG. 19.

The control for switching the amplification control state from the first amplification control state to the second amplification control state based on at least one of the predetermined signal and the state of the human-powered vehicle 10 in a case where the communication control state is the second communication control state corresponds to, for example, the first example of control at time t14 shown in FIG. 9. In the first example shown in FIG. 9, at time t14, the third communication control state of the first embodiment corresponds to the second communication control state of the present embodiment. The second intermittent control state of the first embodiment corresponds to the first amplification control state of the present embodiment. The third amplification control state of the first embodiment corresponds to the second amplification control state of the present embodiment.

In the present embodiment of the human-powered vehicle control system 50 and the human-powered vehicle component 52, the amplification control state is maintained in the first amplification control state even when the communication control state is the second communication control state. This achieves efficient power consumption of at least the amplifier 60 and allows for reduction in size of the battery 68.

Modifications

The description related to the above embodiments exemplifies, without any intention to limit, applicable forms of a human-powered vehicle control system and a human-powered vehicle component according to the present disclosure. The human-powered vehicle control system and the human-powered vehicle component according to the present disclosure can be applied to, for example, modifications of the embodiments that are described below and combinations of at least two of the modifications that do not contradict each other. In the following modifications, same reference characters are given to those elements that are the same as the corresponding elements of the above embodiment. Such elements will not be described in detail.

The component 52 can include the drive unit 28. In a case where the component 52 includes the drive unit 28, the first signal includes, for example, information related to the ratio of a motor driving force to a human driving force. In a case where the component 52 includes the drive unit 28, the drive unit 28 is configured to change the ratio of the motor driving force to the human driving force in accordance with the first signal.

The component 52 can include the brake 30. In a case where the component 52 includes the brake 30, the first signal includes, for example, information related to braking force applied to the human-powered vehicle 10. In a case where the component 52 includes the brake 30, the brake 30 is configured to change braking force applied to the human-powered vehicle 10 in accordance with the first signal.

The component 52 can include the suspension 34. In a case where the component 52 includes the suspension 34, the first signal includes, for example, information related to the allowed amount of relative movement of the first part and the second part. In a case where the component 52 includes the suspension 34, the suspension 34 is configured to change the allowed amount of relative movement of the first part and the second part.

The at least one transmitter 56 can include at least one of the crank rotational state detector 38, the human driving force detector 40, and the tire pressure detector 42. In a case where the at least one transmitter 56 includes the crank rotational state detector 38, the crank rotational state detector 38 is configured to transmit a detection signal to the controller 64 in accordance with rotation of the crank 12. In a case where the at least one transmitter 56 includes the human driving force detector 40, the human driving force detector 40 is configured to transmit a detection signal to the controller 64 in a case where human driving force is input to the human-powered vehicle 10. In a case where the at least one transmitter 56 includes the tire pressure detector 42, the tire pressure detector 42 is configured to transmit a detection signal to the controller 64 in accordance with a change in the air pressure of at least one of the rear wheel 20A and the front wheel 20B.

The battery 68 can be provided on a human-powered vehicle component differing from the component 52. The battery 68 can be provided on the body 22.

In a case where the communicator 62 receives the first signal, the controller 64 can be configured to actuate the actuator 70 in accordance with the first signal instead of actuating the actuator 70 to perform the predetermined operation. At time t13 shown in FIG. 9, the controller 64 can control the actuator 70 in accordance with the first signal.

The second reception cycle R2 can be equal to the first reception cycle R1, and the second reception period R7 can be longer than the first reception period R3. In a case where the second reception cycle R2 is equal to the first reception cycle R1 and the second reception period R7 is longer than the first reception period R3, the power consumption of the communicator 62 in the second communication control state is greater than the power consumption of the communicator 62 in the first communication control state. In a case where the second reception period R7 is shorter than the first reception period R3, the period for which the communicator 62 is in the activation state is shorter in the second communication control state than in the first communication control state. Thus, the power consumption of the communicator 62 in the second communication control state is greater than the power consumption of the communicator 62 in the first communication control state.

The second amplification cycle A2 can be equal to the first amplification cycle A1, and the second amplification period A7 can be longer than the first amplification period A3. In a case where the second amplification cycle A2 is equal to the first amplification cycle A1 and the second amplification period A7 is longer than the first amplification period A3, the power consumption of the amplifier 60 in the second intermittent control state is greater than the power consumption of the amplifier 60 in the first intermittent control state. In a case where the second amplification period A7 is shorter than the first amplification period A3, the period for which the amplifier 60 is in the activation state is shorter in the second intermittent control state than in the first intermittent control state.

In a case where a reception sensitivity of the communicator 62 in the first low sensitivity period R5 is lower than a reception sensitivity of the communicator 62 in the first reception period R3, the communicator 62 does not have to be in the standby state during the first low sensitivity period R5. The controller 64 can decrease a reception rate of the communicator 62 in the first low sensitivity period R5 as compared to a reception rate of the communicator 62 in the first reception period R3. The decrease of the reception rate of the communicator 62 in the first low sensitivity period R5 as compared to the reception rate of the communicator 62 in the first reception period R3 results in a decrease in the reception sensitivity of the communicator 62 in the first low sensitivity period R5 as compared to the reception sensitivity of the communicator 62 in the first reception period R3. In a case where the reception sensitivity of the communicator 62 in the second low sensitivity period R9 is lower than the reception sensitivity of the communicator 62 in the second reception period R7, the communicator 62 does not have to be in the standby state during the second low sensitivity period R9. The controller 64 can be configured to decrease a reception rate of the communicator 62 in the second low sensitivity period R9 as compared to a reception rate of the communicator 62 in the second reception period R7. In a case where the reception sensitivity of the communicator 62 in the first low sensitivity period R5 is lower than the reception sensitivity of the communicator 62 in the first reception period R3, the reception sensitivity of the communicator 62 in the second low sensitivity period R9 becomes lower than the reception sensitivity of the communicator 62 in the second reception period R7. The communicator 62 includes, for example, a first receiver and a second receiver provided at a position differing from the first receiver. In an example, the controller 64 controls the communicator 62 so that the first receiver and the second receiver both receive the first signal in the first reception period R3 and the second reception period R7. In an example, the controller 64 controls the communicator 62 so that only one of the first receiver and the second receiver receives the first signal in the first low sensitivity period R5 and the second low sensitivity period R9. In the first low sensitivity period R5, the other one of the first receiver and the second receiver does not receive the first signal. Thus, the reception rate of the communicator 62 in the first low sensitivity period R5 is decreased as compared to the reception rate of the communicator 62 in the first reception period R3. In the second low sensitivity period R9, the other one of the first receiver and the second receiver does not receive the first signal. Thus, the reception rate of the communicator 62 in the second low sensitivity period R9 is decreased as compared to the reception rate of the communicator 62 in the second reception period R7.

In a case where the predetermined signal is amplified in intensity at a lower degree in the first low amplification period A5 than in the first amplification period A3, the amplifier 60 does not have to be in the standby state during the first low amplification period A5. The controller 64 can decrease the amplification degree of the amplifier 60 in the first low amplification period A5 as compared to the amplification degree of the amplifier 60 in the first amplification period A3. The decrease in the amplification degree of the amplifier 60 in the first low amplification period A5 as compared to the amplification degree of the amplifier 60 in the first amplification period A3 causes the amplifier 60 to amplify the predetermined signal in intensity in the first low amplification period A5 at a degree lower than an amplification degree of the predetermined signal in the first amplification period A3. In a case where the predetermined signal is amplified in intensity at a lower degree in the second low amplification period A9 than in the second amplification period A7, the amplifier 60 does not have to be in the standby state during the second low amplification period A9. The controller 64 can decrease the amplification degree of the amplifier 60 in the second low amplification period A9 as compared to that in the second amplification period A7. The decrease in the amplification degree of the amplifier 60 in the second low amplification period A9 as compared to that in the second amplification period A7 causes the amplifier 60 to amplify the predetermined signal in intensity in the second low amplification period A9 at a degree lower than an amplification degree of the predetermined signal in the second amplification period A7.

The controller 64 can be configured to increase the amplification degree of the amplifier 60 in the second amplification control state as compared to that in the first amplification control state. The increase in the amplification degree of the amplifier 60 in the second amplification control state as compared to that in the first amplification control state results in an increase in the power consumption of the amplifier 60 in the second amplification control state as compared to the power consumption of the amplifier 60 in the first amplification control state. The controller 64 can be configured to increase the amplification degree of the amplifier 60 in the third amplification control state as compared to that in the second amplification control state. The increase in the amplification degree of the amplifier 60 in the third amplification control state as compared to that in the second amplification control state results in an increase in the power consumption of the amplifier 60 in the third amplification control state as compared to the power consumption of the amplifier 60 in the second amplification control state.

In the third amplification control state, the controller 64 can be configured to control the amplifier 60 so that the amplifier 60 operates intermittently. In an example, in the second amplification control state, the controller 64 is configured to control the amplifier 60 so that the amplifier 60 performs an intermittent amplification in the first amplification cycle A1. In the third amplification control state, the controller 64 is configured to control the amplifier 60 so that the amplifier 60 performs an intermittent amplification in the second amplification cycle A2.

In a case where the amplification control state is the second amplification control state, the controller 64 can be configured to switch the amplification control state to the third amplification control state in accordance with the state of the human-powered vehicle 10. The controller 64 can be configured to switch the amplification control state from the second amplification control state to the third amplification control state in a case where the human-powered vehicle 10 starts traveling regardless of whether or not the first signal is input.

In a case where the amplification control state is the first amplification control state, the controller 64 can be configured to switch the amplification control state to the second amplification control state in accordance with the state of the communicator 62. In a case where the amplification control state is the first amplification control state, the controller 64 can be configured to switch the amplification control state to the first intermittent control state in accordance with the state of the communicator 62. The state of the communicator 62 includes, for example, the communication control state. In an example, in a case where the controller 64 switches the communication control state from the first communication control state to the second communication control state, the controller 64 is configured to switch the amplification control state from the first amplification control state to the second amplification control state. In an example, in a case where the controller 64 switches the communication control state from the first communication control state to the second communication control state, the controller 64 is configured to switch the amplification control state from the first amplification control state to the first intermittent control state. In an example, the controller 64 can be configured to control so that the communicator 62 and the amplifier 60 simultaneously enter the activation state.

In a case where the amplification control state is the second amplification control state, the controller 64 can be configured to switch the amplification control state to the third amplification control state in accordance with the state of the communicator 62. In an example, in a case where the controller 64 switches the communication control state from the second communication control state to the third communication control state, the controller 64 is configured to switch the amplification control state from the second amplification control state to the third amplification control state.

The controller 64 can be configured to control the amplifier 60 in accordance with the state of the communicator 62.

Figure 20:
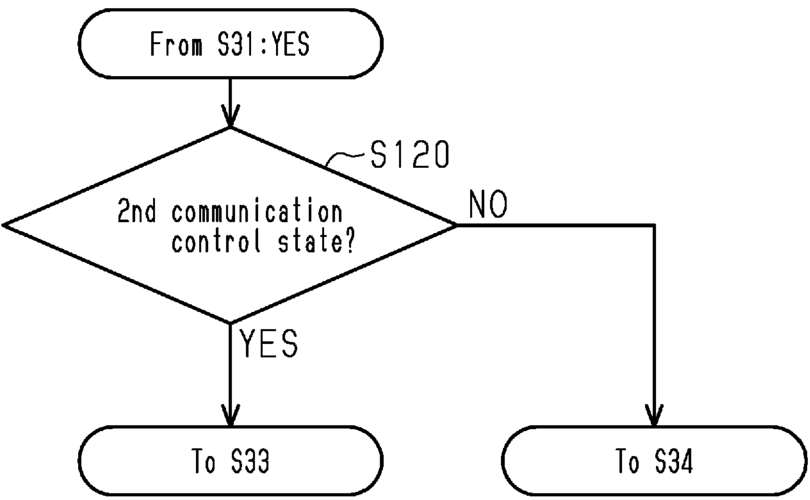
FIG. 20 is a flowchart of a process for switching the amplification control state executed by a first modification of an electronic controller.

In an example, in a case where the communicator 62 is in the activation state, the controller 64 is configured so that the amplifier 60 is in the activation state. In an example, the first amplification period A3 is equal to the first reception period R3. In an example, the second amplification period A7 is equal to the second reception period R7. In an example, in a case where the amplification control state is the first amplification control state, the controller 64 is configured to switch the amplification control state to the first intermittent control state in accordance with the state of the communicator 62. In an example, in a case where the communication control state is the second communication control state, the controller 64 is configured to switch the amplification control state from the first amplification control state to the second amplification control state based on at least one of the predetermined signal and the state of the human-powered vehicle 10. In an example, in a case where the communication control state is the second communication control state, the controller 64 is configured to switch the amplification control state from the first amplification control state to the first intermittent control state based on at least one of the predetermined signal and the state of the human-powered vehicle 10. In an example, in step S31 shown in FIG. 7, in a case where the amplification control state is the first amplification control state, the controller 64 proceeds to step S120 shown in FIG. 20. In step S120, the controller 64 determines whether the communication control state is the second communication control state. In a case where the communication control state is the second communication control state, the controller 64 proceeds to step S33 shown in FIG. 7. In a case where the communication control state is not the second communication control state, the controller 64 proceeds to step S34 shown in FIG. 7.

Figure 21:
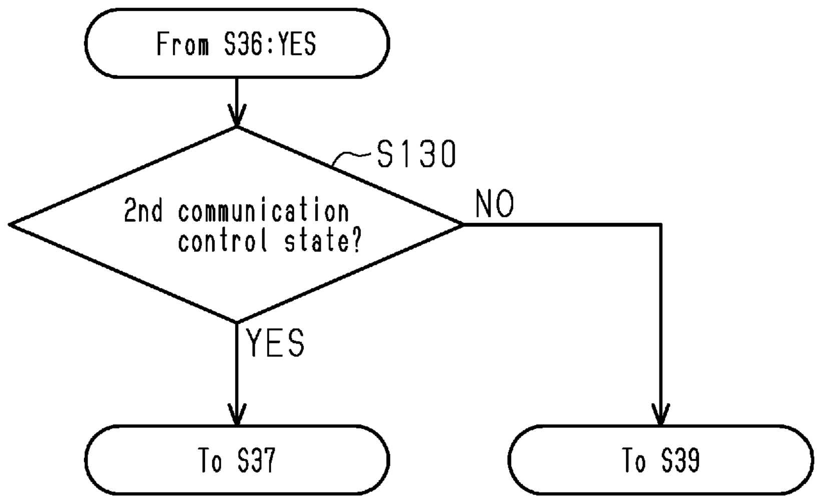
FIG. 21 is a flowchart of a process for switching the amplification control state executed by a second modification of an electronic controller.

In a case where the communication control state is the second communication control state, the controller 64 can be configured to switch the amplification control state from the second amplification control state to the third amplification control state based on at least one of the predetermined signal and the state of the human-powered vehicle 10. In an example, the second amplification control state corresponds to a state in which the amplifier 60 performs an intermittent amplification in the first amplification cycle A1. The third amplification control state corresponds to a state in which the amplifier 60 performs intermittent amplification in the second amplification cycle A2. In an example, in step S36 shown in FIG. 7, in a case where the amplification control state is the first intermittent control state, the controller 64 proceeds to step S130 shown in FIG. 21. In step S130, the controller 64 determines whether the communication control state is the second communication control state. In a case where the communication control state is the second communication control state, the controller 64 proceeds to step S37 shown in FIG. 7. In a case where the communication control state is not the second communication control state, the controller 64 proceeds to step S39 shown in FIG. 7.

The communication control state and the amplification control state can be switched independently from each other. In a case where the communication control state is the first communication control state, the controller 64 can be configured to switch the amplification control state from one of the first amplification control state, the second amplification control state, and the third amplification control state to another one. In a case where the communication control state is the second communication control state, the controller 64 can be configured to switch the amplification control state from one of the first amplification control state, the second amplification control state, and the third amplification control state to another one. In a case where the communication control state is the third communication control state, the controller 64 can be configured to switch the amplification control state from one of the first amplification control state, the second amplification control state, and the third amplification control state to another one.

Figure 22:
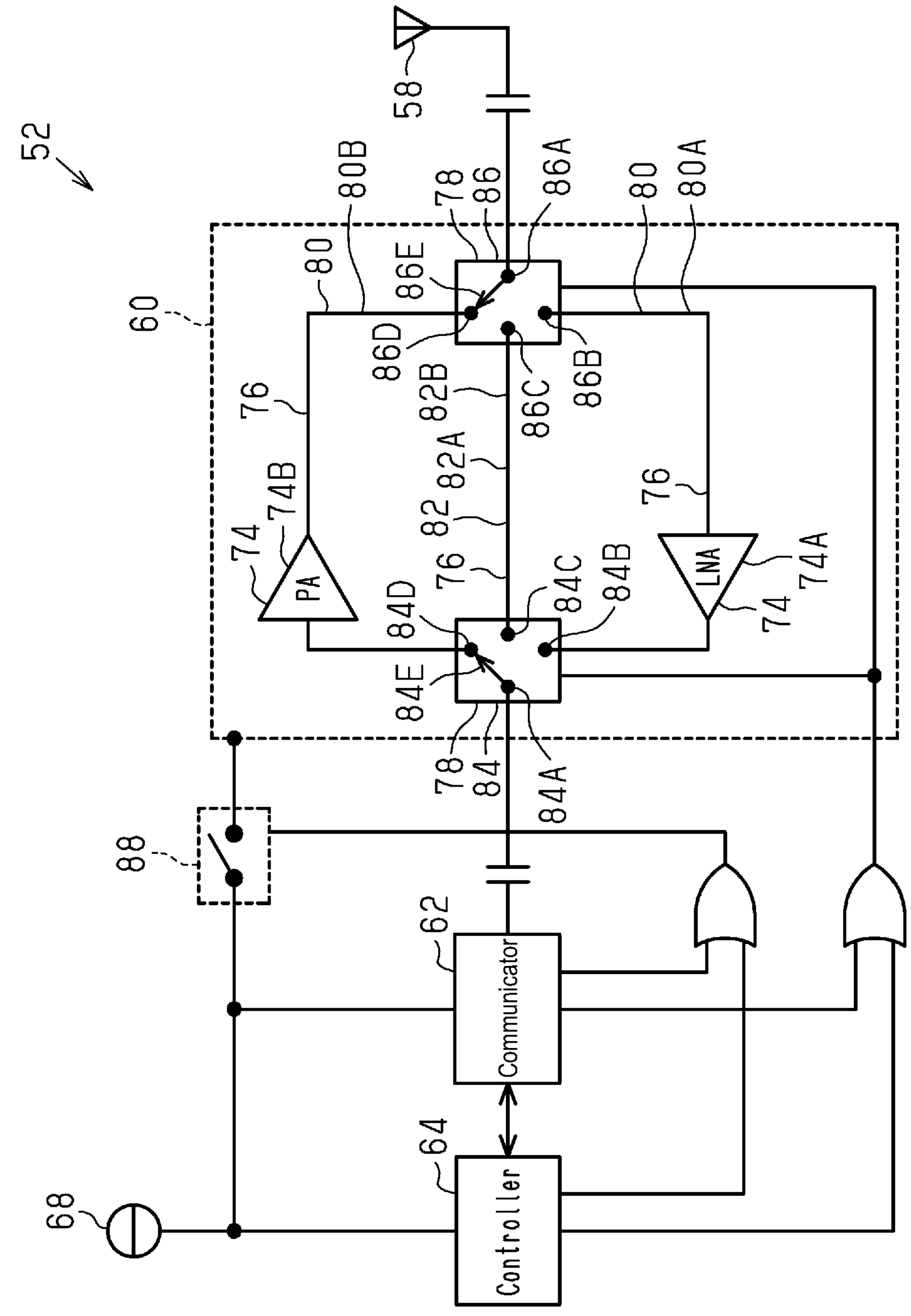
FIG. 22 is a block diagram showing the electric configuration of a third modification of a human-powered vehicle component.

The component 52 can further include an additional switch 88. As shown in FIG. 22, the additional switch 88 is configured to electrically disconnect the battery 68 from the amplifier 60. In an example, the additional switch 88 is electrically connected to at least one of the communicator 62 and the controller 64. The additional switch 88 is configured to electrically disconnect the battery 68 from the amplifier 60 in accordance with a signal of one of the communicator 62 and the controller 64. In a case where the additional switch 88 electrically disconnect the battery 68 from the amplifier 60, the amplifier 60 can be configured to enter sleep mode.

In an example of the changes shown in FIG. 9, in a case where the third predetermined period X3 has elapsed from completion of actuation of the actuator 70 at time t16 and the detector 72 is in the non-detection state, the controller 64 can control the communicator 62 so that the first signal is intermittently received in the second reception cycle R2.

In an example of the changes shown in FIG. 9, in a case where the third predetermined period X3 has elapsed from completion of actuation of the actuator 70 at time t16, the controller 64 can be configured to control the communicator 62 so that the first signal is intermittently received in the first reception cycle R1 or the second reception cycle R2 regardless of the state of the detector 72.

In an example of the changes shown in FIG. 9, time t17 can be the point in time at which the first predetermined period X1 has elapsed from time t16. In an example, the first predetermined period X1 has elapsed from completion of actuation of the actuator 70 that was started at time t15, the controller 64 controls the amplifier 60 so that the predetermined signal is intermittently amplified in the second amplification cycle A2.

In an example of the changes shown in FIG. 11, time t47 can be the point in time at which the fifth predetermined period X5 has elapsed from time t45. For example, in a case where the fifth predetermined period X5 has elapsed from completion of actuation of the actuator 70 that was started at time t44, the controller 64 switches the amplification control state from the second intermittent control state to the first intermittent control state.

Figure 23:
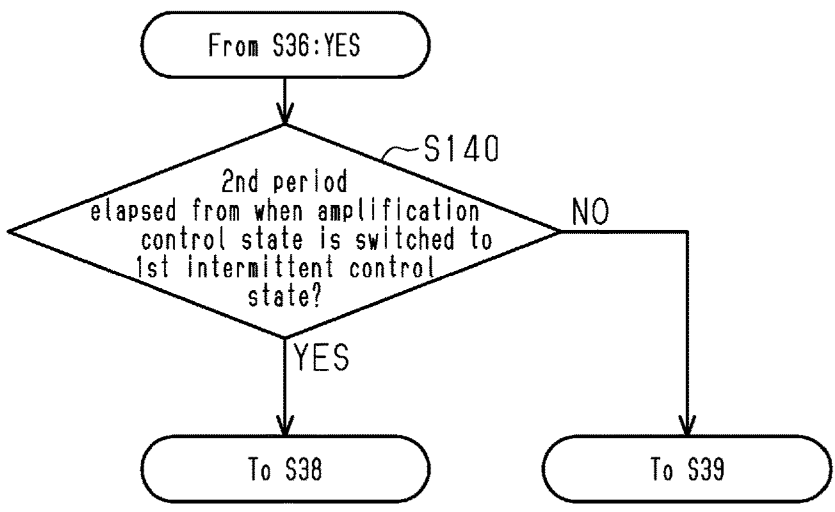
FIG. 23 is a flowchart of a process for switching the amplification control state executed by a fourth modification of an electronic controller.

As shown in FIG. 23, in the second embodiment, in a case where the amplification control state is the first intermittent control state and the communicator 62 does not receive the first signal before an elapsed period from when the amplification control state is switched to the first intermittent control state becomes the second period Y2, the controller 64 can be configured to switch the amplification control state to the first amplification control state. In an example, in a case where the amplification control state is the first intermittent control state and the communicator 62 does not receive the first signal before an elapsed period from when the amplification control state is switched to the first intermittent control state becomes the second period Y2, the controller 64 can be configured to switch the amplification control state to the first amplification control state as the second period Y2 elapses regardless of the state of the human-powered vehicle 10. In an example, in a case where the amplification control state is the first intermittent control state and the communicator 62 does not receive the first signal before an elapsed period from when the amplification control state is switched to the first intermittent control state becomes the second period Y2, the controller 64 can be configured to switch the amplification control state to the first amplification control state as the second period Y2 elapses even if the human-powered vehicle 10 is operated. Control executed by the controller 64 for switching the amplification control state in this modification will now be described with reference to FIGS. 7 and 23. In this modification, in step S36 shown in FIG. 7, in a case where the amplification control state is the first intermittent control state, the controller 64 proceeds to step S140 shown in FIG. 23. In step S140, the controller 64 determines whether the second period Y2 has elapsed from when the amplification control state is switched to the first intermittent control state. In a case where the second period Y2 has elapsed from when the amplification control state is switched to the first intermittent control state, the controller 64 proceeds to step S38 shown in FIG. 7. In a case where the second period Y2 has not elapsed from when the amplification control state is switched to the first intermittent control state, the controller 64 proceeds to step S39 shown in FIG. 7. The second period Y2 of the present modification can be the same as or differ from the second period Y2 of the second embodiment.

Figure 24:
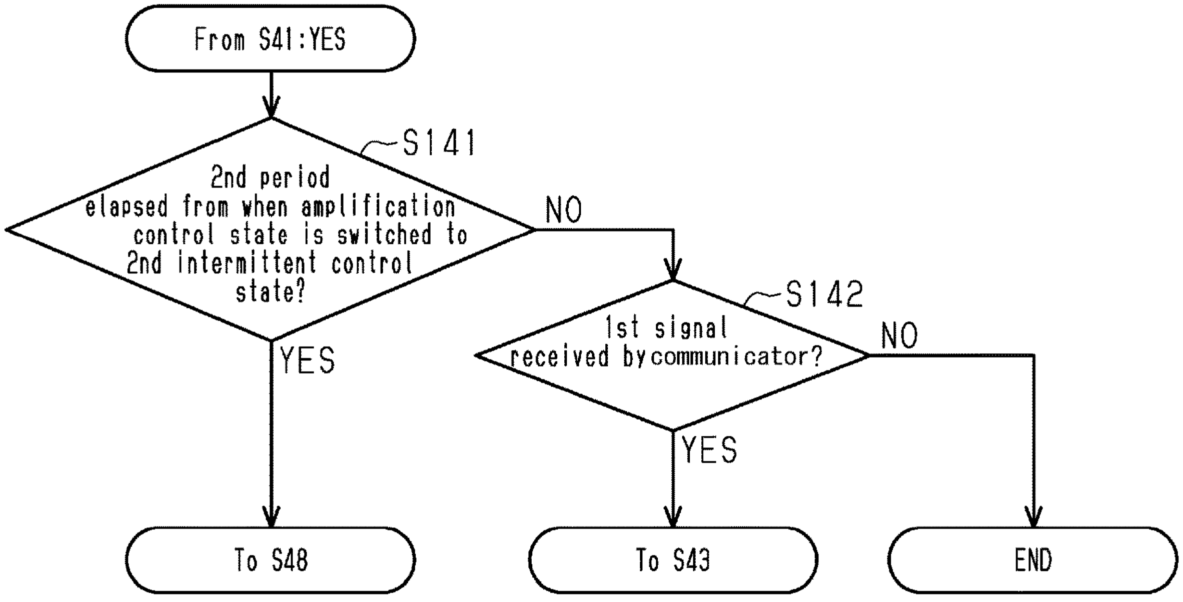
FIG. 24 is a flowchart of a process for switching the amplification control state executed by a fifth modification of an electronic controller.

As shown in FIG. 24, in the second embodiment, in a case where the amplification control state is the second intermittent control state and the communicator 62 does not receive the first signal before an elapsed period from when the amplification control state is switched to the second intermittent control state becomes the second period Y2, the controller 64 can be configured to switch the amplification control state to the first amplification control state. In an example, in a case where the amplification control state is the second intermittent control state and the communicator 62 does not receive the first signal before an elapsed period from when the amplification control state is switched to the second intermittent control state becomes the second period Y2, the controller 64 can be configured to switch the amplification control state to the first amplification control state as the second period Y2 elapses regardless of the state of the human-powered vehicle 10. In an example, in a case where the amplification control state is the second intermittent control state and the communicator 62 does not receive the first signal before an elapsed period from when the amplification control state is switched to the second intermittent control state becomes the second period Y2, the controller 64 can be configured to switch the amplification control state to the first amplification control state as the second period Y2 elapses even if the human-powered vehicle 10 is operated. Control executed by the controller 64 for switching the amplification control state in the present embodiment will now be described with reference to FIGS. 8 and 24. In this modification, in step S41 shown in FIG. 8, in a case where the amplification control state is the second intermittent control state, the controller 64 proceeds to step S141 shown in FIG. 24. In step S141, the controller 64 determines whether the second period Y2 has elapsed from when the amplification control state is switched to the second intermittent control state. In a case where the second period Y2 has elapsed from when the amplification control state is switched to the second intermittent control state, the controller 64 proceeds to step S48 shown in FIG. 8. In a case where the second period Y2 has not elapsed from when the amplification control state is switched to the second intermittent control state, the controller 64 proceeds to step S142. In step S142, the controller 64 determines whether the first signal is received by the communicator 62. In a case where the first signal is received by the communicator 62, the controller 64 proceeds to step S43 shown in FIG. 8. In a case where the first signal is not received by the communicator 62, the controller 64 ends the process shown in FIGS. 7, 8, and 24. The second period Y2 of the present modification can be the same as or differ from the second period Y2 of the second embodiment.

The controller 64 can be configured to determine the state of the human-powered vehicle 10 from a method that differs from a detection signal related to the state of the human-powered vehicle 10 output from the detector 72. In an example, the controller 64 determines the state of the human-powered vehicle 10 based on the state of the power generation unit 44. In an example, the controller 64 can be configured to determine whether the human-powered vehicle 10 is in the use state based on whether the power generation unit 44 is generating electric power. In an example, in a case where the power generation unit 44 is generating electric power, the controller 64 determines that the human-powered vehicle 10 is in the use state.

As long as the component 52 includes the communicator 62 and the controller 64, other structures can be omitted.

As long as the component 52 includes the antenna 58, the amplifier 60, and the communicator 62, other structures can be omitted.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A component for a human-powered vehicle, the component comprising:

an antenna configured to perform at least one of reception or transmission of a predetermined signal from or to at least one communication device that is separate from the component;

an amplifier electrically connected to the antenna and configured to amplify the predetermined signal in intensity;

a communicator that performs at least one of reception of the predetermined signal via the amplifier and transmission of the predetermined signal via the amplifier; and an electronic controller configured to control the amplifier in accordance with an amplifier control state, wherein the amplifier control state includes a first amplification control state, a second amplification control state in which power consumption of the amplifier is greater than power consumption of the amplifier in the first amplification control state, and a third amplification control state in which power consumption of the amplifier is greater than the power consumption of the amplifier in the second amplification control state, and the electronic controller is configured to switch the amplification control state to the first amplification control state in a case where the amplification control state is the second amplification control state, and where the predetermined signal is not received and the human-powered vehicle is continuously maintained in a predetermined state over a predetermined period or longer.

2. The component according to claim 1, wherein the electronic controller is configured to control the amplifier in the third amplification control state so that the amplifier operates intermittently or operates continuously.

3. The component according to claim 1, wherein: the at least one communication device includes at least one transmitter that transmits the predetermined signal; and the antenna receives the predetermined signal from the at least one transmitter.

4. The component according to claim 3, wherein the electronic controller is configured to switch the amplification control state to the third amplification control state in accordance with at least one of the predetermined signal, a state of the human-powered vehicle, and a state of the communicator in a case where the amplifier control state is the second amplification control state.

5. The component according to claim 4, wherein the state of the human-powered vehicle includes at least one of vehicle body state of the human-powered vehicle, traveling state of the human-powered vehicle, and state of a rider of the human-powered vehicle.

6. The component according to claim 5, further comprising:

a detector that detects the state of the human-powered vehicle, the detector including at least one of a vibration sensor, an acceleration sensor, an inclination sensor, a gyro sensor, a pressure sensor, a switch, a cadence sensor, a vehicle speed sensor, and a force sensor.

7. The component according to claim 3, wherein:

the electronic controller is configured to control the communicator in accordance with a communication control state;

the communication control state includes a first communication control state and a second communication control state in which power consumption of the communicator in the second communication control state is greater than power consumption of the communicator in the first communication control state; and the electronic controller is configured to switch the amplification control state from the second amplification control state to the third amplification control state in accordance with at least one of the predetermined signal and a state of the human-powered vehicle in a case where the communication control state is the second communication control state.

8. The component according to claim 3, wherein the electronic controller is configured to switch the amplification control state to the second amplification control state in a case where the amplification control state is the third amplification control state, and where a period from when the predetermined signal is finally received becomes a first predetermined period or longer.

9. The component according to claim 3, wherein the electronic controller is configured to control the communicator in the second amplification control state so that the amplifier operates continuously or operates intermittently.

10. The component according to claim 9, wherein the electronic controller is configured to control the amplifier in the second amplification control state so that the amplifier operates intermittently.

11. The component according to claim 3, wherein the component includes at least one of an operating device, a transmission device, a drive unit that applies a propulsion force to the human-powered vehicle, a brake, an adjustable seatpost, a suspension, a display device, a crank rotational state detector, a human driving force detector, and a tire pressure detector.

12. The component according to claim 11, wherein:

the component includes the transmission device; and the transmission device includes a derailleur.

13. A control system for a human-powered vehicle, the control system, comprising:

the component according to claim 3; and the at least one transmitter.

14. The component according to claim 1, wherein the electronic controller is configured to control the amplifier in the first amplification control state so that the amplifier enters a sleep mode or operates intermittently.

15. The component according to claim 14, wherein the electronic controller is configured to control the amplifier in the first amplification control state so that the amplifier stops amplifying the predetermined signal in intensity.

16. A component for a human-powered vehicle, the component comprising:

an antenna configured to receive a predetermined signal from at least one transmitter that is separate from the component;

an amplifier electrically connected to the antenna and configured to amplify the predetermined signal, received from the antenna, in intensity;

a communicator configured to receive the predetermined signal via the amplifier; and an electronic controller configured to control the communicator in accordance with a communication control state and control the amplifier in accordance with an amplification control state, wherein:

the communication control state includes a first communication control state and a second communication control state in which power consumption of the communicator in the second communication control state is greater than power consumption of the communicator in the first communication control state;

the amplification control state includes a first amplification control state and a second amplification control state in which power consumption of the amplifier in the second amplification control state is greater than power consumption of the amplifier in the first amplification control state; and the electronic controller is configured to switch the amplification control state from the first amplification control state to the second amplification control state in accordance with at least one of the predetermined signal and a state of the human-powered vehicle in a case where the communication control state is the second communication control state.

17. A component for a human-powered vehicle, the component comprising:

an antenna configured to receive a predetermined signal from at least one transmitter that is separate from the component;

an amplifier electrically connected to the antenna and configured to amplify the predetermined signal, received from the antenna, in intensity;

a communicator configured to receive the predetermined signal via the amplifier; and an electronic controller configured to control the amplifier in accordance with an amplification control state, wherein:

the amplification control state includes a first amplification control state and a second amplification control state in which power consumption of the amplifier in the second amplification control state is greater than power consumption of the amplifier in the first amplification control state;

the electronic controller is configured to control the amplifier in the first amplification control state so that the amplifier stops amplifying the predetermined signal in intensity; and the electronic controller is configured to switch the amplification control state to the first amplification control state in a case where the amplification control state is the second amplification control state, and where the predetermined signal is not received and the human-powered vehicle is continuously maintained in a predetermined state over a predetermined period or longer.

18. The component according to claim 17, wherein the electronic controller is configured to switch the amplification control state to the second amplification control state in accordance with at least one of the predetermined signal, a state of the human-powered vehicle, and a state of the communicator in a case where the amplification control state is the first amplification control state.

19. A component for a human-powered vehicle, the component comprising:

an antenna configured to perform at least one of reception or transmission of a predetermined signal from or to at least one communication device that is separate from the component;

an amplifier electrically connected to the antenna and configured to amplify the predetermined signal in intensity;

a communicator that performs at least one of reception of the predetermined signal via the amplifier and transmission of the predetermined signal via the amplifier; and an electronic controller configured to control the amplifier in accordance with an amplifier control state;

the amplifier control state including a first amplification control state and a second amplification control state in which power consumption of the amplifier is greater than power consumption of the amplifier in the first amplification control state;

the second amplification control state includes a first intermittent control state and a second intermittent control state in which power consumption of the amplifier in the second intermittent control state is greater than power consumption of the amplifier in the first intermittent control state;

the electronic controller is configured to control the amplifier in the first intermittent control state so that an amplification cycle of the amplifier is a first amplification cycle; and the electronic controller is configured to control the amplifier in the second intermittent control state so that the amplification cycle is a second amplification cycle that is shorter than the first amplification cycle.

20. The component according to claim 19, wherein the electronic controller is configured to switch the amplification control state to the first amplification control state in a case where the amplification control state is the second amplification control state, and where the predetermined signal is not received and the human-powered vehicle is continuously maintained in a predetermined state over a second predetermined period or longer.

21. The component according to claim 19, wherein:

the first amplification cycle includes a first amplification period;

the second amplification cycle includes a second amplification period;

the electronic controller is configured to control the amplifier in the first intermittent control state so that the amplifier amplifies the predetermined signal in intensity during the first amplification period; and the electronic controller is configured to control the amplifier in the second intermittent control state so that the amplifier amplifies the predetermined signal in intensity during the second amplification period.

22. The component according to claim 21, wherein:

the first amplification cycle further includes a first amplification interval from the first amplification period to a following first amplification period; and the second amplification cycle further includes a second amplification interval from the second amplification period to a following second amplification period.

23. The component according to claim 22, wherein the first amplification interval is longer than the second amplification interval.

24. The component according to claim 22, wherein:

the first amplification interval includes a first low amplification period; and the electronic controller is configured to control the amplifier in the first low amplification period so that the amplifier amplifies the predetermined signal in intensity at a degree lower than an amplification degree of the predetermined signal in the first amplification period.

25. The component according to claim 24, wherein:

the first low amplification period includes a first non-amplification period; and the electronic controller is configured to control the amplifier in the first non-amplification period so that the amplifier does not amplify the predetermined signal in intensity.

26. The component according to claim 22, wherein:

the second amplification interval includes a second low amplification period; and the electronic controller is configured to control the amplifier in the second low amplification period so that the amplifier amplifies the predetermined signal in intensity at a degree lower than an amplification degree of the predetermined signal in the second amplification period.

27. The component according to claim 26, wherein:

the second low amplification period includes a second non-amplification period; and the electronic controller is configured to control the amplifier in the second non-amplification period so that the amplifier does not amplify the predetermined signal in intensity.

28. The component according to claim 19, wherein the electronic controller is configured to switch the amplification control state to the first intermittent control state in accordance with at least one of the predetermined signal, a state of the human-powered vehicle, and a state of the communicator in a case where the amplification control state is the first amplification control state.

29. The component according to claim 19, wherein
the electronic controller is configured to switch the amplification control state to the second intermittent control state in accordance with the predetermined signal in a case where the amplification control state is the first intermittent control state.

30. The component according to claim 19, wherein
the electronic controller is configured to switch the amplification control state to the first intermittent control state in accordance with the predetermined signal in a case where the amplification control state is the second intermittent control state.

31. A component for a human-powered vehicle, the component comprising:

an antenna configured to perform at least one of reception or transmission of a predetermined signal from or to at least one communication device that is separate from the component;

an amplifier electrically connected to the antenna;

a controller configured to switch a state of the amplifier between an activation state and a standby state; and a communicator configured to transfer the predetermined signal via the antenna and the amplifier, wherein:

the amplifier includes an amplification circuit configured to amplify the predetermined signal in intensity, transfer paths, and a switching unit configured to select one of the transfer paths;

the transfer paths include a first transfer path that transfers the predetermined signal between the antenna and the communicator via the amplification circuit, and a second transfer path that transfers the predetermined signal between the antenna and the communicator without using the amplification circuit;

the controller is configured to cause the switching unit to switch between using the first transfer path in the activation state and the second transfer path in the standby state;

the controller is configured to control the amplifier in accordance with an amplifier control state, wherein the amplifier control state includes a first amplification control state and a second amplification control state in which power consumption of the amplifier is greater than power consumption of the amplifier in the first amplification control state; and the controller is configured to switch the amplification control state to the first amplification control state in a case where the amplification control state is the second amplification control state, and where the predetermined signal is not received and the human-powered vehicle is continuously maintained in a predetermined state over a predetermined period or longer.

32. The component according to claim 31, wherein:

the at least one communication device includes at least one transmitter that transmits the predetermined signal;

the antenna receives the predetermined signal from the at least one transmitter;

the first transfer path includes a first reception transfer path that transfers the predetermined signal received by the antenna to the communicator via the amplification circuit; and the second transfer path includes a second reception transfer path that transfers the predetermined signal received by the antenna to the communicator without using the amplification circuit.

* * * * *